US008818001B2

(12) United States Patent
Hiroe

(10) Patent No.: US 8,818,001 B2
(45) Date of Patent: Aug. 26, 2014

(54) SIGNAL PROCESSING APPARATUS, SIGNAL PROCESSING METHOD, AND PROGRAM THEREFOR

(75) Inventor: Atsuo Hiroe, Kanagawa (JP)

(73) Assignee: Sony Corporation, Tokyo (JP)

( * ) Notice: Subject to any disclaimer, the term of this patent is extended or adjusted under 35 U.S.C. 154(b) by 472 days.

(21) Appl. No.: 12/944,304

(22) Filed: Nov. 11, 2010

(65) Prior Publication Data

US 2011/0123046 A1 May 26, 2011

(30) Foreign Application Priority Data

Nov. 20, 2009 (JP) ................................ P2009-265075

(51) Int. Cl.
*H04B 15/00* (2006.01)

(52) U.S. Cl.
USPC ............................................ 381/94.1; 381/92

(58) Field of Classification Search
USPC ........... 381/58, 59, 96, 120, 123, 156, 66, 93, 381/83, 318, 94.1, 92, 71.1; 379/406.01
See application file for complete search history.

(56) References Cited

U.S. PATENT DOCUMENTS

| | | | | |
|---|---|---|---|---|
| 7,039,546 B2 * | 5/2006 | Sawada et al. | ................ | 702/150 |
| 7,428,490 B2 * | 9/2008 | Xu et al. | ........................ | 704/226 |
| 2007/0053455 A1 * | 3/2007 | Sugiyama | ...................... | 375/260 |
| 2008/0228470 A1 * | 9/2008 | Hiroe | ............................ | 704/200 |

FOREIGN PATENT DOCUMENTS

| | | | |
|---|---|---|---|
| JP | 2006-238409 | | 9/2006 |
| JP | 2008-147920 | | 6/2008 |
| JP | 4172530 | | 10/2008 |
| JP | 4671303 | | 4/2011 |
| WO | WO 2007/026827 | A1 | 3/2007 |

OTHER PUBLICATIONS

Ono, N. et al., "Measurement of Sound Field and Directivity Control," the 22th Sending Forum Document, pp. 305-310, Sep. 2005 (6 pages).

Ito, N. et al., "Diffuse noise suppression by crystal-array-based post-filter design," The Institute of Electronics, Information and Communication Engineers, Technical Report of IEICE, (4 pages).

Okamoto, R. et al., "MMSE STSA with Noise Estimation Based on Independent Component Analysis," Collecction of Lecture Notes, Acoustical Society of Japan, 2-9-6, Mar. 2009 pp. 663-666.

Hyvarinen et al., Introduction, "Independent Component Analysis," 2001 John Wiley & Sons, (12 pages).

* cited by examiner

*Primary Examiner* — Xu Mei
*Assistant Examiner* — William A Jerez Lora
(74) *Attorney, Agent, or Firm* — Finnegan, Henderson, Farabow, Garrett & Dunner, L.L.P.

(57) ABSTRACT

A signal processing apparatus includes: a separation processing unit that generates observed signals in the time frequency domain by performing the short-time Fourier transform on mixed signals as outputs, which are acquired from a plurality of sound sources by a plurality of sensors, and generates sound source separation results corresponding to the sound sources by a linear filtering process on the observed signals. The separation processing unit has a linear filtering process section that performs the linear filtering process on the observed signals so as to generate separated signals corresponding to the respective sound sources, an all-null spatial filtering section that applies an all-null spatial filter to generate signals filtered with the all-null spatial filter (spatially filtered signals) in which the acquired sounds in null directions are removed, and a frequency filtering section that performs a filtering process by inputting the separated signals and the spatially filtered signals.

9 Claims, 33 Drawing Sheets

SIGNAL PROCESSING APPARATUS, SIGNAL PROCESSING METHOD, AND PROGRAM THEREFOR

BACKGROUND OF THE INVENTION

1. Field of the Invention

The present invention relates to a signal processing apparatus, a signal processing method, and a program therefor. More specifically, the invention relates to a signal processing apparatus, a signal processing method, and a program that perform a process of separating signals, in which a plurality of signals are mixed, by using the independent component analysis (ICA). In particular, the process is a real-time process, that is, a process of separating observed signals, which are successively input, into independent components with little delay and successively outputting them.

2. Description of the Related Art

First, as a related art of the invention, a description will be given of the independent component analysis (ICA) and a real-time implementation method of the independent component analysis (ICA).

A1. Description of ICA

The ICA is a type of multivariate analysis, and is a technique of separating multidimensional signals by using the statistical properties of the signals. For details on the ICA itself, refer to, for example, "Introduction to the Independent Component Analysis" (Noboru Murata, Tokyo Denki University Press).

Hereinafter, a description will be given of ICA for sound signals, in particular, ICA in the time frequency domain.

As shown in FIG. 1, a situation is considered in which different sounds are being played from N sound sources, and those sounds are observed at n microphones. The sounds (source signals) produced from the sound sources are subject to time delays, reflections, and so on before arriving at the microphones. Therefore, signals observed at a microphone k (observed signals) can be represented as an expression that sums up convolutions between source signals and transfer functions with respect to all sound sources as indicated by Expression [1.1]. Hereinafter, these mixtures will be referred to as "convolutive mixtures".

In addition, it is assumed that the observed signal of the microphone n is $x_n(t)$. The observed signals of the microphone 1 and the microphone 2 are $x_1(t)$ and $x_2(t)$.

Observed signals for all microphones can be represented by a single expression as in Expression [1.2] below.

Numerical Expression 1

$$x_k(t) = \sum_{j=1}^{N}\sum_{l=0}^{L} a_{kj}(l)s_j(t-l) = \sum_{j=1}^{N}\{a_{kj} * s_j\} \quad [1.1]$$

$$x(t) = A^{[0]}s(t) + \ldots + A^{[L]}s(t-L) \quad [1.2]$$

Here, $$s(t) = \begin{bmatrix} s_1(t) \\ \vdots \\ s_N(t) \end{bmatrix},\ x(t) = \begin{bmatrix} x_1(t) \\ \vdots \\ x_n(t) \end{bmatrix},\ A^{[l]} = \begin{bmatrix} a_{11}(l) & \cdots & a_{1N}(l) \\ \vdots & \ddots & \vdots \\ a_{n1}(l) & \cdots & a_{nN}(l) \end{bmatrix} \quad [1.3]$$

Here, x(t) and s(t) are column vectors having $x_k(t)$ and $s_k(t)$ as elements, respectively. $A^{[1]}$ is an n×N matrix having $a^{[1]}_{kj}$ as elements. In the following description, it is assumed that n=N.

It is common knowledge that convolutive mixtures in the time domain are represented as instantaneous mixtures in the time frequency domain. An analysis using this characteristic is ICA in the time frequency domain.

The time frequency domain ICA itself is with reference to, for example, "19.2.4 Fourier Transform Methods" of "Explanation of Independent Component Analysis" and Japanese Unexamined Patent Application Publication No. 2006-238409 "Audio Signal Separating Apparatus/Noise Removal Apparatus and Method").

Hereinafter, features relating to the invention will be mainly described.

Application of a short-time Fourier transform on both sides of Expression [1.2] mentioned above yields Expression [2.1] below.

Numerical Expression 2

$$X(\omega, t) = A(\omega)S(\omega, t) \quad [2.1]$$

$$X(\omega, t) = \begin{bmatrix} X_1(\omega, t) \\ \vdots \\ X_n(\omega, t) \end{bmatrix} \quad [2.2]$$

$$A(\omega) = \begin{bmatrix} A_{11}(\omega) & \cdots & A_{1N}(\omega) \\ \vdots & \ddots & \vdots \\ A_{n1}(\omega) & \cdots & A_{nN}(\omega) \end{bmatrix} \quad [2.3]$$

$$S(\omega, t) = \begin{bmatrix} S_1(\omega, t) \\ \vdots \\ S_N(\omega, t) \end{bmatrix} \quad [2.4]$$

$$Y(\omega, t) = W(\omega)X(\omega, t) \quad [2.5]$$

$$Y(\omega, t) = \begin{bmatrix} Y_1(\omega, t) \\ \vdots \\ Y_n(\omega, t) \end{bmatrix} \quad [2.6]$$

$$W(\omega) = \begin{bmatrix} W_{11}(\omega) & \cdots & W_{1n}(\omega) \\ \vdots & \ddots & \vdots \\ W_{n1}(\omega) & \cdots & W_{nn}(\omega) \end{bmatrix} \quad [2.7]$$

In Expression [2.1],

ω is the frequency bin index, and t is the frame index.

If ω is fixed, this expression can be regarded as instantaneous mixtures (mixtures with no time delay). Accordingly, to separate observed signals, Expression [2.5] for calculating the separation results [Y] is provided, and then a separating matrix W(ω) is determined so that, as the separation results, the individual components of Y(ω,t) are maximally independent.

In the case of time frequency domain ICA according to the related art, a so-called permutation problem occurs, in which "which component is separated into which channel" differs for each frequency bin. This permutation problem was almost entirely solved by the configuration disclosed in Japanese Unexamined Patent Application Publication No. 2006-238409 "Audio Signal Separating Apparatus/Noise Removal Apparatus and Method", which is a patent application previously filed by the same inventor as the present application. Since this method is also employed in an embodiment of the invention, a brief description will be given of the technique for solving the permutation problem disclosed in Japanese Unexamined Patent Application Publication No. 2006-238409.

In Japanese Unexamined Patent Application Publication No. 2006-238409, in order to find a separating matrix W(ω), Expressions [3.1] to [3.3] represented as follows are iterated until the separating matrix W(ω) converges (or a certain number of times).

Numerical Expression 3

$$Y(\omega, t) = W(\omega)X(\omega, t) \quad (t = 1, \dots, T\ \ \omega = 1, \dots, M) \tag{3.1}$$

$$\Delta W(\omega) = \{I + \langle \varphi_\omega(Y(t))Y(\omega, t)^H \rangle_t\}W(\omega) \tag{3.2}$$

$$W(\omega) \leftarrow W(\omega) + \eta \Delta W(\omega) \tag{3.3}$$

$$Y(t) = \begin{bmatrix} Y_1(1, t) \\ \vdots \\ Y_1(M, t) \\ \hline \vdots \\ \hline Y_n(1, t) \\ \vdots \\ Y_n(M, t) \end{bmatrix} = \begin{bmatrix} Y_1(t) \\ \vdots \\ Y_n(t) \end{bmatrix} \tag{3.4}$$

$$\varphi_\omega(Y(t)) = \begin{bmatrix} \varphi_\omega(Y_1(t)) \\ \vdots \\ \varphi_\omega(Y_n(t)) \end{bmatrix} \tag{3.5}$$

$$\varphi_\omega(Y_k(t)) = \frac{\partial}{\partial Y_k(\omega, t)} \log P(Y_k(t)) \tag{3.6}$$

$P(Y_k(t))$: Probability Density Function ($PDF$) of $Y_k(t)$ $$P(Y_k(t)) \propto \exp(-\gamma \|Y_k(t)\|_2) \tag{3.7}$$

$$\|Y_k(t)\|_m = \left\{ \sum_{\omega=1}^{M} |Y_k(\omega, t)|^m \right\}^{1/m} \tag{3.8}$$

$$\varphi_\omega(Y_k(t)) = -\gamma \frac{Y_k(\omega, t)}{\|Y_k(t)\|_2} \tag{3.9}$$

$$W = \left[\begin{array}{cc|c|cc} W_{11}(1) & 0 & & W_{1n}(1) & 0 \\ & \ddots & \cdots & & \ddots \\ 0 & W_{11}(M) & & 0 & W_{1n}(M) \\ \hline & \vdots & \ddots & & \vdots \\ \hline W_{n1}(1) & 0 & & W_{nn}(1) & 0 \\ & \ddots & \cdots & & \ddots \\ 0 & W_{n1}(M) & & 0 & W_{nn}(M) \end{array}\right] \tag{3.10}$$

$$X(t) = \begin{bmatrix} X_1(1, t) \\ \vdots \\ X_1(M, t) \\ \hline \vdots \\ \hline X_n(1, t) \\ \vdots \\ X_n(M, t) \end{bmatrix} \tag{3.11}$$

$$Y(t) = WX(t) \tag{3.12}$$

In the following, such iteration will be referred to as "learning". It should be noted, however, that Expressions [3.1] to [3.3] are performed on all frequency bins, and further, Expression [3.1] is performed on all the frames of accumulated observed signals. In addition, in Expression [3.2], $\langle\cdot\rangle_t$ denotes the mean over all frames. The superscript H attached at the upper right of Y(ω,t) indicates the Hermitian transpose (which takes the transpose of a vector or a matrix, and also transforms its elements into conjugate complex numbers).

The separation results Y(t) are represented by Expression [3.4], and denotes a vector in which elements of all the channels and all the frequency bins of the separation results are arranged. Also, $\phi_\omega(Y(t))$ is a vector represented by Expression [3.5]. Each element $\phi_\omega(Y_k(t))$ is called a score function, and is a logarithmic derivative of the multidimensional (multivariate) probability density function (PDF) of $Y_k(t)$ (Expression [3.6]). As the multidimensional PDF, for example, a function represented by Expression [3.7] can be used, in which case the score function $\phi_\omega(Y_k(t))$ can be represented as Expression [3.9]. It should be noted, however, that $\|Y_k(t)\|_2$ is an L-2 norm (obtained by finding the square sum of all elements and then taking the square root of the resulting sum) of the vector $Y_k(t)$. An L-m norm as a generalized form of the L-2 norm is defined by Expression [3.8]. In Expressions [3.7] and [3.9], 7 denotes a term for adjusting the scale of $Y_k(\omega, t)$, for which an appropriate positive constant, for example, sqrt(M) (square root of the number of frequency bins) is substituted. In Expression [3.3], η is a positive small value (for example, about 0.1) called a learning ratio or learning factor. This is used for gradually reflecting ΔW(ω) calculated in Expression [3.2] on the separating matrix W(ω).

In addition, while Expression [3.1] represents separation in one frequency bin (refer to FIG. 2A), it is also possible to represent separation in all frequency bins by a single expression (refer to FIG. 2B).

This may be accomplished by using the separation results Y(t) in all frequency bins represented by Expression [3.4] described above, and observed signals X(t) represented by Expression [3.11], and further the separating matrices for all frequency bins represented by Expression [3.10]. By using those vectors and matrices, separation can be represented by Expression [3.12]. According to an embodiment of the invention, Expressions [3.1] and [3.11] are used selectively as necessary.

In addition, the diagrams of X1 to Xn and Y1 to Yn shown in FIGS. 2A and 2B are called spectrograms, in which the results of short-time Fourier transform (STFT) are arranged in the frequency bin direction and the frame direction. The vertical direction represents the frequency bin, and the horizontal direction represents the frame. While lower frequencies are noted at the top in Expressions [3.4] and [3.11], lower frequencies are drawn at the bottom in the spectrograms.

In the above description, it is assumed that the number of sound sources N is equal to the number of microphones n. However, even when $N<n$, the separation is possible. In this case, signals corresponding to the sound sources are respectively output on N channels of the n output channels, but almost-silent signals corresponding to none of the sound sources are output on n-N remaining channels.

A2. Real-Time Implementation of ICA

The learning process described in the section "A1. Description of ICA", in which Expressions [3.1] to [3.3] are iterated until the separating matrix W(ω) converges (or a predetermined number of times), is performed by a batch process. That is, as described above, the iteration process of Expressions [3.1] to [3.3], in which Expressions [3.1] to [3.3] are iterated after accumulating the whole of the observed signals, is referred to as learning.

This batch process can be applied to real-time (low-delay) sound source separation through some contrivance. As an example of a sound source separation process realizing a real-time processing method, a description will be given of the configuration disclosed in "Japanese Unexamined Patent Application Publication No. 2008-147920: Real-Time Sound Source Separation Apparatus and Method", which is a patent application previously filed by the same applicant as the present application.

As shown in FIG. 3, in the processing method disclosed in Japanese Unexamined Patent Application Publication No. 2008-147920, observed signal spectrograms are split into a plurality of overlapped blocks 1 to N, and learning is performed for each block, thereby finding a separating matrix. The reason why the blocks are overlapped is to achieve both the accuracy and the frequency of updates of the separating matrix.

In addition, in the case of real-time ICA (blockwise ICA) disclosed prior to Japanese Unexamined Patent Application Publication No. 2008-147920, there is no overlap between the blocks. Therefore, in order to shorten the update interval of the separating matrix, it is necessary to shorten the block length (=the time for which observed signals are accumulated). However, there is a problem in that a shorter block length results in lower separation accuracy.

As described above, the method of applying the batch process to each block of the observed signals is hereinafter referred to as a "blockwise batch process".

A separating matrix found from each block is applied to subsequent observed signals (not applied to the same block) to generate the separation results. Herein, such a method will be referred to as a "shift application".

FIG. 4 illustrates the "shift application". Suppose that at the current time, t-th-frame observed signals X(t)42 are input. At this point, the separating matrix corresponding to the block containing the observed signals X(t) (for example, an observed signal block 46 containing the current time) has not been obtained yet. Accordingly, instead of the block 46, the observed signals X(t) are multiplied by the separating matrix learned from a learning data block 41 that is a block preceding the block 46, thereby generating the separation results corresponding to X(t), that is, separation results Y(t)44 at the current time. In addition, it is assumed that the separating matrix learned from the learning data block 41 is already obtained at the time point of the frame t.

As described above, a separating matrix is considered to represent a process the reverse of a mixing process.

Hence, when the mixing process is the same (for example, when the positional relation between sound sources and microphones has not changed) between the observed signals in the learning data block setting segment 41 and the observed signals 42 at the current time, signal separation can be performed even when a separating matrix learned in a different segment is applied. In such a manner, it is possible to realize separation with little delay.

The configuration disclosed in Japanese Unexamined Patent Application Publication No. 2008-147920 proposes a method in which a plurality of processing units called threads for finding a separating matrix from overlapped blocks are run in parallel per unit time shifts. This parallel processing method will be described with reference to FIG. 5.

FIG. 5 shows the transitions of processing over time of individual threads serving as the units of processing. FIG. 5 shows six threads 1 to 6. Each thread repeats three states of A) Accumulating, B) Learning, and C) Waiting. That is, the thread length corresponds to the total time length of the three processes of A) Accumulating, B) Learning, and C) Waiting. Time progresses from left to right in FIG. 5.

The "A) Accumulating" is the segment of dark gray in FIG. 5. When in this state, a thread accumulates observed signals. The overlapped blocks in FIG. 5 can be expressed by shifting the accumulation start times between threads. Since the accumulation start time is shifted by ¼ of the accumulation time in FIG. 5, assuming that the accumulation time in one thread is, for example, four seconds, the shifted time between threads equals one second.

Upon accumulating observed signals for a predetermined time (for example, four seconds), the state of each thread transitions to "B) Learning". The "B) Learning" is the segment of light gray in FIG. 5. When in this state, Expressions [3.1] to [3.3] described above are iterated with respect to the accumulated observed signals.

When the separating matrix W has sufficiently converged (or simply upon reaching a predetermined number of iterations) by learning (iteration of Expressions [3.1] to [3.3]), the learning is ended, and the thread transitions to the "C) Waiting" state (the white segment in FIG. 5). The "Waiting" is provided for keeping the accumulation start time and the learning start time at a constant interval between threads. As a result, the learning end time (=the time at which the separating matrix is updated) is also kept at a substantially constant interval.

The separating matrix W obtained by learning is used for performing separation until learning in the next thread is finished. That is, the separating matrix W is used as a separating matrix 43 shown in FIG. 4. A description will be given of the separating matrix used in each applied-separating-matrix specifying segment 51 to 53 along the progression of time shown at the bottom of FIG. 5.

In the applied-separating-matrix specifying segment 51 from when the system is started to when the first separating matrix is learned, an initial value (for example, a unit matrix) is used as the separating matrix 43 in FIG. 4. In the segment 52 from when learning in the thread 1 shown in FIG. 5 is finished to when learning in the thread 2 is finished, a separating matrix derived from an observed-signal accumulating segment 54 in the thread 1 is used as the separating matrix 43 shown in FIG. 4. The numeral "1" shown in the segment 52 in FIG. 5 indicates that the separating matrix W used in this period is obtained through processing in the thread 1. The numerals on the right from the applied-separating-matrix specifying segment 52 also each indicate from which thread the corresponding separating matrix is derived.

In addition, when a separating matrix obtained in another thread exists at the point of starting learning, the separating matrix is used as the initial value of learning. This is referred to as "inheritance of a separating matrix". In the example shown in FIG. 5, at learning start timing 55 at which the first learning is started in the thread 3, the separating matrix 52 derived from the thread 1 is already obtained, so the separating matrix 52 is used as the initial value of learning.

By performing such processing, it is possible to prevent or reduce the occurrence of permutation between threads. Permutation between threads refers to, for example, a problem such that in the separating matrix obtained in the first thread, voice is output on the first channel and music is output on the second channel, whereas those are reversed in the separating matrix obtained in the third thread.

As described above with reference to FIG. 5, permutation between threads can be reduced by performing "inheritance of a separating matrix" so that the separating matrix is used as the initial value of learning when a separating matrix that has been obtained in another thread exists. In addition, even when a separating matrix has not sufficiently converged by learning in the thread 1, the degree of convergence can be improved as the separating matrix is inherited by the next thread.

By running a plurality of threads per unit time shifts in this way, the separating matrix is updated at an interval substantially equal to a shift between threads, that is, a block shift width 56.

B. Problems of Related Art

Next, the problems in the "A2. Real-time Implementation of ICA" described above will be studied. In the combination of the "blockwise batch process" and the "shift application" described in "A2. Real-time Implementation of ICA", the sound source separation may be not accurately performed. As the reason, the following two factors can be considered separately.

B1. Tracking lag

B2. Residual sound

Hereinafter, the respective reasons why the two factors cause inaccuracy in the sound source separation will be described.

B1. Tracking Lag

When the "shift application" is employed, a mismatch occurs temporarily when the sound sources are changed (when the sound sources are moved or start playing sounds suddenly) between the segment used for learning of a separating matrix (for example, the learning data block 41 shown in FIG. 4) and the observed signals 42 at the current time.

Thereafter, as a new separating matrix is obtained by the learning process which observes the changed sound sources, such a mismatch disappears eventually. However, until the new separating matrix is generated, the mismatch exists. This phenomenon will be herein referred to as a "tracking lag". The tracking lag may be caused even when the sound starts playing suddenly or the sound stops playing and then starts playing again although the sound sources are not moved. Hereinafter, such a sound is referred to as a "sudden sound".

FIG. 6 is a diagram illustrating correspondence between the sudden sound and the observed signal. In the example of FIG. 6, two sound sources are supposed to be provided.

(a) Sound source 1

(b) Sound source 2

The two sound sources are employed.

Time progresses from left to right. The block heights of the (a) sound source 1, the (b) sound source 2, and the (c) observed signal represent volumes thereof.

The (a) sound source 1 plays twice with the silent segment 67 interlaid therebetween. Output segments of the sound source are respectively represented by the sound-source-1 output segments 61 and 62. The sounds are output at the current time at which the current observed signal 66 is being observed.

The (b) sound source 2 plays continuously. That is, the sound source 2 has a sound-source-2 output segment 63.

The (c) observed signal can be represented by the sum of the signals which reach the microphones from the sound sources 1 and 2.

The block 64 of the learning data indicated by the dotted-line area in the (c) observed signal is the same segment as the learning data block 41 shown in FIG. 4. The separating matrix learned from the observed signal in the segment of the learning data block 64 is applied to the observed signal 66 at the current time (t1), thereby performing the separation. The segment 65 (the segment 65 from the block end to the current time) resides between the learning data block 64 and the observed signal 66 at the current time (t1).

The observed signal 66 at the current time (t1) is an observed signal based on the sound source output 69 at the current time.

However, sometimes a mismatch may occur between the learning data and the current observed signal in accordance with the length of the silent segment 67 of the sound source 1 and the length of the learning data block 64 (which is the same as the learning data block 41 shown in FIG. 4).

For example, in the (c) observed signal, the observed signal 66 at the current time (t1) includes both the sound-source-1 output segment 62 derived from the sound source 1 and the sound-source-2 output segment 63 derived from the sound source 2 as an observed signal. In contrast, in the learning data block 64, only the sound-source-2 output segment 63 originated from the sound source 2 was observed.

Similar to the observed signal 66 at the current time (t1), the situation, in which the sound out of the learning data block is currently being played, is expressed as "a sudden sound is generated". In other words, since the learning data block 64 does not include the observed signal of the sound source 1, although the sound source 1 plays ahead of the block (corresponding to the sound-source-1 output segment 61), the sound of the sound source 1 (the segment of the sound-source-1 output segment 62) is the sudden sound in the separating matrix learned in the learning data block 64.

FIG. 7 is a diagram illustrating an effect of the sudden sound generation on the separation result, particularly, the tracking lag. FIG. 7 shows the following data.

(a) Observed Signal (b1) Separation Result 1

(b2) Separation Result 2

(b3) Separation Result 3

Time progresses from left to right in the drawing.

In the example shown in FIG. 7, it is assumed that the ICA (independent component analysis) system has three or more microphones and the number of output channels is also three or more.

The (a) observed signal includes the continuous sound 71 which is continuously played in the range of the time t0 to t5 and the sudden sound 72 which is output only in the range of the time t1 to t4.

The (a) observed signal in FIG. 7 is an observed signal similar to the (c) observed signal in FIG. 6. In addition, for example, the continuous sound 71 corresponds to the (b) sound source 2 in FIG. 6, and the sudden sound 72 corresponds to the (a) sound source 1 in FIG. 6.

Before the start of the output of the sudden sound 72, the separating matrix is sufficiently converged in the segment 73 from t0 to t1 during which only the continuous sound 71 is being played, and then the signal corresponding to the continuous sound 71 is output on only one channel. This is the (b1) separation result 1. Almost silent sound is output on other channels, that is, the (b2) separation result 2 and the (b3) separation result 3.

Here, suppose that the sudden sound 72 occurs. For example, someone who has been silent may suddenly start talking. At this time, the separating matrix applicable to the observed signal is a separating matrix which is generated by learning the data before the generation of the sudden sound 72, that is, only the data of the continuous sound 71 prior to the time t1 as observation data.

As a result, by applying the separating matrix generated on the basis of the observed signal prior to the time t1, the observed signal obtained by observing the sudden sound 72 after the time t1 is separated, and thus it is difficult to obtain a correct separation result corresponding to the observed signal. The reason is that the separating matrix generated on the basis of the observed signal prior to the time t1 is a separating matrix in which the sudden sound 72 included in the observed signal after the time t1 is not considered. Consequently, as the separation results from the application of the separating matrix, for example, a mismatch occurs between the actual observed signal, that is, the observed signal as a mixture of the continuous sound 71 and the sudden sound 72, and the separation results in the range of the time t1 to t3.

In the time period from when the play of the sudden sound is started to when the separating matrix in which the sudden sound is reflected is learned (in the segment 74 from the time t1 to t2), the phenomenon, in which the sudden sound is output on all the channels (the (b1) separation result 1, the (b2) separation result 2, and the (b3) separation result 3), occurs. That is, the sudden sound is scarcely subjected to the sound source separation. This time period is minimally equal to a value slightly larger than the learning time, and is maximally equal to the sum of the learning time and the block shift width. For example, in the system in which the learning time is 0.3 seconds and the block shift is 0.2 seconds, the sudden sound is not separated and is output on all the channels in a little over 0.3 seconds minimum and 0.5 seconds maximum.

Thereafter, in order of the learning process in a new learning block, a new separating matrix is generated and updated. The separating matrix update process excludes one channel (in FIG. 7, the (b2) separation result 2) as the sudden sound is reflected in the separating matrix, thereby decreasing the output of the sudden sound (in the segment 75 from the time t2 to t3). In due time, the output exists only on the one channel (the (b2) separation result 2) (in the segment 76 after t3).

In the example shown in FIG. 7, the segment in which the tracking lag occurs is a combined segment of the segment 74 from the time t1 to t2 and the segment 75 from the time t2 to t3, that is, the segment 77 from the time t1 to t3.

The causes of the problem of the tracking lag, which occurs when the sudden sound is generated, are different depending on whether the sudden sound is a target sound or an interference sound. Hereinafter, each case will be described. The target sound means a sound serving as an analysis target.

When the sudden sound is the interference sound, in other words, when the continuous sound 71 continuously played is the target sound, it is preferable to remove the sudden sound. Accordingly, the problem is that the interference sound is not removed and remains in the (b1) separation result 1 shown in FIG. 7.

On the other hand, when the sudden sound is the target sound, it is preferable to retain the sudden sound but remove the continuous sound 71 played continuously as the interference sound. It seems that the (b2) separation result 2 shown in FIG. 7 corresponds to such an output. However, a mismatch occurs between the input and the separating matrix in the segment 77 from the time t1 to t3 in which the tracking lag occurs. Hence, there is a possibility that the output sound is distorted (a possibility that balance between frequencies becomes different from the source signal). That is, when the sudden sound is the target sound, a problem arises in that the output sound may be distorted.

As described above, depending on the characteristics of the sudden sound, it is necessary to perform contrary processes of removing or retaining the sound. Hence, it is difficult to solve the problem by using a single method.

B2. Residual Sound

Next, in the combination of the "blockwise batch process" and the "shift application" described in the "A2. Real-Time Implementation of ICA", "residual sound" as another factor which causes inaccuracy in the sound source separation will be described.

For example, the separating matrix is sufficiently converged in the segment 73 from the time t0 to t1, the segment 76 from the time t3 to t4, or the like in FIG. 7, and the separation of the observed data is performed by applying separating matrix based on the preceding learning data. In such a manner, it is possible to perform accurate separation. However, even in such a segment, one sound source is not perfectly output on one channel, but other sound sources remain to a certain extent. This is called the "residual sound". For example, the residual sound 78 shown in FIG. 7 is a sound which should not remain in the (b2) separation result. Likewise, the residual sound 79 is also a sound which should not be present in the (b3) separation result 3.

The following points are considered as factors which cause the residual sound.

a) The length of the spatial reverberation is longer than the frame length of the short-time Fourier transform (STFT).

b) The number of the sound sources is larger than the number of the microphones.

c) The space between microphones is narrow, and thus the interference sound is not removed at a low frequency.

In the sound source separation system using the real-time ICA, there is a trade-off between the reduction in the tracking lag and the reduction in the residual sound. The reason is that it is advantageous for the reduction in the tracking lag to shorten the learning time but the residual sound increases in accordance with the method therefor.

The computational cost for the learning of the ICA is in proportion to the frame length of the short-time Fourier transform (STFT), and the square of the number of channels (the number of microphones). Accordingly, when the value is set to be small, it is possible to shorten the learning time although the number of loops is the same. Hence, it is also possible to shorten the tracking lag.

However, the reduction in the frame length further deteriorates one of the factors causing the residual sound, that is, the factor a).

Further, the reduction in the number of microphones further deteriorates one of the factors causing the residual sound, that is, the factor b).

Accordingly, a process of shortening the frame length of the short-time Fourier transform (STFT) or a process of reducing the number of channels (the number of microphones) contributes to the reduction in the tracking lag, whereas a problem arises in that the residual sound tends to occur.

As described above, the reduction in tracking lag and the residual sound are in a relationship in which, if one is intended to be solved, the other deteriorates.

The residual sound 78 shown in FIG. 7 is naturally separated as the continuous sound being played, that is, a sound corresponding to the (b1) separation result 1. Hence, when the residual sound occurs, separation performance of components (the sudden sound 72 in the (b1) separation result 1), which are dominantly output on the channel, deteriorates.

On the other hand, when the above-mentioned "tracking lag" is large, the time, at which the accurate separation result of the sudden sound is obtained, is delayed. Specifically, there is an increase in the time period from the time t1, at which the sudden sound is generated, shown in FIG. 7 to the time t3 at which the sound corresponding to the sudden sound is separated on the channel corresponding to the sudden sound, that is, only in the b2) separation result 2.

There may be different selections as to which sound source of a plurality of sound sources it is desirable to acquire the sound from, depending on their purpose. Here, the sound to acquire the accurate separation result is referred to as a "target sound".

Depending on where between the continuous sound being played and the sudden sound the "target sound" is, it is preferable to perform a different process and a different setting.

The remaining one of the factors causing the residual sound is as follows.

c) Since the spaces between microphones are narrow, the interference sound is not removed at a low frequency.

This factor is irrespective of the real-time process. However, the problem can be solved by the configuration according to the embodiment of the invention, and will be thus described herein. In the ICA in the time frequency domain, when the spaces between the microphones are narrow (for example, about 2 to 3 cm), separation may not be sufficiently performed particularly at a low frequency. The reason is that it is difficult to obtain a sufficient phase difference in the spaces between the microphones. The separation accuracy at a low frequency can be improved by increasing the microphone spaces, whereas the separation accuracy at a high frequency is likely to be lowered by the phenomenon which is called spatial aliasing. Further, because of physical restriction, sometimes the microphones may not be installed with wide spaces.

The above-mentioned problems are summarized as follows.

(A) In the real-time ICA using the "blockwise processing" and the "shift application", the "tracking lag" or the "residual sound" is caused by the sudden sound, and thus the sound source separation may be not accurately performed.

(B) The methods of coping with the "tracking lag" and the "residual sound" for accurately performing the sound source separation are contrary to each other depending on whether the sudden sound is the target sound or the interference sound. Hence, it is difficult to solve the problem by using a single method.

(C) In the framework of the real-time ICA according to the related art, there may be a trade-off relationship between the reduction in the "tracking lag" and the cancellation of the "residual sound".

SUMMARY OF THE INVENTION

The embodiment of the invention has been made in consideration of the above-mentioned situation, and is addressed to provide a signal processing apparatus, a signal processing method, and a program capable of performing a high-accuracy separation process in units of the respective sound source signals as a real-time process with little delay by using the independent component analysis (ICA).

According to a first embodiment of the invention, there is provided a signal processing apparatus including a separation processing unit that generates observed signals in the time frequency domain by performing the short-time Fourier transform (STFT) on mixed signals as outputs, which are acquired from a plurality of sound sources by a plurality of sensors, and generates sound source separation results corresponding to the sound sources by performing a linear filtering process on the observed signals. The separation processing unit has a linear filtering process section that performs the linear filtering process on the observed signals so as to generate separated signals corresponding to the respective sound sources, an all-null spatial filtering section that applies an all-null spatial filter which form null beams toward all the sound sources included in the observed signals acquired by the plurality of sensors so as to generate signals filtered with the all-null spatial filters (spatially filtered signals) in which the acquired sounds in null directions are removed, and a frequency filtering section that performs a filtering process of removing signal components corresponding to the spatially filtered signals included in the separated signals by inputting the separated signals and the spatially filtered signals, thereby generating processing results of the frequency filtering section as the sound source separation results.

Further, the signal processing apparatus according to the first embodiment of the invention further includes a learning processing unit that finds separating matrices for separating the mixed signals, in which the outputs from the plurality of sound sources are mixed, through a learning process, which employs independent component analysis (ICA) to the observed signals generated from the mixed signals, and generates the all-null spatial filter which form null beams toward all the sound sources acquired from the observed signals. The linear filtering process section applies the separating matrices, which are generated by the learning processing unit, to the observed signals so as to separate the mixed signals and generate the separated signals corresponding to the respective sound sources. The all-null spatial filtering section applies the all-null spatial filters, which are generated by the learning processing unit, to the observed signals so as to generate the spatially filtered signals in which the acquired sounds in null directions are removed.

Furthermore, in the signal processing apparatus according to the first embodiment of the invention, the frequency filtering section performs the filtering process of removing signal components, which correspond to the spatially filtered signals included in the separated signals, through a process of subtracting the spatially filtered signals from the separated signals.

Further, in the signal processing apparatus according to the first embodiment of the invention, the frequency filtering section performs the filtering process of removing signal components, which correspond to the spatially filtered signals included in the separated signals, through a frequency filtering process based on a spectral subtraction which regards the spatially filtered signals as noise components.

Furthermore, in the signal processing apparatus according to the first embodiment of the invention, the learning processing unit performs a process of generating the separating matrices and the all-null spatial filters based on blockwise learning results by performing a learning process on a block-by-block basis for dividing the observed signals. In addition, the separation processing unit performs a process using the latest separating matrices and all-null spatial filters which are generated by the learning processing unit.

Further, in the signal processing apparatus according to the first embodiment of the invention, the frequency filtering section performs a process of changing a level of removal of components corresponding to the spatially filtered signals from the separated signals in accordance with a channel of separated signals.

Furthermore, in the signal processing apparatus according to the first embodiment of the invention, the frequency filtering section performs the process of changing the level of removal of components corresponding to the spatially filtered signals from the separated signals in accordance with a power ratio of the channels of the separated signals.

Further, in the signal processing apparatus according to the first embodiment of the invention, the separation processing unit generates the separating matrices and the all-null spatial filters subjected to a rescaling process as scale adjustment using a plurality of frames, which are data units cut out from the observed signals, including a frame corresponding to the current observed signals, and performs a process of applying the separating matrices and the all-null spatial filters subjected to the rescaling process to the observed signals.

According to a second embodiment of the invention, there is provided a signal processing method of performing a sound source separation process on a signal processing apparatus. The signal processing method includes a separation process step of generating observed signals in the time frequency domain by performing the short-time Fourier transform (STFT) on mixed signals as outputs, which are acquired from a plurality of sound sources by a plurality of sensors, and generating sound source separation results corresponding to the sound sources by performing a linear filtering process on the observed signals, in a separation processing unit. The separation process step includes a linear filtering process step of performing the linear filtering process on the observed signals so as to generate separated signals corresponding to the respective sound sources, an all-null spatial filtering step of applying all-null spatial filters which form null beams toward all the sound sources included in the observed signals acquired by the plurality of sensors so as to generate signals filtered with the all-null spatial filters (spatially filtered signals) in which acquired sounds in null directions are removed, and a frequency filtering step of performing a filtering process of removing signal components corresponding to the spatially filtered signals included in the separated signals by inputting the separated signals and the spatially filtered signals, thereby generating processing results of the frequency filtering step, as the sound source separation results.

According to a third embodiment of the invention, there is provided a program of performing a sound source separation process on a signal processing apparatus. The program executes a separation process step of generating observed signals in the time frequency domain by performing the short-time Fourier transform (STFT) on mixed signals as outputs, which are acquired from a plurality of sound sources by a plurality of sensors, and generating sound source separation results corresponding to the sound sources by performing a linear filtering process on the observed signals, in a separation processing unit. The separation process step includes a linear filtering process step of performing the linear filtering process on the observed signals so as to generate separated signals corresponding to the respective sound sources, an all-null spatial filtering step of applying an all-null spatial filter which form null beams toward all the sound sources included in the observed signals acquired by the plurality of sensors so as to generate signals filtered with the all-null spatial filters (spatially filtered signals) in which acquired sounds in null directions are removed, and a frequency filtering step of performing a filtering process of removing signal components corresponding to the spatially filtered signals included in the separated signals by inputting the separated signals and the spatially filtered signals, thereby generating processing results of the frequency filtering step, as the sound source separation results.

In addition, the program according to the embodiment of the invention is a program that can be provided to an information processing apparatus or a computer system capable of executing a various program codes, via a storage medium or communication medium that is provided in a computer-readable format. By providing such a program in a computer-readable format, processes corresponding to the program are realized on the information processing apparatus or the computer system.

Other purposes, features, and advantages of the embodiments of the invention will become apparent from the following detailed description based on embodiments of the invention and the accompanying drawings to be described later. In this specification, the system is defined as a logical assembly of a plurality of devices, and is not limited to a configuration in which the constituent devices are provided within the same casing.

In the configuration of the embodiment of the invention, the separating matrices for separating the mixed signals, in which the outputs from the plurality of sound sources are mixed, is obtained through the learning process, which employs independent component analysis (ICA) to the observed signals generated from the mixed signals, thereby generating the separated signals. In addition, the all-null spatial filters, which have a null in the sound sources detected as the observed signals, is applied to the observed signals, thereby generating the spatially filtered signal in which detected sounds are removed. Further, the filtering process of removing signal components corresponding to the spatially filtered signals included in the separated signals is performed, thereby generating the sound source separation results from results of the frequency filtering section. With such a configuration, it is possible to perform high-accuracy sound source separation on the mixed signals including the sudden sounds.

DESCRIPTION OF THE PREFERRED EMBODIMENTS

Figure 1:
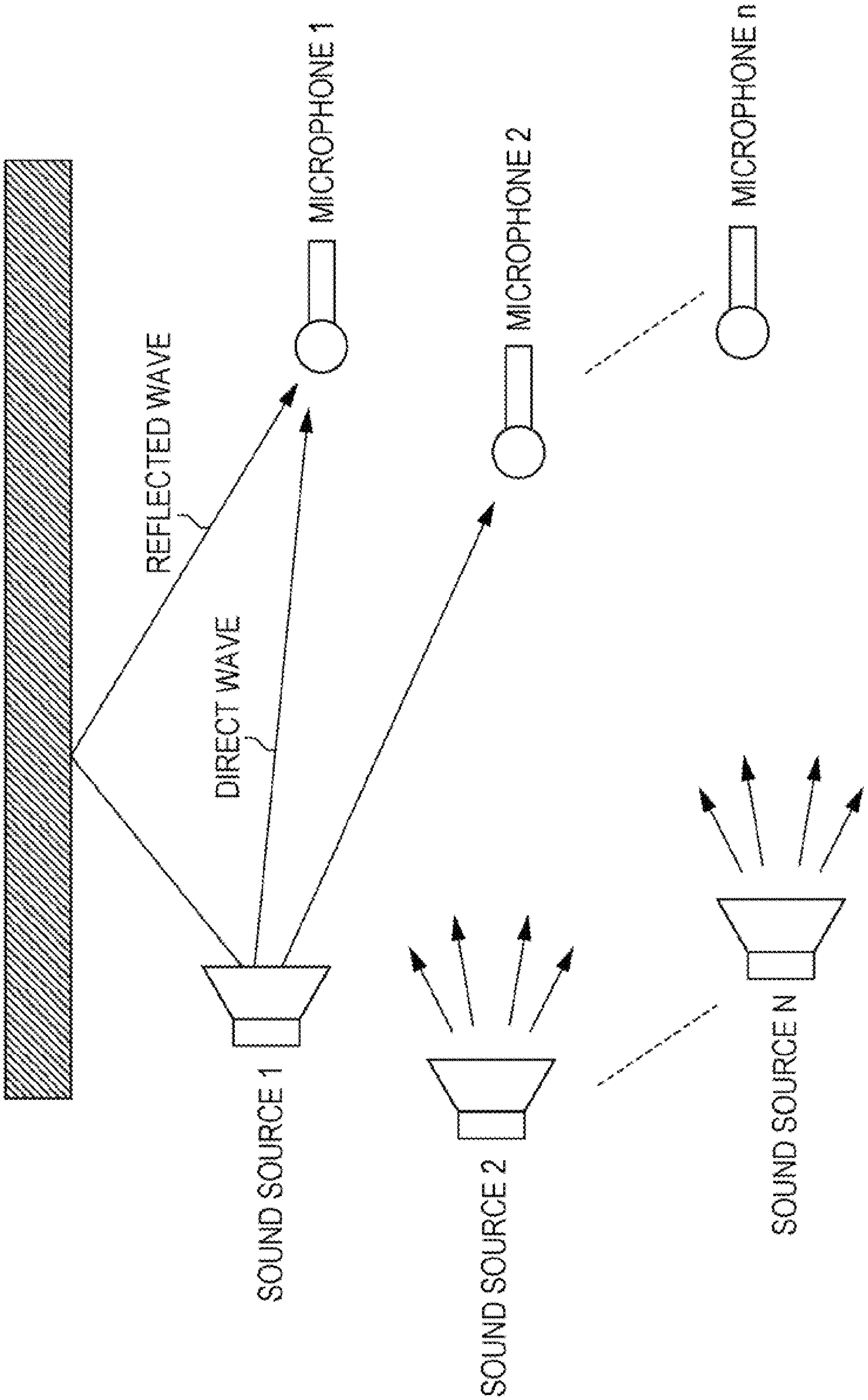
FIG. 1 is a diagram illustrating a situation in which different sounds are being played from N sound sources, and those sounds are observed at n microphones.
Figure 2A:
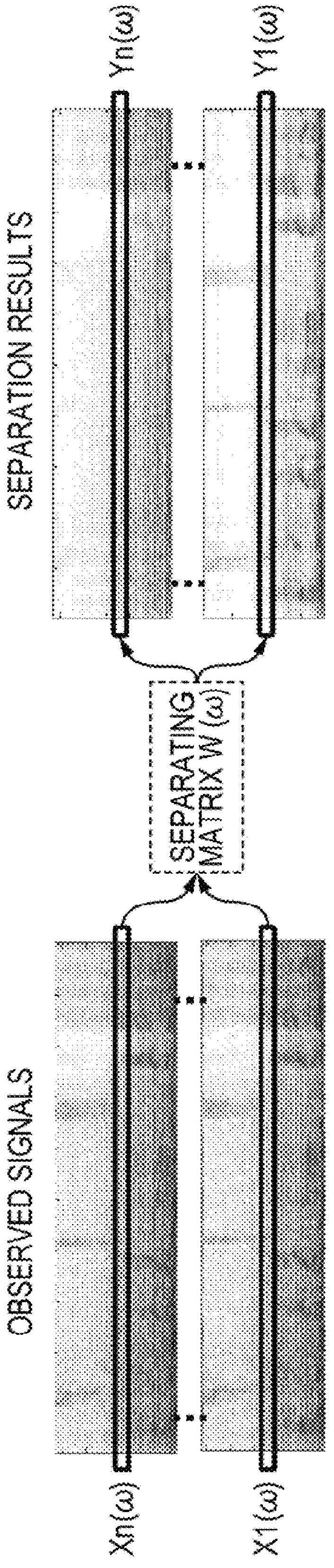
FIGS. 2A and 2B are diagrams respectively illustrating separation in a frequency bin (FIG. 2A), and a separation process in all frequency bins (FIG. 2B)
Figure 2B:
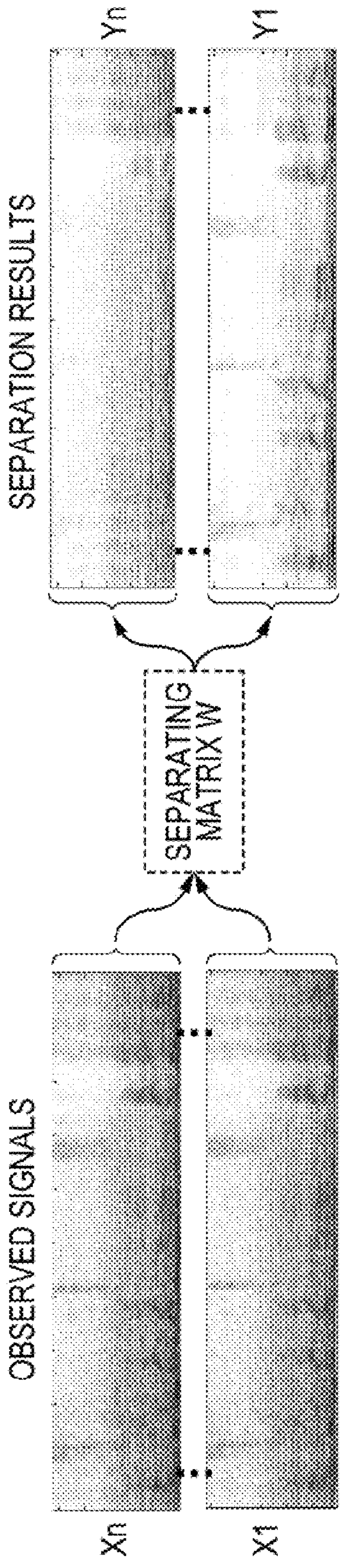
Figure 3:
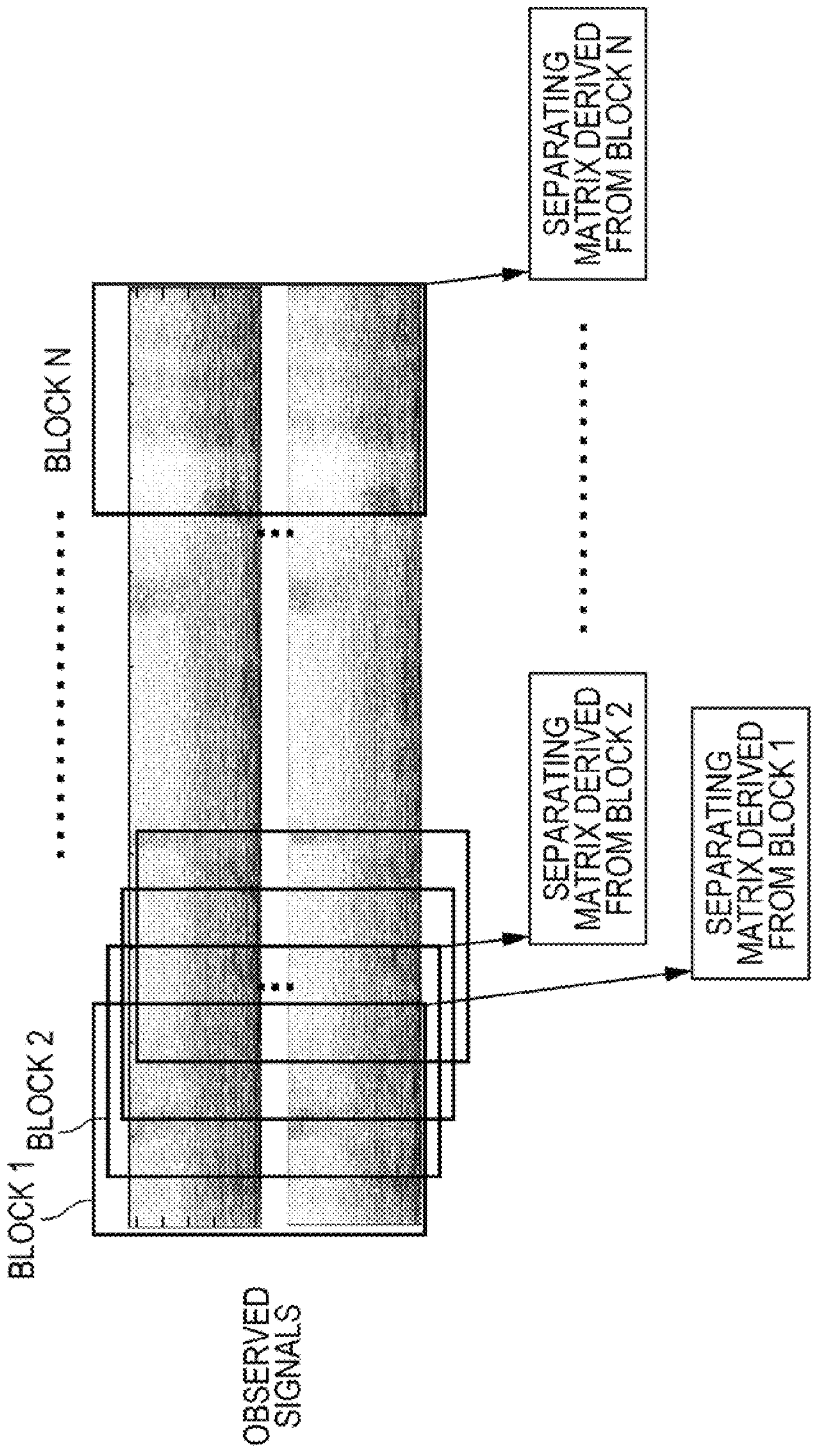
FIG. 3 is a diagram illustrating a processing example in which observed signal spectrograms are split into a plurality of overlapped blocks 1 to N, and learning is performed for each block to find a separating matrix.

Hereinafter, a signal processing apparatus, a signal processing method, and a program according to an embodiment of the invention will be described in detail with reference to the drawings. Description will be given in order of the following items.

1. Configuration of Embodiment of the Invention and Brief Overview of Processing 2. Specific Examples of Signal Processing Apparatus of Embodiment of the Invention 3. Sound Source Separation Process Executed in Signal Processing Apparatus according to Embodiment of the Invention 3-1. Entire Sequence 3-2. Initialization Process 3-3. Thread Control Process 3-4. Separation Process 4. Processing in Learning Thread in Thread Computation Section 5. Other Examples (Modified Examples) of Signal Processing Apparatus of Embodiment of the Invention 6. Overview of Advantages based on Configuration of Signal Processing Apparatus according to Embodiment of the Invention

1. Configuration of Embodiment of the Invention and Brief Overview of Processing First, a configuration of an embodiment of the invention and a brief overview of processing will be described.

In the embodiment of the invention, processing of separating signals, in which a plurality of signals is mixed, is performed by using independent component analysis (ICA). However, as described above, when the sound source separation process is performed by using the separating matrix generated on the basis of the preceding observation data, a problem arises in that it is difficult to separate the sudden sound. In the embodiment of the invention, in order to solve the problem relating to, for example, the sudden sound, there is provided a configuration in which the following constituents are newly added to, for example, the real-time ICA system according to the related art disclosed in the patent application (Japanese Unexamined Patent Application Publication No. 2008-147920) previously filed by the present applicant.

(1) A configuration in which, in order to cope with the problem of distortion of the sudden sound, rescaling (processing of making the balance between frequencies close to the source signal) of the separation results is performed on a frame-by-frame basis.

It should be noted that the processing is referred to as “frequent rescaling”.

(2) A configuration in which, in order to remove the sudden sound, a filter (hereinafter referred to as an “all-null spatial filter”), which directs a null to all detected sound source directions, is generated from the same segment as the learning data of ICA. Further, a configuration in which processing corresponding to frequency filtering or the frequency filtering is performed between the result obtained by applying the separation results of ICA to the observed signals and the result obtained by applying the all-null spatial filter to the same observed signals.

It should be noted that the processing configuration is referred to as “all-null spatial filter & frequency filtering”.

(3) A configuration in which, in order to perform different processes in accordance with characteristics of the sudden sound, it is determined whether the respective output channels of ICA output the signals corresponding to the sound sources, and one of the processes is performed depending on the result thereof.

i) If it is determined that the signals corresponds to the sound sources, both the “frequent rescaling” and the “all-null spatial filter & frequency filtering” are applied.

As a result, the sudden sound is removed from the channels.

ii) If it is determined that the signals does not correspond to the sound sources, only the “frequent rescaling” is applied. As a result, the sudden sound is output from the channels.

It should be noted that the processing configuration is referred to as “determination for individual channels”.

Hereinafter, first, a brief overview will be given of (1) to (3) described above.

(1) Frequent Rescaling

In Japanese Unexamined Patent Application Publication No. 2008-147920 which is the patent application previously filed by the present applicant, the rescaling is performed on the separating matrix at the time of the end of the learning.

Figure 5:
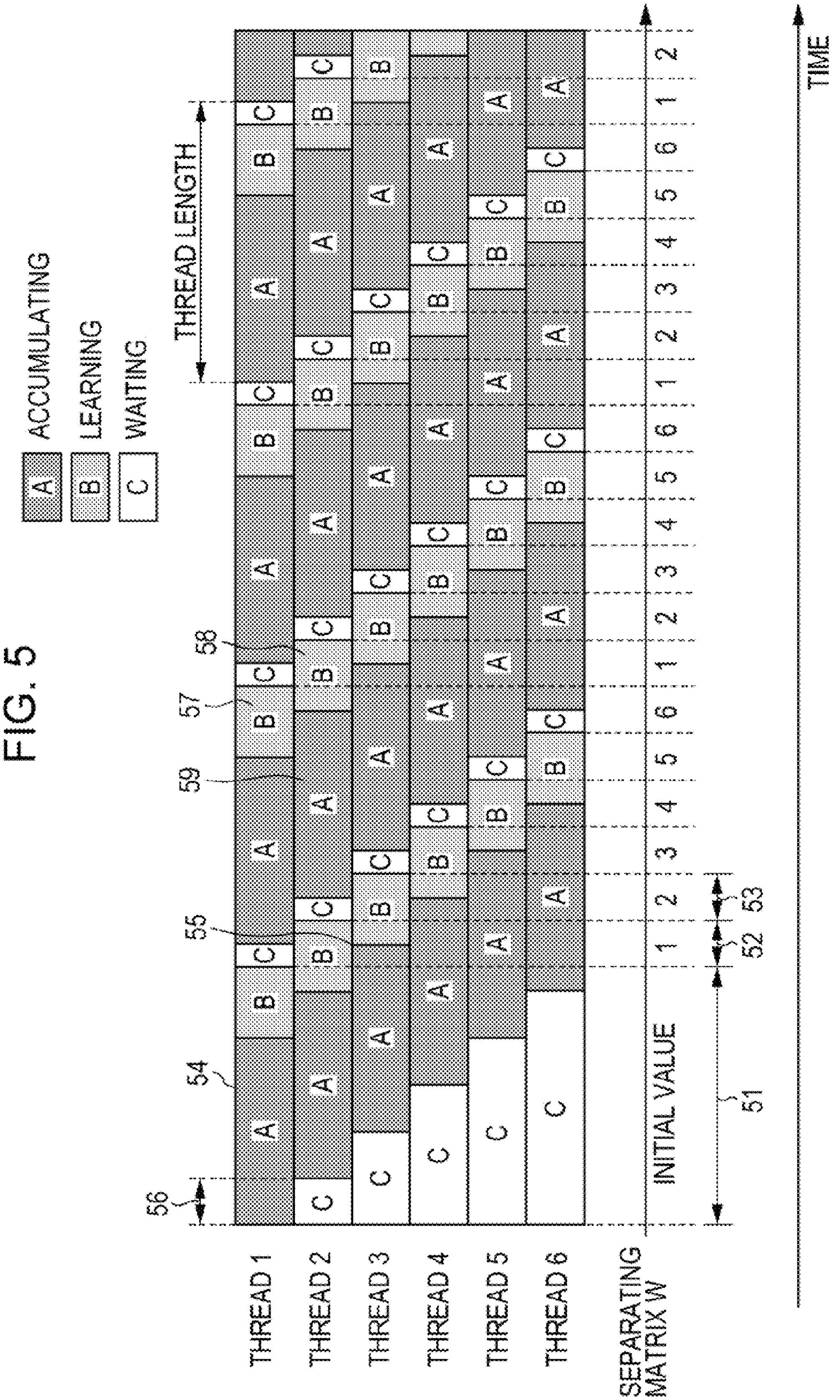
FIG. 5 is a diagram illustrating a method in which a plurality of processing units each called a thread for obtaining a separating matrix from overlapped blocks are run in parallel per unit time shifts.
Figure 6:
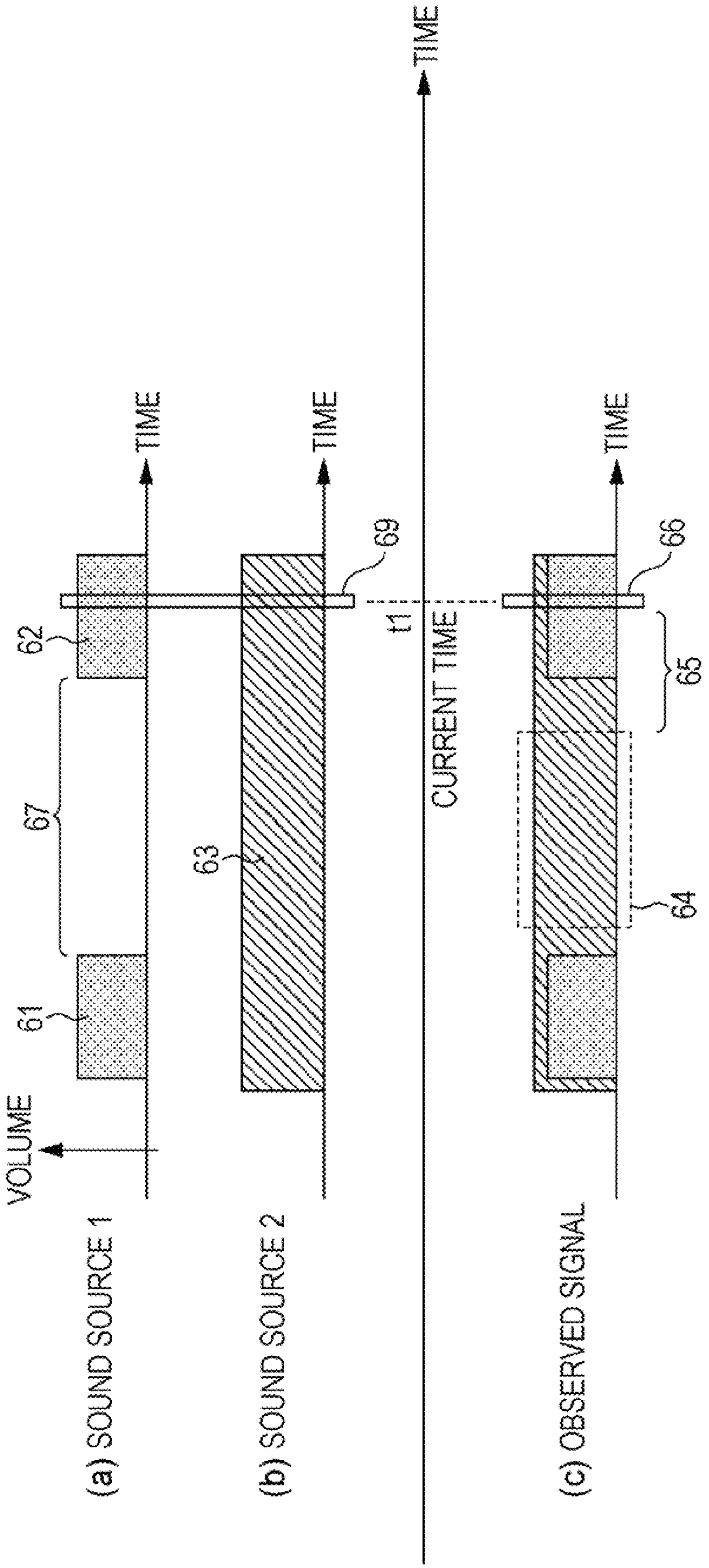
FIG. 6 is a diagram illustrating a correspondence relationship between generation of a sudden sound and the observed signal.

Referring to FIG. 5, the process of rescaling the separating matrix will be described.

For example, when the learning of the learning segment 58 of the thread 2 shown in FIG. 5 is ended, the scale (the balance between frequencies) of the separating matrix is determined on the basis of the learning data 59, and then the scale stays constant until the separating matrix is updated next. In this case, the outputs of the sound sources included in the learning data 59 are generated by a correct scale thereof, but the outputs of other sound sources (that is, the sudden sound) are generated by an incorrect scale.

Accordingly, in the embodiment of the invention, the rescaling (the processing of making the balance between frequencies close to the original sound) is performed on frame-by-frame basis, thereby reducing distortion of the sudden sound). The frame-based rescaling process will be described with reference to FIG. 8.

Figure 4:
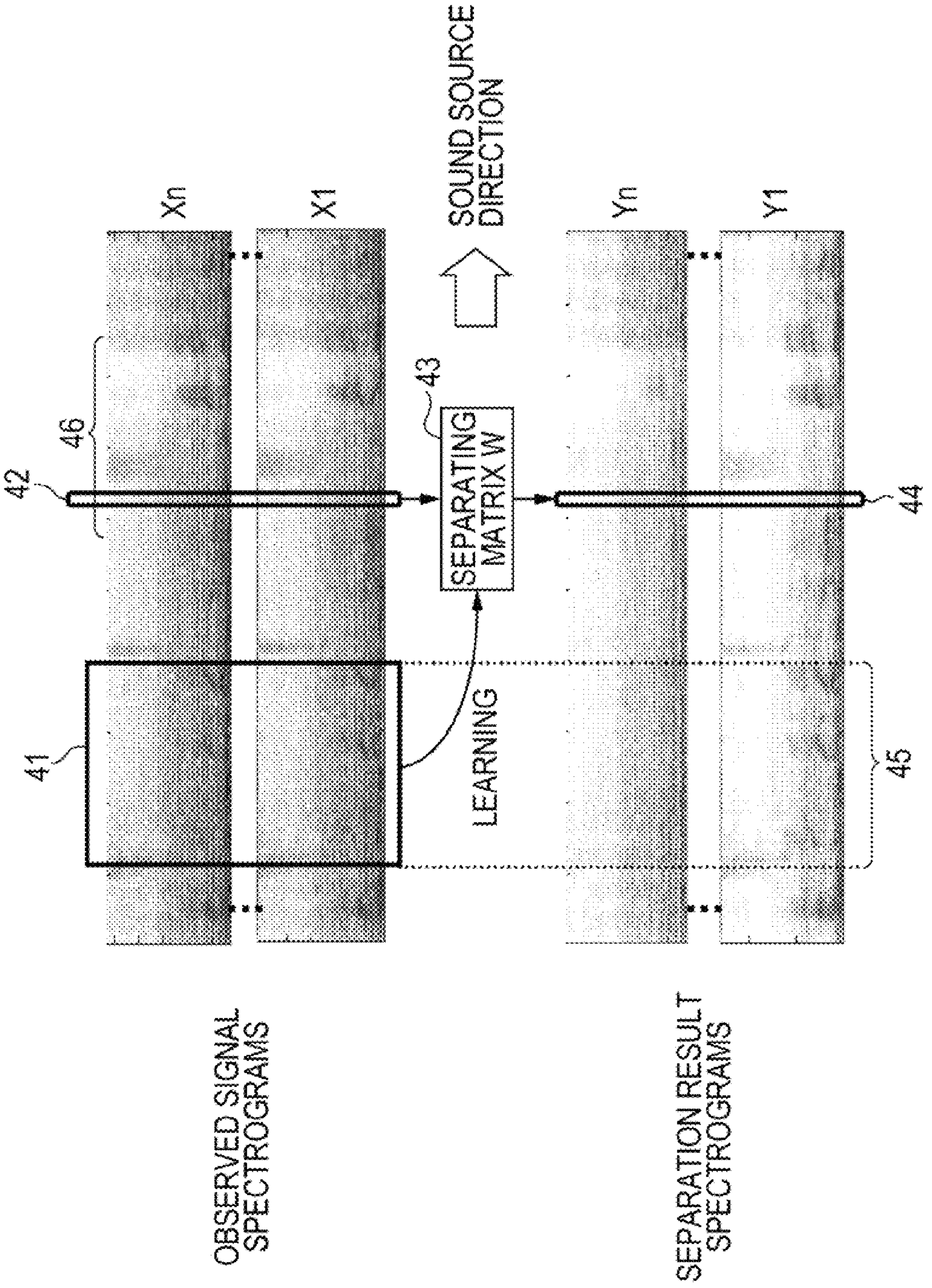
FIG. 4 is a diagram illustrating "shift application" which applies a separating matrix found from each block to subsequent observed signals.
Figure 8:
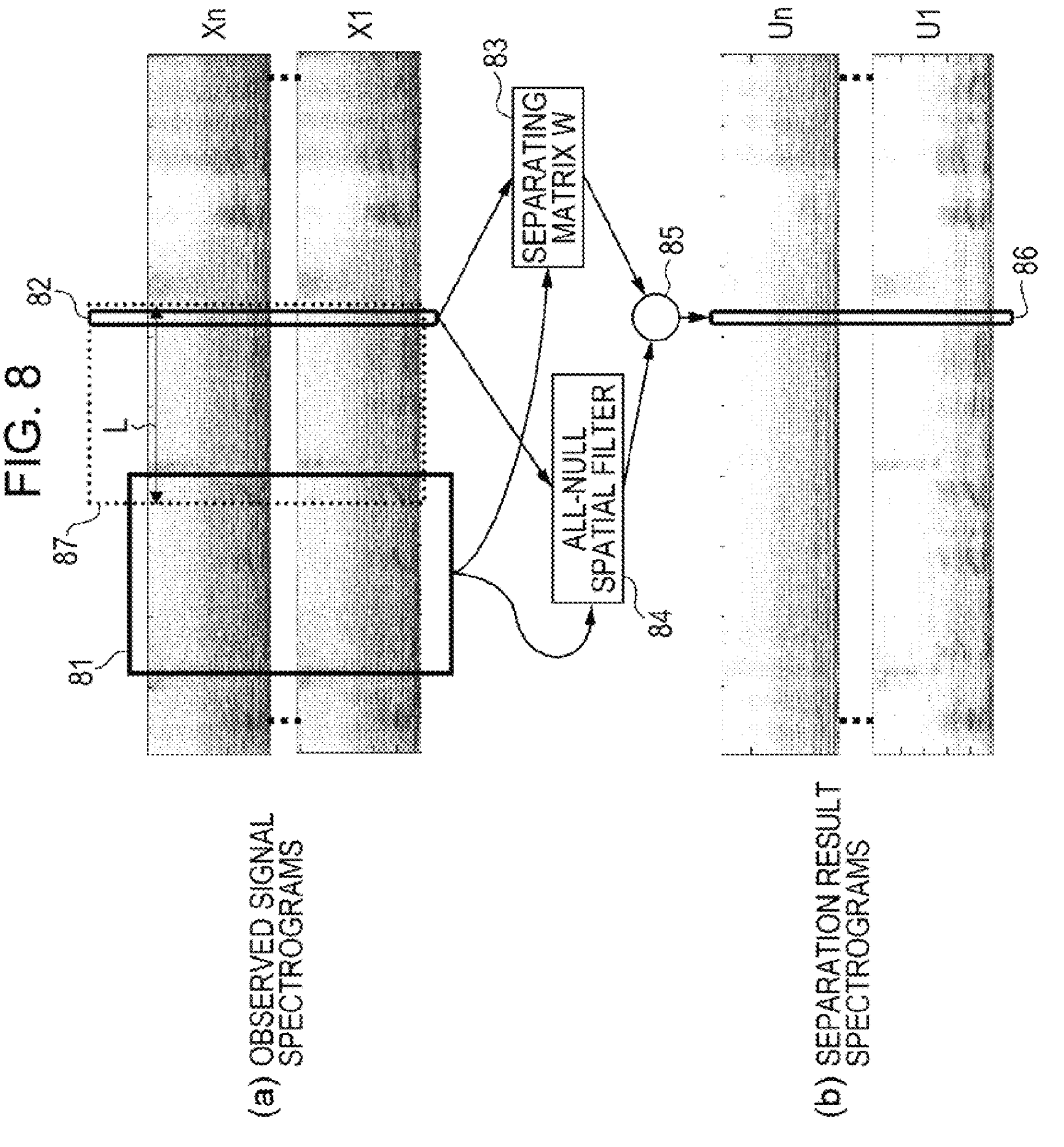
FIG. 8 is a diagram illustrating a frame-based rescaling process.

FIG. 8, in the same manner as shown in FIG. 4 described above, shows the following data.

FIG. 8(*a*) Observed Signal Spectrogram

FIG. 8(*b*) Separation Result Spectrogram

The learning data block 81 shown in FIG. 8 corresponds to the learning data block 41 shown in FIG. 4.

The observed signal 82 at the current time shown in FIG. 8 corresponds to the observed signals 42 at the current time shown in FIG. 4.

The separating matrix 83 shown in FIG. 8 corresponds to the separating matrix 43 shown in FIG. 4. The separating matrix 83 shown in FIG. 8 is a separating matrix obtained from the learning data block 81.

The rescaling in the related art had been performed by using the learning data of the learning data block 81. In contrast, in the processing according to the embodiment of the invention described below, the block, of which the end is the current time, with a regular length, that is, the block 87 including the current time shown in FIG. 8 is set, thereby performing the rescaling by using the observed signals in the segment of the block 87 including the current time. The detailed expression of the rescaling will be described later. By performing the rescaling process, it is also possible to adjust the scale (=reduce the distortion thereof) for the sudden sound at an early stage.

(2) All-Null Spatial Filter & Frequency Filtering

Next, the "all-null spatial filter & frequency filtering" process, which is a process effective for removing the sudden sound, will be described with reference to FIG. 8. The "learning data block 81" shown in FIG. 8 is the same as the learning data block 41 shown in FIG. 4. In the related art, only the separating matrix 83 (the same as the separating matrix 43 in FIG. 4) is generated from the data. In contrast, in the embodiment of the invention, not only the separating matrix 83 shown in FIG. 8 but also an all-null spatial filter 84 is generated from the same data (the learning data block 81). A method of generating the all-null spatial filter 84 will be described later.

The all-null spatial filter 84 is a filter (a vector or a matrix) which form null beams toward all the sound sources existing in the segment of the learning data block 81, and has a function of passing only the sudden sound, that is, the sound in the direction from which sound had not been played in the learning data block 81. The reason is that the sound which had been played in the learning data block 81 is removed by the null, which is formed by the all-null spatial filter 84, as long as the sound keeps playing without changing its position, whereas the null is not formed in the direction of the sudden sound and thus the sudden sound is passed.

On the other hand, the separating matrix 83 passes the sudden sound. The results differ in accordance with the output channels. Thus, on a certain channel, the sudden sound is superimposed upon the sound source which has been output up to that time (the (b1) separation result 1 in FIG. 7). In addition, on other channels, only the sudden sound is output (the (b2) separation result 2, and the (b3) separation result 3 in FIG. 7).

Figure 7:
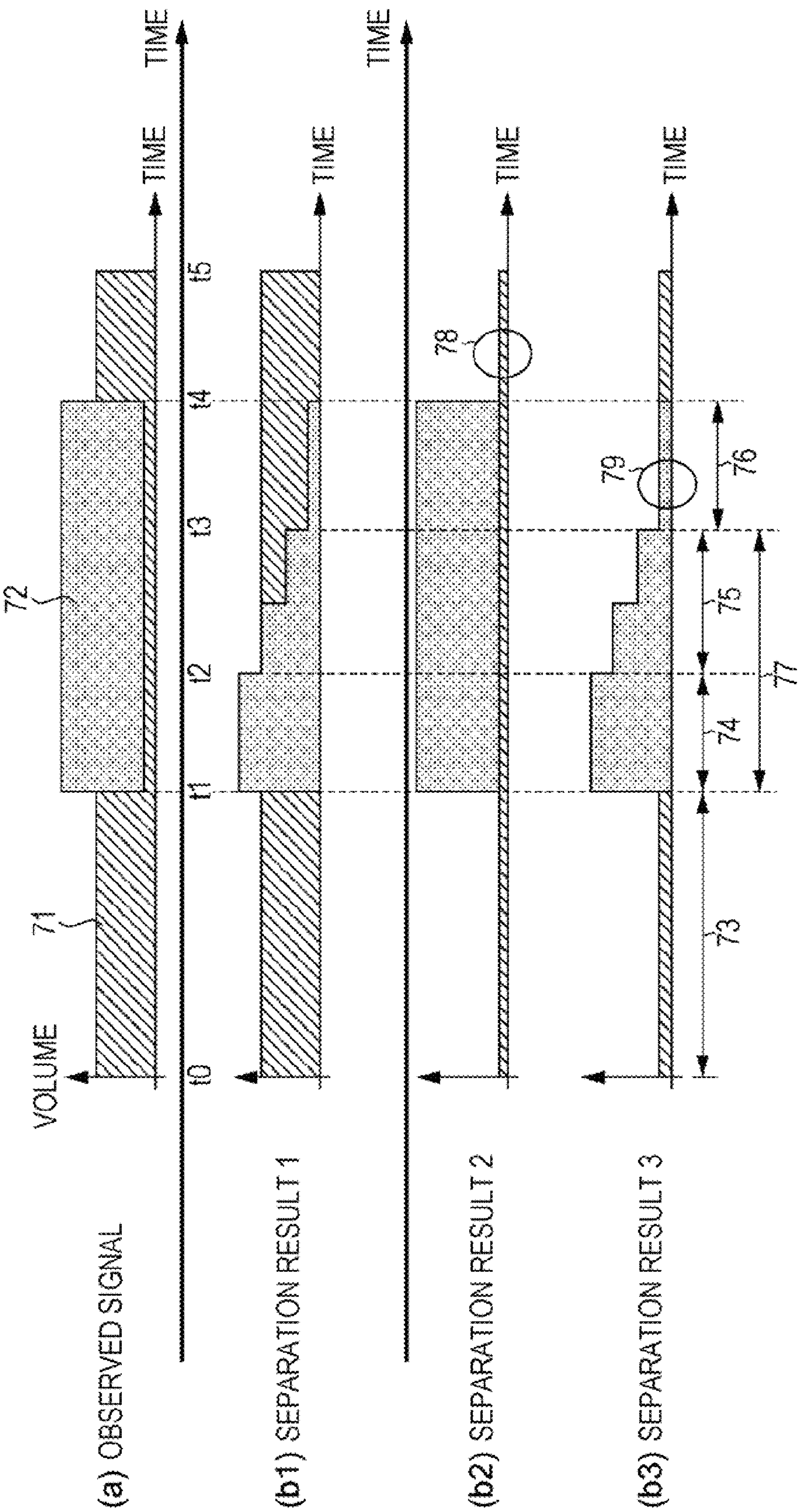
FIG. 7 is a diagram illustrating an effect of sudden sound generation on separation results, particularly, a tracking lag.

Here, the result of the all-null spatial filter is subtracted (or is subjected to an operation similar thereto) from the same result as the (b1) separation result 1 shown in FIG. 7. Then, the sudden sound is canceled, and only the output corresponding to the sound source remains. The processing sequence thereof will be described with reference to FIG. 9.

Figure 9:
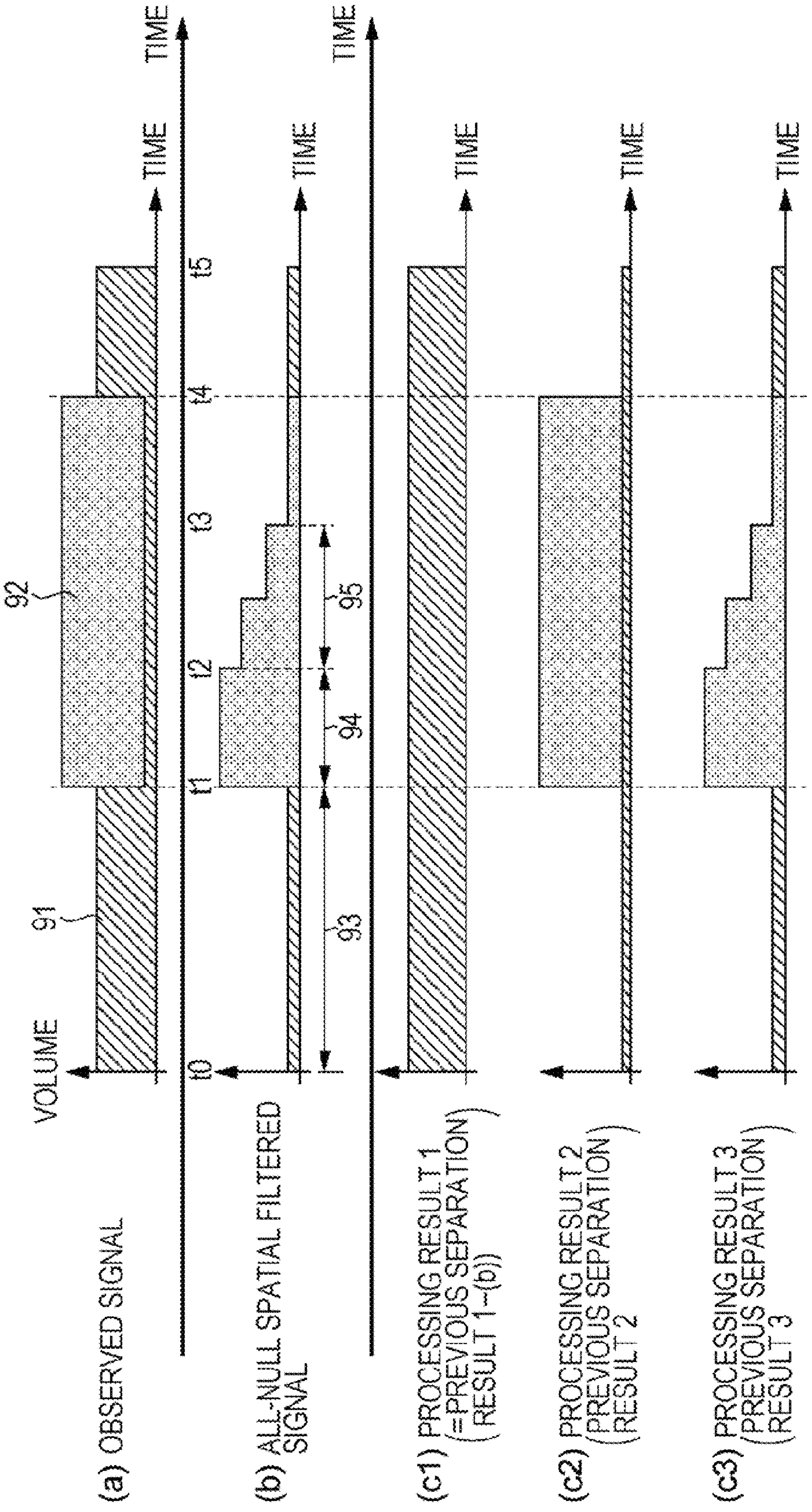
FIG. 9 is a diagram illustrating a process of reserving only the sound source correspondence output, for example, by subtracting the result of the all-null spatial filter from the (b1) separation result 1 shown in FIG. 7 so as to cancel the sudden sound.

FIG. 9 shows the following signals:

(a) observed signal;

(b) signal filtered with all-null spatial filter;

(c1) processing result 1;

(c2) processing result 2; and (c3) processing result 3.

Time (t) progresses from left to right, and the height of each block represents a volume thereof.

The (a) observed signal is the same as the (a) observed signal in FIG. 7 described above. The observed signal includes the continuous sound 91 which is continuously played in the range of the time t0 to t5 and the sudden sound 92 which is output only in the range of the time t1 to t4.

When the all-null spatial filter is applied to the (a) observed signal shown in FIG. 9, it is possible to obtain the (b) signal filtered with all-null spatial filter. That is, the continuous sound 91 being played is almost removed, whereas the start portion of the sudden sound 92 remains without being removed.

In the range of the time t0 to t5, the continuous sound 91 being played is almost removed from the (b) signal filtered with all-null spatial filter. On the other hand, the start portion (from the time t1) of the sudden sound 92 remains without being removed. In the segment 94 from the time t1 to t2, the sudden sound 92 is scarcely removed.

The reason is that the all-null spatial filter has a function of removing the sound source included in the temporally preceding observed signal, but the sudden sound 92 is not included in the observed signal just prior to the segment 94 from the time t1 to t2, and is not removed by the all-null spatial filter.

The (b) signal filtered with all-null spatial filter shown in FIG. 9 is subtracted from the (b1) separation result 1 in FIG. 7 which is one of the separating-matrix application results. Then, it is possible to obtain a result in which the sudden sound is removed and only the continuous sound 91 being played remains. The result is a signal of the (c1) processing result 1 in FIG. 9. That is, the (c1) processing result 1 in FIG. 9 is a signal which can be obtained from the following computation result based on the (b1) separated signal in FIG. 7 and the (b) signal filtered with all-null spatial filter in FIG. 9.

Processing result 1=(separation result 1)−(signal filtered with all-null spatial filter)

In addition, in order to completely remove the sudden sound at the time of the subtraction, it is necessary to adjust the scale of the all-null spatial filtering result to the scale of the sudden sound which is included in the separating-matrix application result. This is referred to as "rescaling of the all-null spatial filter". In addition, the rescaling process is performed as a process of adjusting the scale (the range of signal fluctuation) of one signal to that of another signal. In this case, the rescaling process is performed as a process of making the scale of the all-null spatial filtering result close to the scale of the sudden sound which is included in the separating-matrix application result. Since it is necessary to adjust the scales for each output channel of ICA, the all-null spatial filtering result obtained after rescaling is the same as the number of channels of ICA (the number of channels of the all-null spatial filtering result obtained before rescaling is 1).

The "subtraction" may be normal subtraction (subtraction in a complex number region), but the process of so-called 2-channel frequency filtering may be used by generalization.

Figure 10:
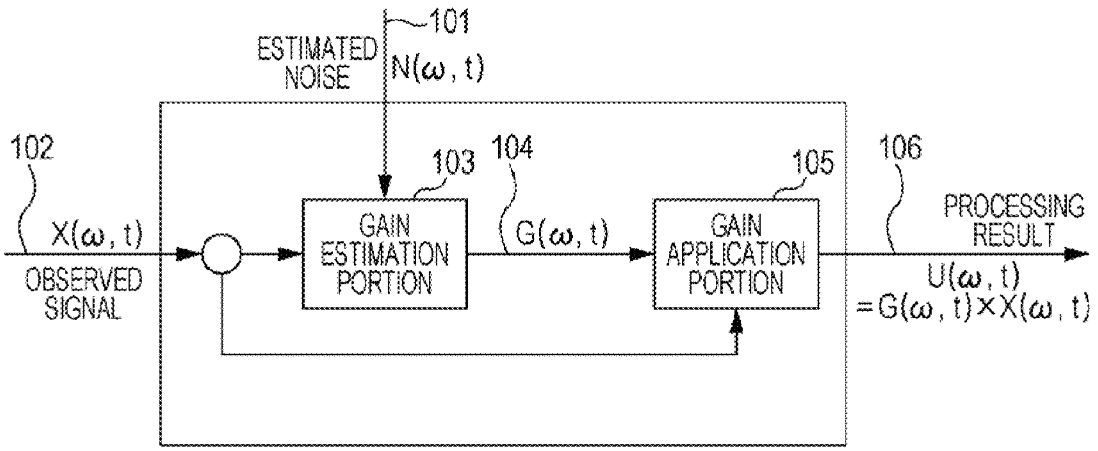
FIG. 10 is a diagram illustrating a 2-channel frequency filtering.

The 2-channel frequency filtering will be described with reference to FIG. 10.

Generally, the 2-channel frequency filtering is provided with two inputs.

Suppose that one is the observed signal 102 [X(ω,t)], and another one is the estimated noise 101 [N(ω,t)].

Those are signals with the same time and frequency.

From the two signals, the gain 104 (the factor multiplied to the observed signal) [G(ω,t)] is calculated by the gain estimation portion 103, and the gain is multiplied to the observed signal by the gain application portion 105, thereby obtaining the processing result 106. The processing result U(ω,t) is represented by the following expression.

$$U(\omega,t)=G(\omega,t)\times X(\omega,t)$$

Specifically, at the frequency in which noise is dominant, the gain is set to be small, and at the frequency in which noise is low, the gain is set to be large, thereby generating a noise-removed signal. The normal subtraction can be also regarded as a kind of the frequency filtering, but other than that, it is possible to apply the known method such as the spectral subtraction (spectral subtraction) or the Minimum Mean Square Error (MMSE)•Wiener Filter Joint MAP.

Figure 11:
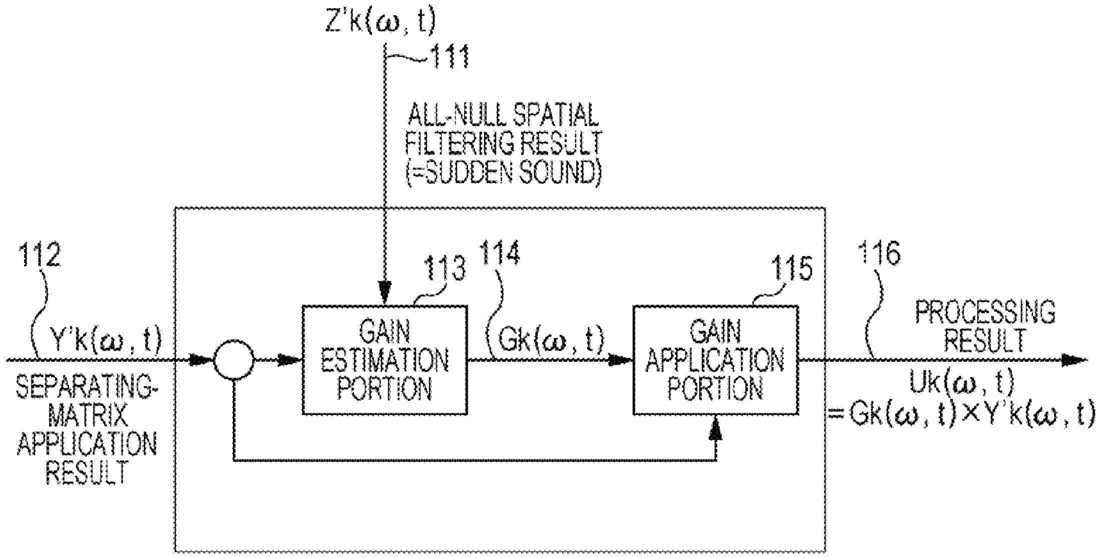
FIG. 11 is a diagram illustrating the details of the 2-channel frequency filtering process according to an embodiment of the invention.

The details of the 2-channel frequency filtering process according to the embodiment of the invention will be described with reference to FIG. 11. In the process according to the embodiment of the invention, as an input of the observed signal, the separating-matrix application result 112, that is, $$Y'k(\omega,t)$$

is input.

In addition, as an input of the estimated noise, the all-null spatial filtering result (after rescaling) 111 which is the sudden sound, that is, $$Z'k(\omega,t)$$

is input.

The gain estimation portion 113 inputs the all-null spatial filtering result 111 and the separating-matrix application result 112, thereby finding the gain 114 [Gk(ω,t)]. The gain application portion 115 multiplies the gain 114 [Gk(ω,t)] by the separating-matrix application result 112, that is, Y'k(ω,t), thereby finding Uk(ω,t) as the result in which the sudden sound is removed. The processing result Uk(ω,t) is represented by the following expression.

$$Uk(\omega,t)=Gk(\omega,t)\times Y'k(\omega,t)$$

In addition, if a non-linear method such as spectral subtraction is used in the frequency filtering, it is also possible to remove the "residual sound" described in the section of "Description of the Related Art". That is, since it is difficult to remove the "residual sound" even by using the separating matrix and the all-null spatial filter, by subtracting the respective results from each other, the residual sound is canceled. Hence, it is possible to solve the problem in the trade-off between the tracking lag and the residual sound.

(3) Determination of Individual Channels

When the above-mentioned "all-null spatial filter & frequency filtering" process is applied to all channels, in a certain case, this causes more trouble. The case is that the sudden sound is the target sound. For example, in FIG. 7, since only the sudden sound is output in the (b2) separation result 2, when the channel is subjected to subtraction with the (b) signal filtered with all-null spatial filter shown in FIG. 9, the start portion (the segment 74 from the time t1 to t2 shown in FIG. 7) of the sudden sound is removed, and no sound is output. In cases where the sudden sound is the interference sound, there is no problem even in the process, but in the case where the sudden sound is the target sound, it is not preferable to apply the process thereto.

Accordingly, on the basis of the following criterion, it is determined whether or not the "all-null spatial filter & frequency filtering" is applied, for each channel. Alternatively, the level of the frequency filtering is changed for each channel. In such a manner, it is possible to simultaneously achieve both the channels on which only the sound being played (the sound that has been played from the time before the sudden sound is generated) is output and the channel on which only the sudden sound is output.

Whether or not the "all-null spatial filter & frequency filtering" is applied to a certain channel, that is, whether or not it is preferred to remove the sudden sound depends on whether the signal corresponding to the sound source is being output from the channel just before the sudden sound is generated. If the signal corresponding to the sound source is already output, the frequency filtering is performed (or the amount of the subtraction is set to be large). In contrast, if the signal is not output, the frequency filtering is skipped (or the amount of the subtraction is set to be small).

For example, in FIG. 7, focusing on the segment 73 from time t0 to t1 just prior to the generation of the sudden sound 72, the signal corresponding to the continuous sound 71 of the sound source is output on the channel of the (b1) separation result 1. This channel is subjected to the application of the all-null spatial filter and frequency filtering. Thereby, even when the sudden sound is generated, the sudden sound is removed, and only the signal derived from the continuous sound 71 is continuously output.

The result corresponds to the (c1) processing result 1 in FIG. 9.

On the other hand, in the segment 73 from time t0 to t1 in the (b2) separation result 2 and the (b3) separation result 3 shown in FIG. 7 as another channel, the component derived from the continuous sound 71 is removed, and the almost-silent signal is output. This channel is not subjected to the application of the frequency filtering. That is, the result is the (c2) processing result 2 and the (c3) processing result 3 of FIG. 9. Thus, the channel is subjected to only the application of the frequent rescaling. As described above, the "frequent rescaling" is defined as processing (the processing of making the balance between frequencies close to the source signal) of rescaling the separation results on frame-by-frame basis.

By performing the processing, the signal, which is produced from only the sudden sound when the sudden sound is generated, is output. Also in this case, the frequent rescaling is performed for each frame, and thus contrary to the method according to the related art, the distortion of the start portion of the sudden sound is reduced.

Whether or not the respective outputs (the application result of the separating matrix) of ICA correspond to the sound sources depends on the separating matrix. Accordingly, it is not necessary to perform the determination for each frame, and it is preferable to perform the determination at the timing at which the separating matrix is updated. The detailed criterion for the determination will be described later.

In addition, when the determination is performed on the basis of two choices as to whether "the frequency filtering is applied or not", the processing result is greatly changed at the time of changing the application status. In order to prevent the phenomenon mentioned above, it is preferable to perform a process of continuously changing the level of the application of the frequency filtering (the amount of the subtraction) in accordance with continuous values representing whether or not the outputs of ICA correspond to the sound sources. Detailed description thereof will be described later.

Figure 12:
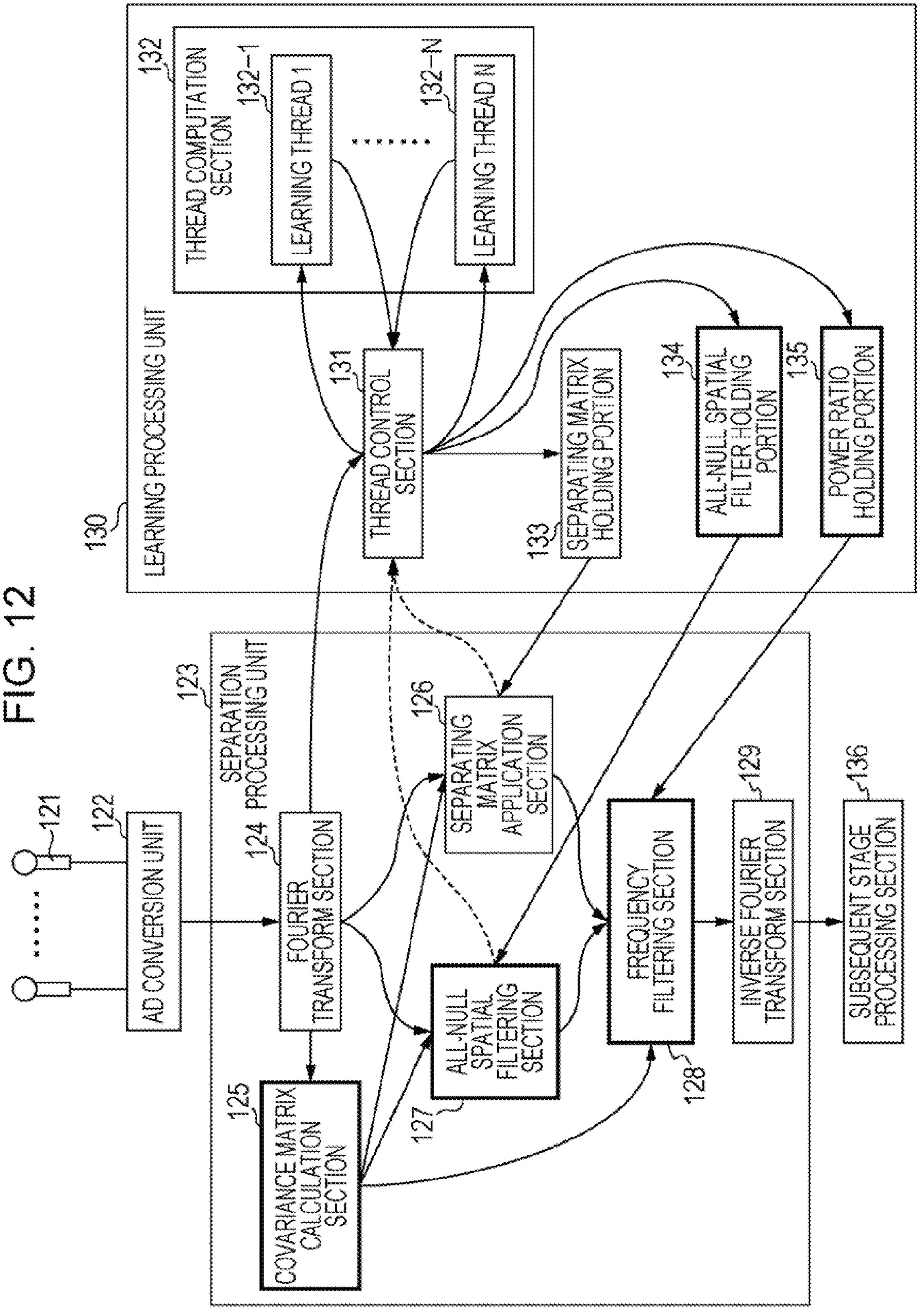
FIG. 12 is a diagram illustrating a configuration example of a signal processing apparatus according to the embodiment of the invention.

2. Specific Examples of Signal Processing Apparatus of Embodiment of the Invention Hereinafter, the specific examples of the signal processing apparatus according to the embodiment of the invention will be described. A configuration example of the signal processing apparatus according to the embodiment of the invention is shown in FIG. 12. The apparatus configuration shown in FIG. 12 is based on Japanese Unexamined Patent Application Publication No. 2008-147920 "Real-Time Sound Source Separation Apparatus and Method" previously filed by the present applicant. The following elements are added to the configuration disclosed in Japanese Unexamined Patent Application Publication No. 2008-147920: a covariance matrix calculation section 125 which is a module for the all-null spatial filter and frequency filtering; an all-null spatial filtering section 127; a frequency filtering section 128; an all-null spatial filter holding portion 134; and a power ratio holding portion 135. The signal processing apparatus shown in FIG. 12 can be specifically implemented by, for example, a PC. That is, respective processes in the signal processing apparatus shown in FIG. 12 can be executed by, for example, a CPU which executes processes based on a prescribed program.

The separation processing unit 123 shown on the left side of FIG. 12 mainly performs separation of observed signals. The learning processing unit 130 shown on the right side of FIG. 12 mainly performs learning of the separating matrix. Specifically, the learning processing unit 130 performs generation of the separating matrix, generation of the all-null spatial filter, calculation of the power ratio, and the like. The all-null spatial filter is, as described above, a filter (a vector or a matrix) which form null beams toward all the sound sources detected in the learning data block segment, and has a function of passing only the sudden sound, that is, the sound in the direction from which sound had not been played in the learning data block. In addition, the power ratio is defined as information on a proportion of powers (volumes) of the sounds on the respective channels.

In addition, the process in the separation processing unit 123, and the process in the learning processing unit 130 are performed in parallel. The process in the separation processing unit 123 is a foreground process, and the process in the learning processing unit 130 is a background process.

From the perspective of the system as a whole, the separation processing unit 123 performs the sound source separation process on the observed signals for each frame so as to generate the separation results, while appropriately replacing the separating matrix and the all-null spatial filter, which are applied to the separation process, with the latest one. The learning processing unit 130 provides the separating matrix and the all-null spatial filter, and the separation processing unit 123 applies the separating matrix and the all-null spatial filter which are provided from the learning processing unit 130, thereby performing the sound source separation process.

In the three elements added to the configuration according to the embodiment of the invention, the generation of the all-null spatial filter is performed as a background process in the learning processing unit 130 in the same manner as the learning of the separating matrix. However, the frequent rescaling for the separating matrix and all-null spatial filter, the application of those to the observed signals, the frequency filtering, and the like are performed as foreground processes in the separation processing unit 123.

Hereinafter, processes of individual components will be described.

Sounds recorded by a plurality of microphones 121 are converted into digital signals by an AD conversion unit 122, and then sent to a Fourier transform section 124 of the separation processing unit 123. In the Fourier transform section 124, the digital signals are transformed into frequency-domain data by a windowed short-time Fourier transform (STFT) (details of which will be given later). At this time, a predetermined number of pieces of data called frames are generated. Subsequent processes are performed in units of the frames. The Fourier transformed data is sent to each of the covariance matrix calculation section 125, a separating matrix application section 126, the all-null spatial filtering section 127, and a thread control section 131.

Hereinafter, first, the flow of the signals in the foreground process in the separation processing unit 123 will be described. Then, the process of the learning processing unit 130 will be described.

The covariance matrix calculation section 125 of the separation processing unit 123 inputs the Fourier transform data of the observed signals generated by the Fourier transform section 124, thereby calculating the covariance matrices of the observed signals for each frame. The details of the calculation will be described later. The covariance matrices obtained herein are used to perform the rescaling for each frame in each of the separating matrix application section 126 and all-null spatial filtering section 127. In addition, the degree of the application of the frequency filtering to the frequency filtering section 128 is used as a criterion for determination.

In the separating matrix application section 126, the rescaling is performed on the separating matrix which was obtained in the learning processing unit 130 before the current time, that is, the separating matrix which is held in the separating matrix holding portion 133. Subsequently, the observed signals corresponding to one frame are multiplied by the rescaled separating matrix, thereby generating the separating-matrix application result corresponding to one frame.

In the all-null spatial filtering section 127, the rescaling is performed on the all-null spatial filter which was obtained in the learning processing unit 130 before the current time, that is, the all-null spatial filter which is held in the all-null spatial filter holding portion 134. Then, the observed signals corresponding to one frame are multiplied by the rescaled all-null spatial filter, thereby generating the all-null spatial filtering result corresponding to one frame.

The frequency filtering section 128 receives the result of the application of the separating matrix to the Fourier transform data based on the observed signals from the separating matrix application section 126, while receiving the result of the application of the all-null spatial filter to the Fourier transform data based on the observed signals from the all-null spatial filtering section 127. On the basis of both application results, the frequency filtering section 128 performs the 2-channel frequency filtering described above with reference to FIG. 11. The result is sent to the inverse Fourier transform section 129.

The separation results sent to the inverse Fourier transform section 129 are transformed into time-domain signals, and are sent to a subsequent stage processing section 136. Examples of processing at a subsequent stage executed by the subsequent stage processing section 136 include sound recognition, speaker recognition, sound output, and the like. Depending on the subsequent-stage processing, frequency-domain data can be used as it is, in which case the inverse Fourier transform can be omitted.

Next, the Fourier transform section 124 also provides the Fourier transform data based on the observed signals to the thread control section 131 of the learning processing unit 130.

The observed signals sent to the thread control section 131 are sent to a plurality of learning threads 132-1 to 132-N of the thread computation processing section 132. The individual learning threads accumulate the given observed signals by a predetermined amount, and then find a separating matrix from the observed signals by using ICA batch processing. This processing is the same as the processing described above with reference to FIG. 5. Further, the thread control section 131 also calculates the all-null spatial filter and the power ratio from the separating matrix. The calculated separating matrix, all-null spatial filter, and power ratio are held in the separating matrix holding portion 133, the all-null spatial filter holding portion 134, and the power ratio holding portion 135. Then, under the control of the thread control section 131, those are respectively sent to the separating matrix application section 126, the all-null spatial filtering section 127, and the frequency filtering section 128 of the separation processing unit 123.

The dotted line from the all-null spatial filtering section 127 and separating matrix application section 126 to the thread control section 131 indicates that the latest rescaled all-null spatial filter and separating matrix are reflected in initial learning value. Detailed description thereof will be given in "5. Other Examples (Modified Examples) of Signal Processing Apparatus of Embodiment of the Invention" in the latter part.

Next, referring to FIG. 13, a description will be given of the detailed configuration of the thread control section 131 of the learning processing unit 130 in the apparatus configuration shown in FIG. 12.

A current-frame-index holding counter 151 is incremented by 1 every time one frame of observed signals is supplied, and is returned to the initial value upon reaching a predetermined value.

A learning-initial-value holding portion 152 holds the initial value of the separating matrix W when executing a learning process in each thread. Although the initial value of the separating matrix W is basically the same as that of the latest separating matrix, a different value may be used as well. For example, the separating matrix, to which the rescaling (a process of adjusting power between frequency bins, details of which will be given later) has not been applied, is used as the learning initial value, and the separating matrix, to which rescaling has been applied, is used as the latest separating matrix.

A planned-accumulation-start timing specifying information holding portion 153 holds information used for keeping the timing of starting accumulating at a constant interval between a plurality of threads. The use method will be described later. The planned-accumulation-start timing may be expressed by using relative time, or may be managed by the frame index or by the sample index of time-domain signal instead of relative time. The same applies to information for managing other kinds of "time" and "timing".

An observed-signal-accumulation timing information holding portion 154 holds information representing which timing the observed signals, which are used as the basis for the learning of the separating matrix W being currently used in the separating section 127, are acquired at, that is, the relative time or frame index of observed signals corresponding to the latest separating matrix. Both the accumulation start and accumulation end timings of corresponding observed signals may be stored in the observed-signal-accumulation timing information holding portion 154. However, when the block length, that is, the accumulation time of the observed signals is constant, it suffices to store only one of these timings.

Further, the thread control section 131 has a pointer holding portion 155 which holds pointers linked to the individual threads, and controls the plurality of threads 132-1 to 132-N by using the pointer holding portion 155.

Figure 14:
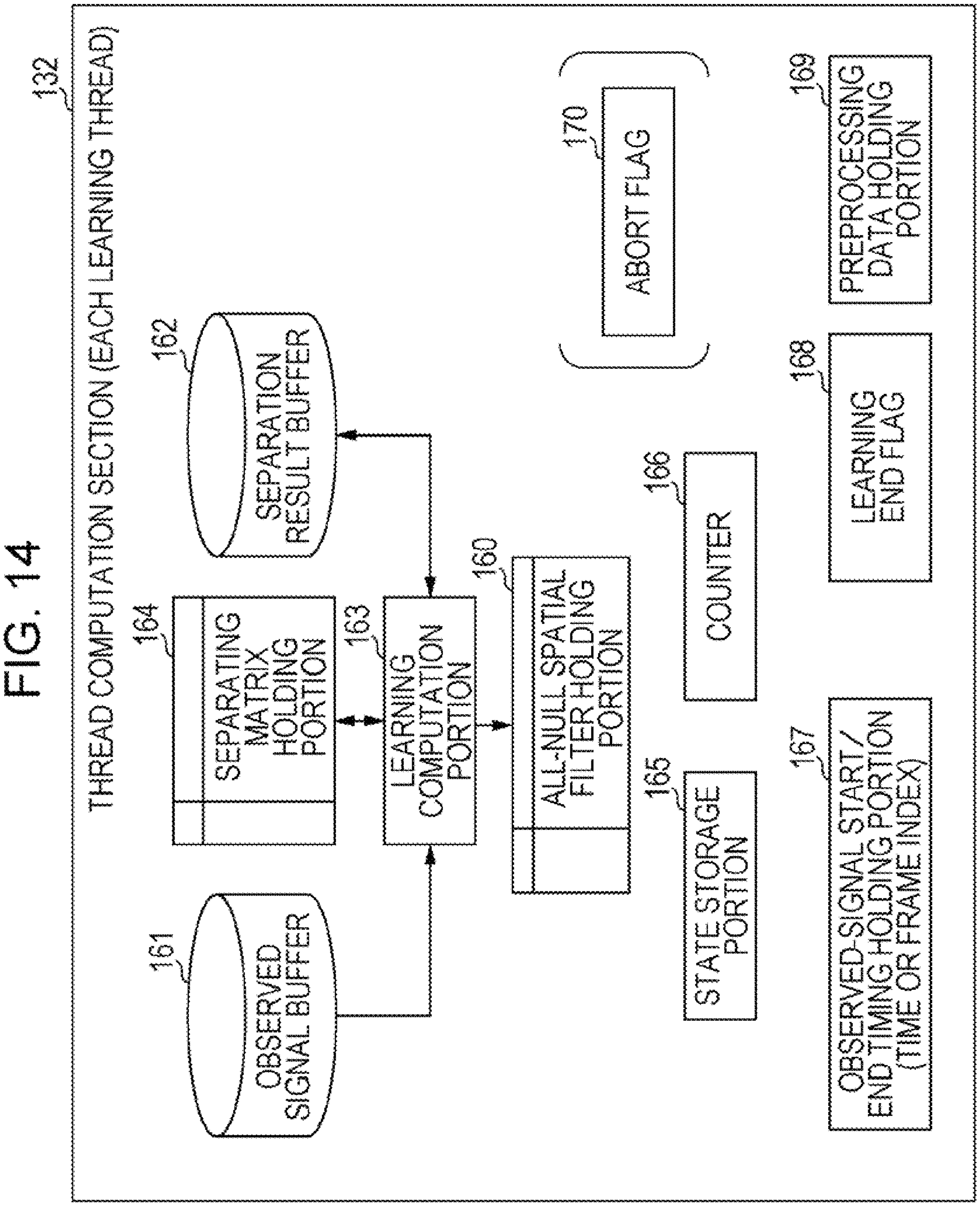
FIG. 14 is a diagram illustrating a process executed in a thread computation section.

Next, referring to FIG. 14, a process executed in the thread computation section 132 will be described. Each of the threads 132-1 to 132-N executes batch processing ICA by using the functions of the respective modules of an observed signal buffer 161, a separation result buffer 162, a learning computation portion 163, and a separating matrix holding portion 164.

The observed signal buffer 161 holds observed signals supplied from the thread control section 131.

The separation result buffer 162 holds the separation results, which are computed by the learning computation portion 163, prior to separating-matrix convergence.

The learning computation portion 163 executes a process of separating observed signals accumulated in the observed signal buffer 161, on the basis of a separating matrix W used for the separation process which is held in the separating matrix holding portion 164, accumulating the separation results into the separated-result buffer 162, and also updating the separating matrix being learned by using the separation results accumulated in the separated-result buffer 162.

The thread computation section 132 (=learning thread) is a state transition machine, and the current state is stored in a state storage portion 165. The state of a thread is controlled by the thread control section 131 on the basis of the counter value of a counter 166. The counter 166 changes in value in synchronization with supply of one frame of the observed signals, and switches its state on the basis of this value. Detailed description thereof will be given later.

An observed-signal start/end timing holding portion 167 holds at least one of pieces of information representing the start timing and the end timing of observed signals used for learning. As described above, information representing the timing may be the frame index or sample index, or may be the relative time information. In this case as well, although both the start timing and the end timing may be stored, when the block length, that is, the accumulation time of the observed signals is constant, it suffices to store only one of these timings.

A learning end flag 168 is a flag used for notifying the end of learning to the thread control section 131. At the time of activation of a thread, the learning end flag 168 is set OFF (flag is not up), and at the point when the learning ends, the learning end flag 168 is set ON. Then, after the thread control section 131 recognizes that the learning has ended, the learning end flag 168 is set OFF again through control of the thread control section 131.

In addition, the values in the data of the state storage portion 165, the counter 166, and the observed-signal start/end timing holding portion 167 can be rewritten by an external module such as the thread control section 131. For example, while the learning loop is run in the thread computation section 132, the thread control section 131 is able to change the value of the counter 166.

A preprocessing data holding portion 169 is an area that stores data which becomes necessary when observed signals to which preprocessing has been applied are returned to the original state. Specifically, for example, in cases where normalization of observed signals (adjusting the variance to 1 and the mean to 0) is executed in preprocessing, since values such as a variance (or a standard deviation or its inverse) and a mean are held in the preprocessing data holding portion 169, source signals prior to normalization can be recovered by using these values. In cases where, for example, decorrelation (also referred to as pre-whitening) is executed as preprocessing, a matrix, by which the observed signals are multiplied during the decorrelation, is held in the preprocessing data holding portion 169.

The all-null spatial filter holding portion 160 holds a filter that form null beams toward all the sound sources included in the observed signal buffer 161. The filter is generated from the separating matrix at the time of the learning end. Alternatively, there is a method of generating the filter from the data of the observed signal buffer. The generation method will be described later.

Next, the state transition of the learning threads 132-1 to 132-N will be described with reference to FIGS. 15 and 16. As for its implementation, specifications may be such that each thread changes its state by itself on the basis of the value of the counter 166. However, specifications may be also such that the thread control section issues a state transition command in accordance with the value of the counter 166 or the value of the "learning end flag" 168, and each thread changes its state in response to the command. In the following examples, the latter specifications are adopted.

Figure 15:
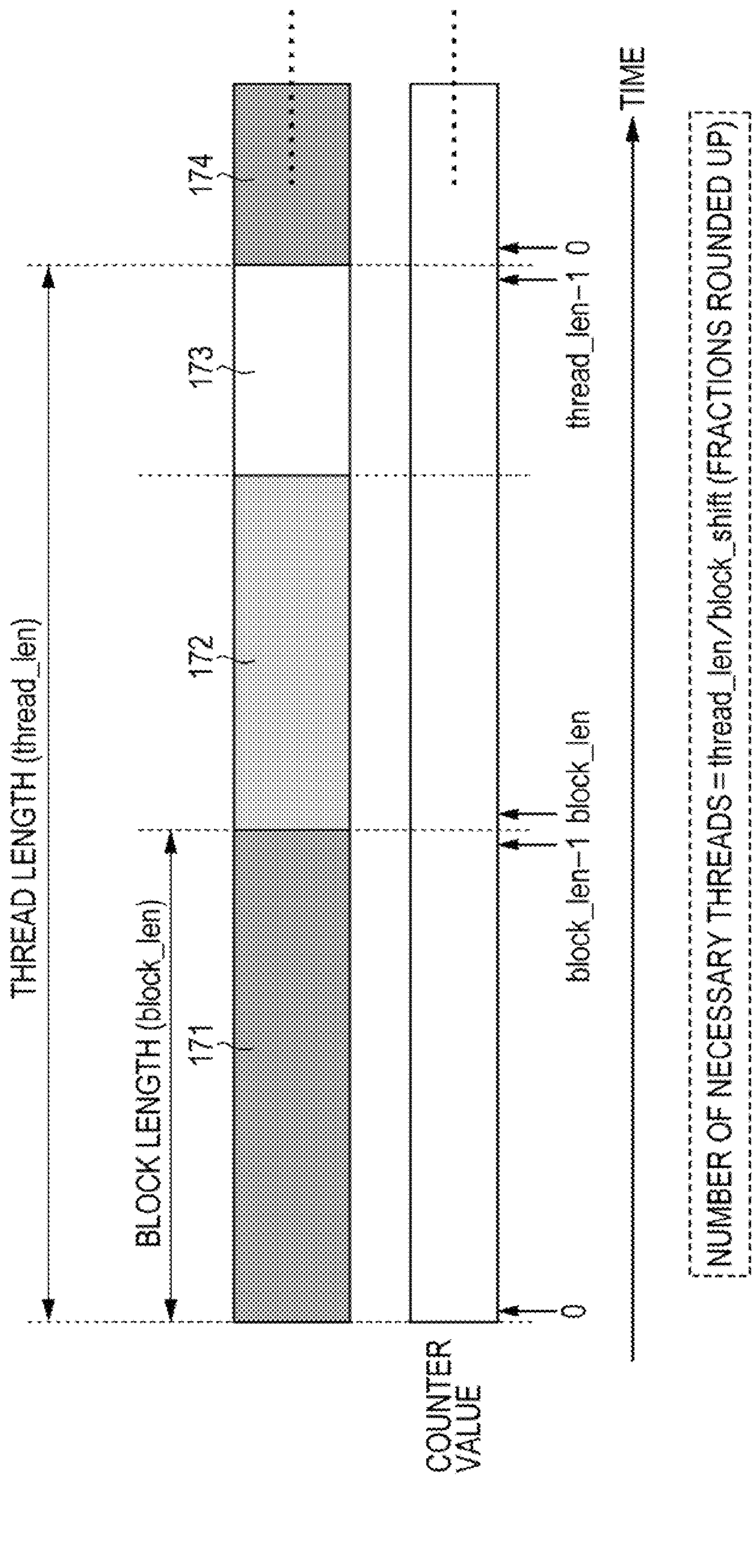
FIG. 15 is a diagram illustrating state transition of a learning thread.

FIG. 15 shows one of the threads described above with reference to FIG. 5. In each of the threads, when in the "accumulating" state of observed signals, observed signals for the duration of a specified time, that is, one block length are accumulated into the buffer. After the elapse of the specified time, the state transitions to learning.

In the learning state, a learning process loop is executed until the separating matrix W converges (or a predetermined number of times), and a separating matrix corresponding to the observed signals accumulated in the accumulating state is found. After the separating matrix W converges (or after the learning process loop is executed a predetermined number of times), the state transitions to waiting.

Then, in the waiting state, accumulating or learning of observed signals is not executed for a specified time, and the thread is put in the waiting state. The time for which the waiting state is maintained is determined by the time it took for learning. That is, as shown in FIG. 15, a thread length (thread_len) as the total time width of the "accumulating" state, the "learning" state, and the "waiting" state is set, and basically, the time from when the "learning" state ends to the end of the thread length is set as the "waiting" state time (wait time). After the wait time elapses, the state returns to the "accumulating" state of observed signals.

While these times may be managed in units of, for example, milliseconds, the times may be measured in units of frames that are generated by a short-time Fourier transform. In the following description, it is assumed that these times are measured (for example, counted up) in units of frames.

Figure 16:
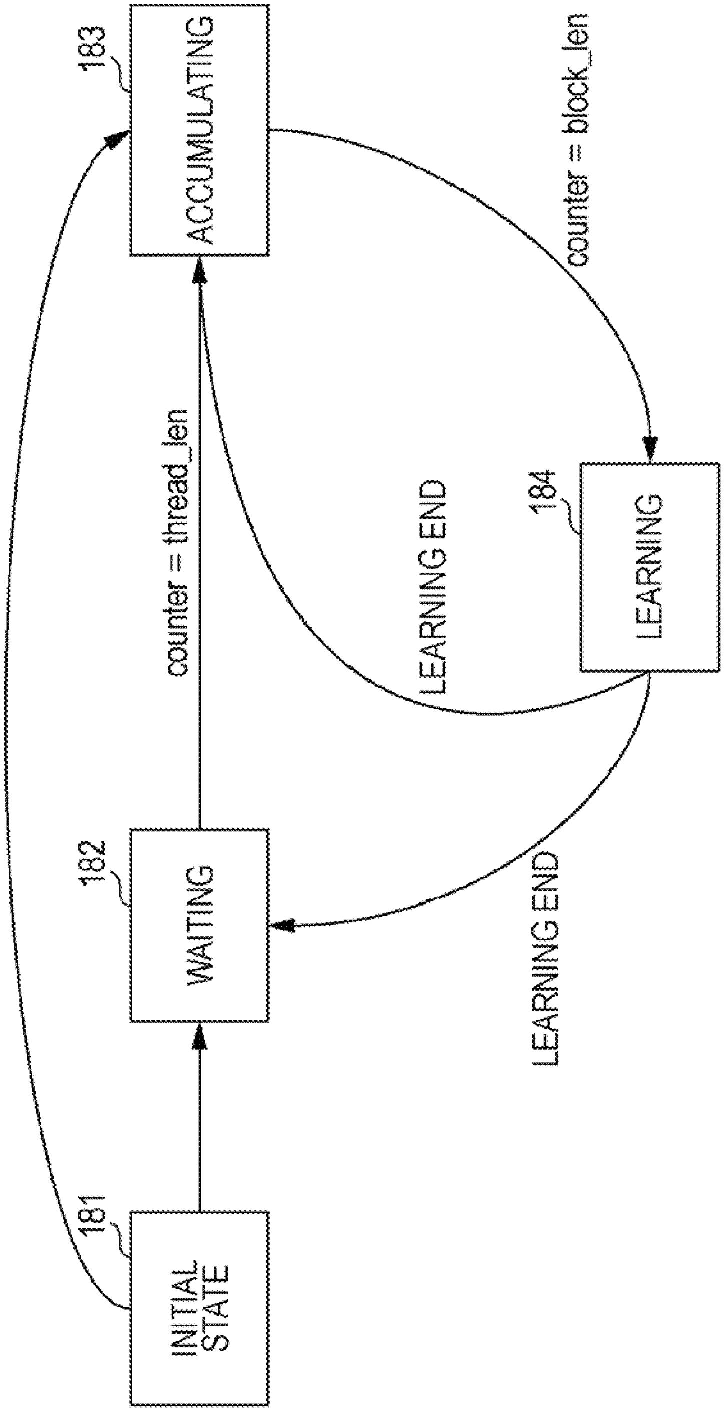
FIG. 16 is a diagram illustrating state transition of a learning thread.

Referring to FIG. 16, a further description will be given of the state transition of threads. Although the threads are in an "initial state" 181 immediately after system start-up, one of the threads is made to transition to "accumulating" 183, and the other threads are made to transition to "waiting" 182 (state transition commands are issued). In the example of FIG. 5 described above, the thread 1 is a thread that has transitioned to "accumulating", and the other threads are threads that have transitioned to "waiting". Hereinafter, the thread that has transitioned to "accumulating" will be described first.

The time necessary for accumulating observed signals is referred to as block length (block_len) (refer to FIG. 15). In addition, the time necessary for the one cycle of accumulating, learning, and waiting is referred to as thread length (thread_len). While these times may be managed in units of milliseconds or the like, frames generated by a short-time Fourier transform may serve as units of management. In the following description, frames serve as units.

The state transitions from "accumulating to learning" and "waiting to accumulating" are made on the basis of the counter value. That is, within the thread that has started from "accumulating" (the accumulating state 171 in FIG. 15 and the accumulating state 183 in FIG. 16), the counter is incremented by 1 every time one frame of observed signals is supplied, and when the value of the counter becomes equal to the block length (block_len), the state is made to transition to "learning" (the learning state 172 in FIG. 15 and the learning state 184 in FIG. 16). Although learning is performed in the background in parallel with the separating process, during this learning as well, the counter is incremented by 1 in synchronization with the frame of observed signals.

When learning is finished, the state is made to transition to "waiting" (the waiting state 173 in FIG. 15 and the waiting state 182 in FIG. 16). When in the waiting state, as in the learning state, the counter is incremented by 1 in synchronization with the frame of observed signals. Then, when the counter value becomes equal to the thread length (thread_len), the state is made to transition from "accumulating" (the accumulating state 171 in FIG. 15 and the accumulating state 183 in FIG. 16), and the counter is returned to 0 (or an appropriate initial value).

On the other hand, as for the thread that has transitioned from the "initial state" 181 to "waiting" (the waiting state 173 in FIG. 15 and the waiting state 182 in FIG. 16), the counter is set to a value corresponding to the time for which the thread is to be put in the waiting state. For example, the thread 2 in FIG. 5 transitions to "accumulating" after waiting for a time equal to the block shift width (block_shift). Likewise, the thread 3 is made to wait for a time equal to twice the block shift width (block_shift×2).

To realize these operations, the counter of the thread 2 is set as:

(thread length)−(block shift width): (thread_len)−(block_shift).

In addition, the counter of the thread 3 is set as:

(thread length)−(2×block shift width): (thread_len)−(block_shift×2).

With these settings, after the value of the counter reaches the thread length (thread_len), the state transitions to "accumulating", and thereafter, as in the thread 1, the cycle of "accumulating, learning, and waiting" is repeated.

The number of learning threads to be prepared is determined by the thread length and the block shift width. Letting the thread length be represented as thread_len, and the block shift width be represented as block_shift, the number of necessary learning threads is found by (thread length)/(block shift width), that is, thread_len/block_shift.

The fractions thereof are rounded off.

For example, in FIG. 5, the settings are such that

[thread length (thread_len)]=1.5×[block length (block_len)], and

[block shift width (block_shift)]=0.25×block length (block_len)].

Hence, the number of necessary threads is 1.5/0.25=6.

3. Sound Source Separation Process Executed in Signal Processing Apparatus according to Embodiment of the Invention

3-1. Entire Sequence

Figure 17:
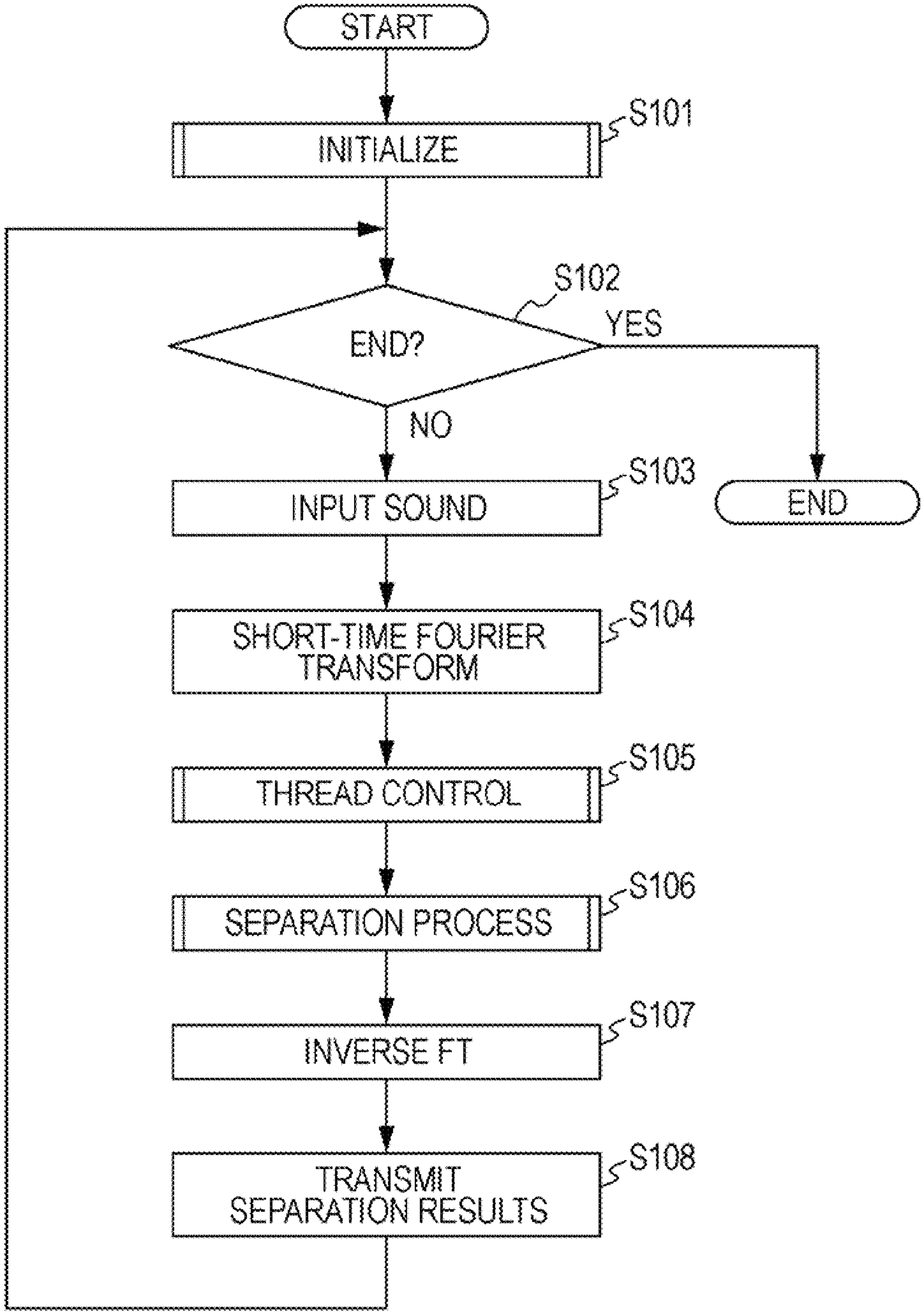
FIG. 17 is a flowchart illustrating the entire sequence of a sound source separation process.

Next, referring to the flowchart shown in FIG. 17, description will be given of the entire sequence of the real-time sound source separation process in the signal processing apparatus according to the embodiment of the invention. The flowchart shown in FIG. 17 is a flowchart illustrating mainly the processing in the separation processing unit 123. The "background process (learning)" of the learning processing unit 130 can be run in a separate processing unit (such as a separate thread, a separate process, or a separate processor) from the separation process, and thus will be described with reference to a separate flowchart. Further, the commands and the like exchanged between the two processes will be described with reference to the sequence diagram shown in FIG. 20.

First, referring to the flowchart in FIG. 17, a description will be given of processing in the separation processing unit 123. Upon start-up of the system, in step S101, various kinds of initialization are performed. Details of the initialization will be described later. The process from the sound input in step S103 to the transmission of the separation result in step S108 is repeated until processing on the system ends (Yes in step S102).

The sound input in step S103 is a process of capturing a predetermined number of samples from an audio device (or a network, a file, or the like depending on the embodiment) (this process will be referred to as "capture"), and storing the captured samples in a buffer. This is performed for the number of microphones. Hereinafter, the captured data will be referred to as an observed signal.

Next, in step S104, the observed signal is sliced off for each predetermined length, and a short-time Fourier transform (STFT) is performed. Details of the short-time Fourier transform will be described with reference to FIG. 18.

Figure 18:
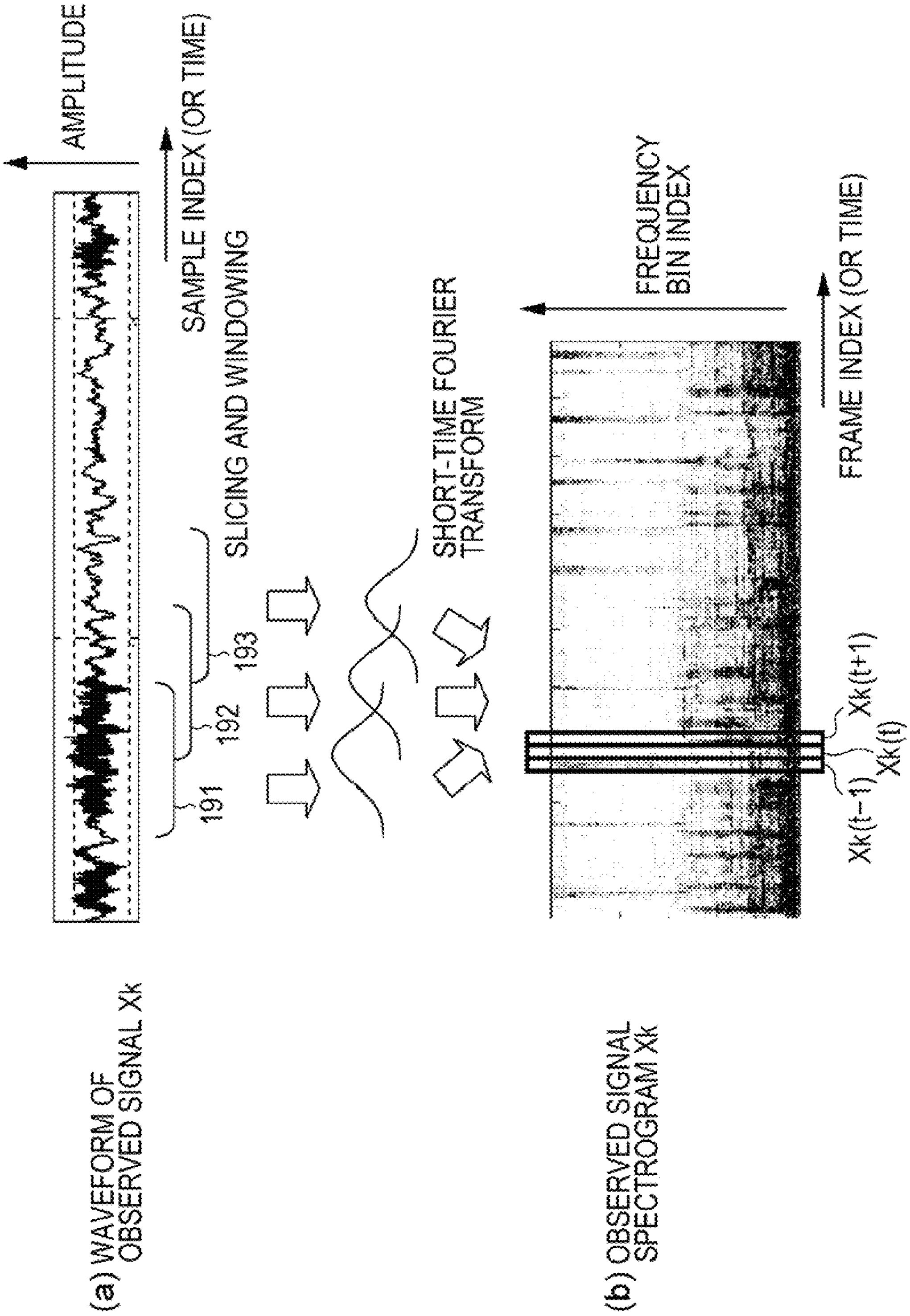
FIG. 18 is a diagram illustrating the details of a short-time Fourier transform.

For example, an observed signal $x_k$ recorded with the k-th microphone in the environment as shown in FIG. 1 is shown in FIG. 18(*a*). A window function such as a Hanning window or a sine window is applied to frames 191 to 193, which are sliced data each obtained by slicing a predetermined length from the observed signal $x_k$. The sliced units are referred to as frames. By applying a discrete Fourier transform (a Fourier transform on a finite segment, abbreviated as DFT) or a fast Fourier transform (FFT) to one frame of data, a spectrum Xk(t) (t is the frame index) as frequency-domain data is obtained.

The frames to be sliced may be overlapped, like the frames 191 to 193 shown in the drawing, which makes it possible for the spectrums Xk(t−1) to Xk(t+1) of consecutive frames to change smoothly. Spectrums, which are laid side by side in accordance with the frame index, are referred to as spectrograms. FIG. 18(*b*) shows an example of spectrograms.

Since there is a plurality of input channels (equal to the number of microphones) according to an embodiment of the invention, the Fourier transform is also performed for the number of channels. In the following, the Fourier transformed results corresponding to all channels and one frame are represented by a vector X(t) (Expression [3.11] described above). In Expression [3.11], n denotes the number of channels (=the number of microphones). M denotes the total number of frequency bins, and letting J represent the number of points in the short-time Fourier transform, M=J/2+1.

Returning to the flow in FIG. 17, the description will be continued. In step S104, the observed signal is sliced into each predetermined length, and a short-time Fourier transform (STFT) is performed. Then, in step S105, control is performed on each learning thread. Detailed description thereof will be given later.

Next, separation is performed on the observed signals X(t), which are generated in step S105, in step S106. Letting the separating matrix be W (Expression [3.10]), the separation results Y(t) (Expression [3.4]) are found by $$Y(t)=WX(t) \quad \text{(Expression [3.12])}.$$

Next, in step S107, an inverse Fourier transform (inverse FT) is applied to the separation results Y(t), thereby recovering the signals back to time-domain signals. Thereafter, in step S108, the separation results are transmitted to subsequent-stage processing. The above steps S103 to S108 are repeated to the end.

3-2. Initialization Process (S101)

Details of the initialization process in step S101 in the flowchart shown in FIG. 17 will be described with reference to the flowchart in FIG. 19.

Figure 13:
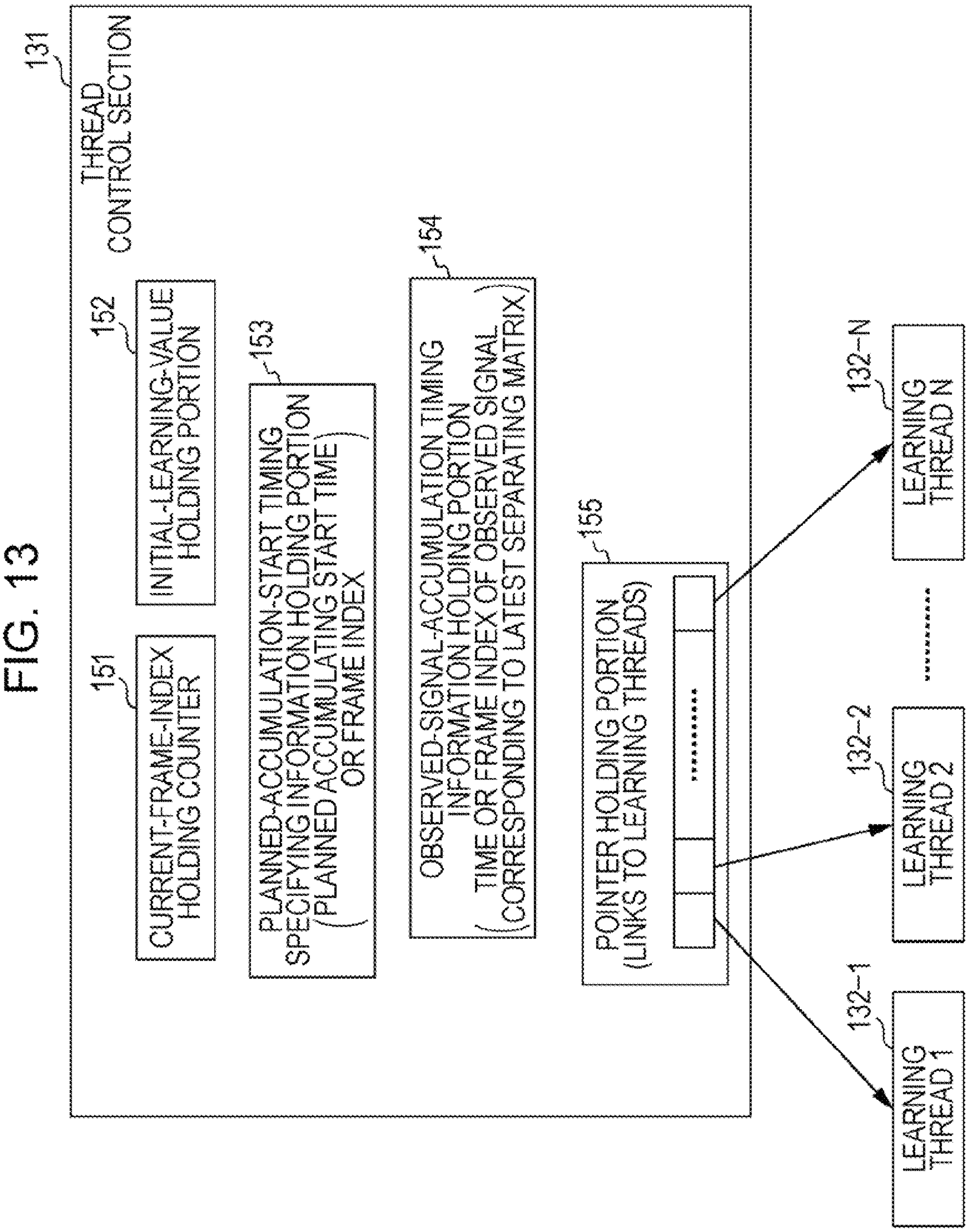
FIG. 13 is a diagram illustrating a detailed configuration example of a thread control section of a learning processing unit.

In step S151, the thread control section 131 shown in FIGS. 12 and 13 initializes itself. Specifically, the following processes are performed on the respective components shown in FIG. 13.

The current-frame-index holding counter 151 (refer to FIG. 13) is initialized to 0.

An appropriate initial value is substituted into the learning-initial-value holding portion 152 (refer to FIG. 13). For example, the initial value may be a unit matrix, or when the separating matrix W at the last system termination is stored, the separating matrix W at the last system termination, or an appropriately transformed version of this separating matrix may be used. In addition, for example, in cases where the sound source direction can be estimated with some accuracy from information such as an image or a priori knowledge, an initial value may be computed and set on the basis of the sound source direction.

Further, in the planned-accumulation-start timing specifying information holding portion 153, the calculated value of the following expression is set:

(number of necessary threads−1)×[block shift width (block_shift)].

This value indicates the timing (the frame index) at which accumulating of the thread with the largest thread index starts.

Then, since timing information (frame index or relative time information) representing observed signals corresponding to the latest separating matrix is held in the observed-signal-accumulation timing information holding portion 154, initialization is performed at this time, and 0 is held.

In the separating matrix holding portion 133 (refer to FIG. 12) as well, as in case of the learning-initial-value holding portion 152 when initialized, an appropriate initial value is held. The initial value to be held in the separating matrix holding portion 133 may be a unit matrix. When the separating matrix W at the last system termination is stored, the separating matrix W at the last system termination, or an appropriately transformed version of this separating matrix may be used.

Further, an initial value is substituted into the all-null spatial filter holding portion 134 (refer to FIG. 12). The initial value depends on the initial value of the separating matrix. In cases where the unit matrix is used as the separating matrix, the value representing "null" is substituted into the all-null spatial filter, and at this value, the later described frequency filtering is set to be inactive. On the other hand, in cases where another appropriate value is used as the initial value of the separating matrix, the value of the all-null spatial filter is calculated from the initial value.

An initial value is also substituted into the power ratio holding portion 135 (refer to FIG. 12). For example, when 0 is substituted as the initial value, until the first separating matrix is found by the learning (for example, the segment 51 in FIG. 5), the frequency filtering can be set to be inactive.

In step S152, the thread control section 131 secures the number N of necessary threads to be executed in the thread computation section 132, and sets their state to the "initialized" state.

At this time, the number N of necessary threads is obtained by rounding off decimals of thread length/block shift width (thread_len/block_shift) (that is, an integer larger than and closest to the value of thread_length/block_shift).

In step S153, the thread control section 131 starts a thread loop, and until initialization of all threads is finished, the thread control section 131 detects uninitialized threads and executes the processes from step S154 to step S159. The loop is run for the number of threads generated in step S152. It should be noted that the thread index increases in order from 1 and is represented as a variable "s" in the loop (instead of the loop, parallel processes may be performed for the number of learning threads, it is the same for the loop of the learning threads to be described later).

In step S154, the thread control section 131 determines whether or not the thread index is 1. Since the initial setting is different between the first thread and the others, the process branches in step S154.

If it is determined in step S154 that the thread index is 1, in step S155, the thread control section 131 controls a thread with a thread index 1 (for example, the thread 132-1), and initializes its counter 166 (refer to FIG. 14) (for example, sets the counter 166 to 0).

In step S156, the thread control section 131 issues, to the thread with the thread index 1 (for example, the thread 132-1), a state transition command for causing the state to transition to the "accumulating" state, and the process advances to step S159. The state transition is performed by issuing, from the thread control section to the learning thread, a command (hereinafter referred to as a "state transition command") to the effect that "transition to the designated state" (in the following description, it is the same for all kinds of state transitions).

If it is determined in step S154 that the thread index is not 1, in step S157, the thread control section 131 sets the value of the counter 166 of the corresponding thread (one of the threads 132-2 to 132-N) to thread_len−block_shift×(thread index−1).

In step S158, the thread control section 131 issues a state transition command for causing the state to transition to the "waiting" state.

After the process in step S156 or step S158, in step S159, the thread control section 131 initializes information within the thread which has not been initialized yet, that is, information representing a state stored in the state storage portion 165 (refer to FIG. 14), and information other than the counter value of the counter 166. Specifically, for example, the thread control section 131 sets the learning end flag 168 (refer to FIG. 14) OFF, and initializes values in the observed-signal start/end timing holding portion 167 and the preprocessing data holding portion 169 (for example, set the values to 0).

When all the threads secured in the thread computation section 132, that is, the threads 132-1 to 132-N have been initialized, in step S160, the thread loop is ended, and the initialization ends.

Through such processing, the thread control section 131 initializes all of the plurality of threads secured in the thread computation section 132.

Figure 19:
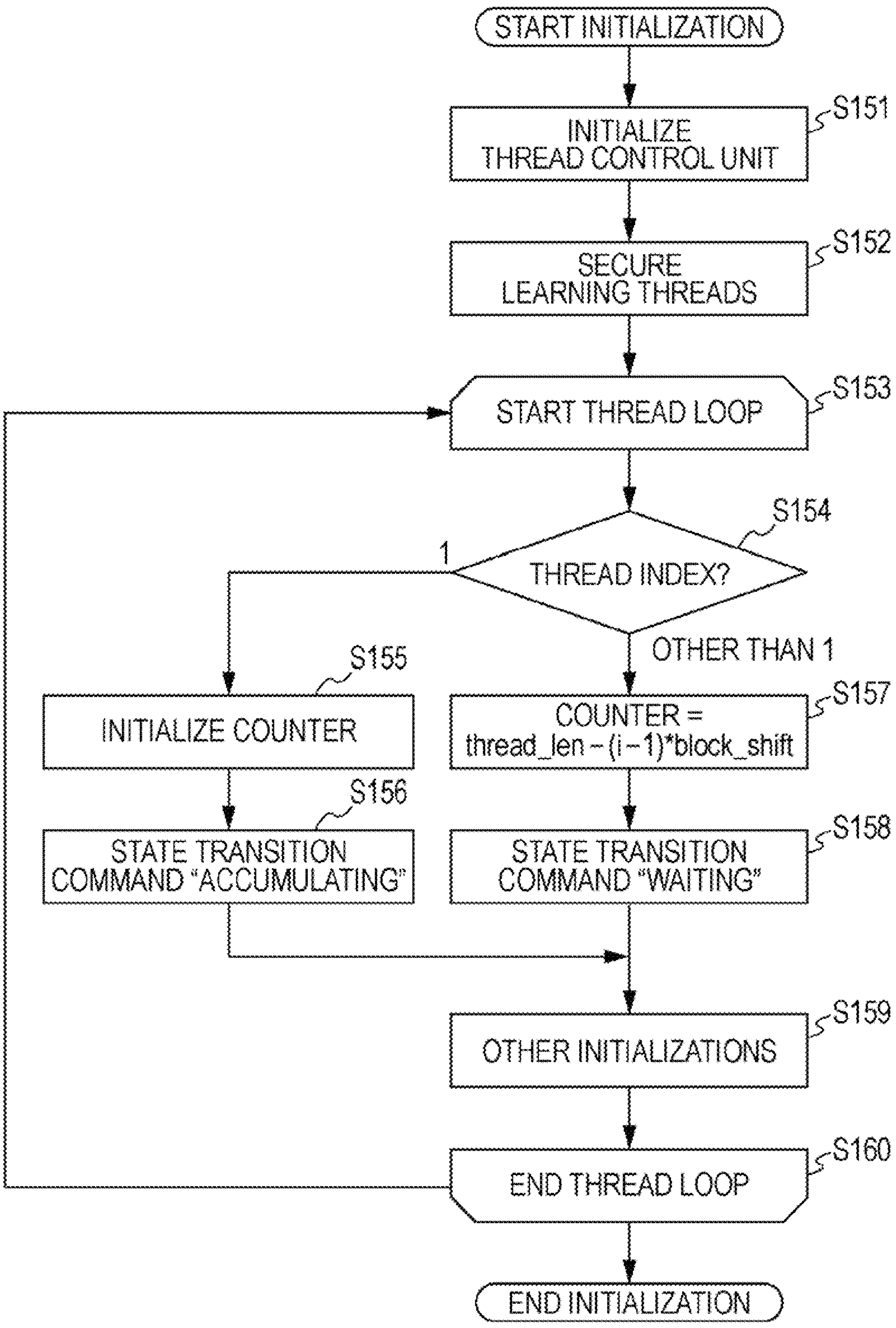
FIG. 19 is a flowchart illustrating the details of an initialization process in step S101 in the flowchart shown in FIG. 17.
Figure 20:
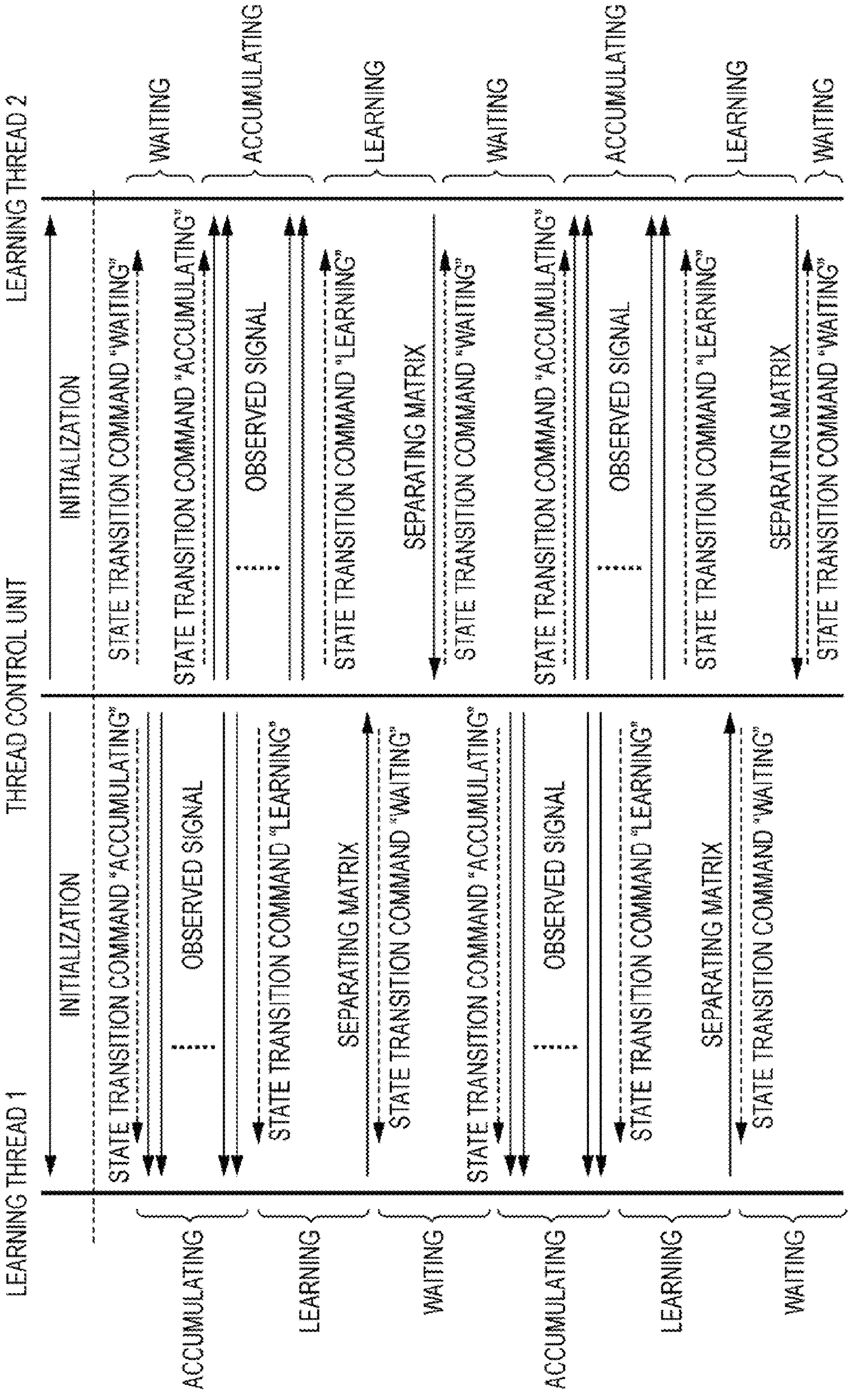
FIG. 20 is a diagram illustrating a sequence of control performed by a thread control section with respect to a plurality of learning threads 1 and 2.

The processes in step S154 to S158 in FIG. 19 correspond to the "initialization" process at the beginning, and the transmission of a state transition command immediately after the initialization process in the sequence diagram shown in FIG. 20. FIG. 20 shows a sequence of control performed by the thread control section 131 with respect to the plurality of Learning the threads 1 and 2. Each thread repeatedly executes the processes of waiting, accumulating, and learning. After the thread control section provides observed signals to each thread, and each thread accumulates observed data, a learning process is performed to generate a separating matrix, and the separating matrix is provided to the thread control section.

3-3. Thread Control Process (S105)

Next, referring to the flowchart in FIG. 21, a description will be given of a thread control process, which is executed by the thread control section 131 in step S105 in the flowchart shown in FIG. 17.

It should be noted that this flowchart represents a flow as seen from the thread control section 131, and not from the learning threads 132-1 to 132-N. For example, "learning-state process" is defined as a process performed by the thread control section 131 when the state of a learning thread is "learning" (regarding the process of the learning thread itself, refer to FIG. 29).

Figure 21:
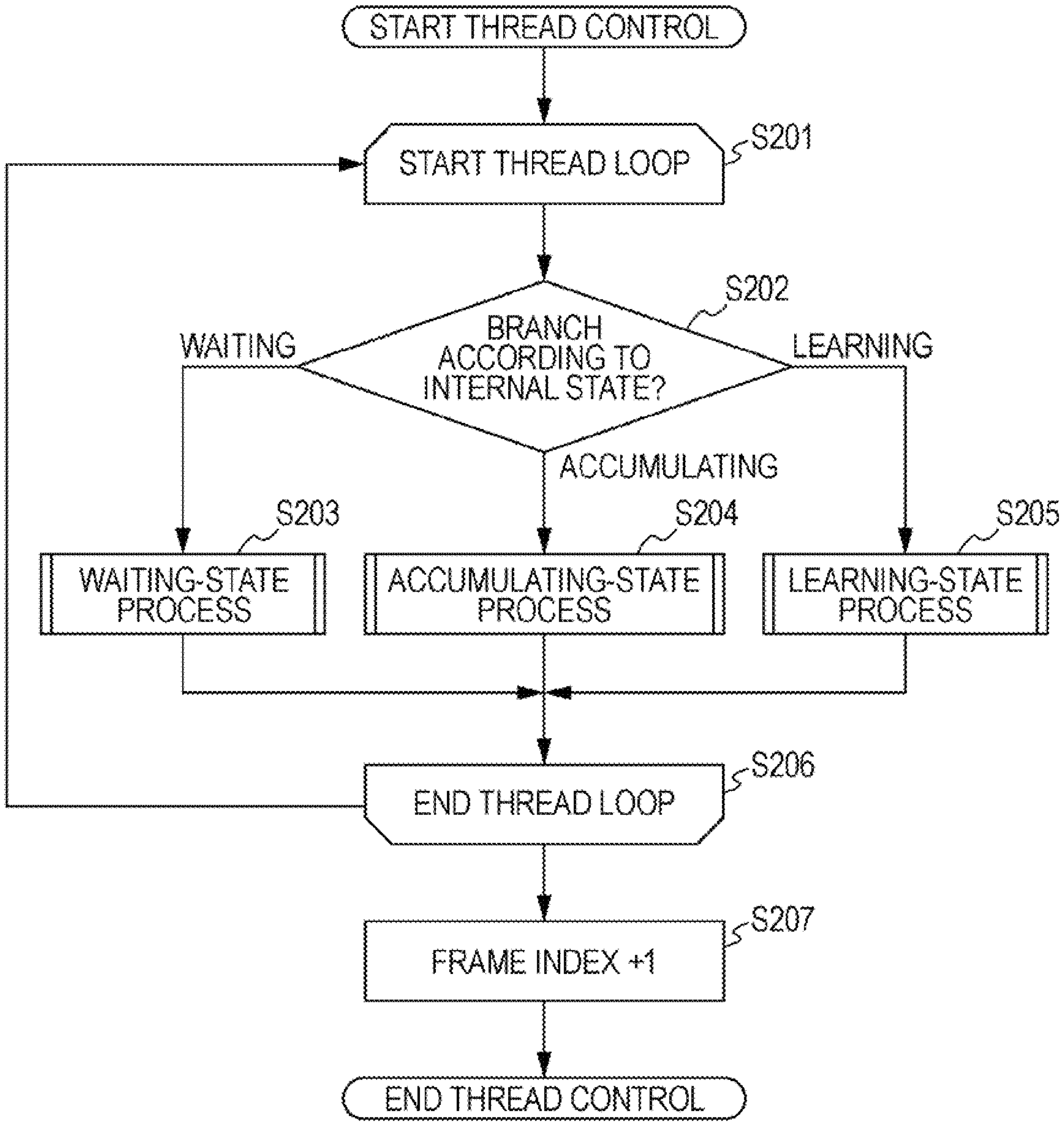
FIG. 21 is a flowchart illustrating the details of the thread control process executed by the thread control section in step S105 in the flowchart shown in FIG. 17.

Steps S201 to S206 represent a loop for a learning thread, and the loop is run for the number of threads generated in step S152 of the flow shown in FIG. 21 (parallel processes may be performed as well). In step S202, the current state of the learning thread is read from the state storage portion 165 (refer to FIG. 14), and one of "waiting-state process", "accumulating-state process", and "learning-state process" is executed in accordance with the read value. Details of the respective processes will be described later in detail.

A description will be given of individual steps in the flow. In step S201, the thread control section 131 starts a thread loop, and with a variable "s", which indicates the thread index of a thread on which control is executed, set as s=1, the thread control section 131 increments the variable "s" when one thread is finished, and repeats the thread loop process from steps S202 to S207 until s=N.

In step S202, the thread control section 131 acquires information representing the internal state of a thread having a thread index indicated by the variable "s", which is held in the state storage portion 165 for the thread. If it is detected that the state of the thread having a thread index indicated by the variable "s" is "waiting", in step S203, the thread control section 131 executes a waiting-state process, which will be described later with reference to the flowchart in FIG. 22, and the process advances to step S206.

Figure 23:
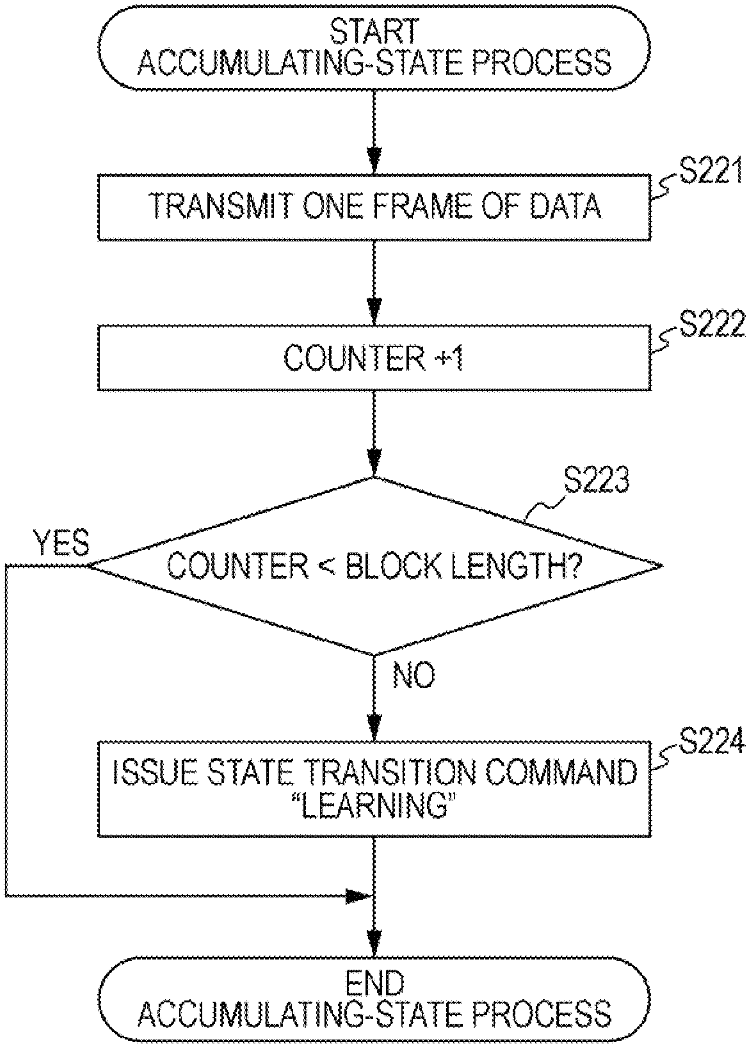
FIG. 23 is a flowchart illustrating an accumulating-state process that is executed in step S204 in the flowchart shown in FIG. 21.

If it is detected in step S202 that the state of the thread having a thread index indicated by the variable "s" is "accumulating", in step S204, the thread control section 131 executes an accumulating-state process, which will be described later with reference to the flowchart in FIG. 23, and the process advances to step S206.

Figure 24:
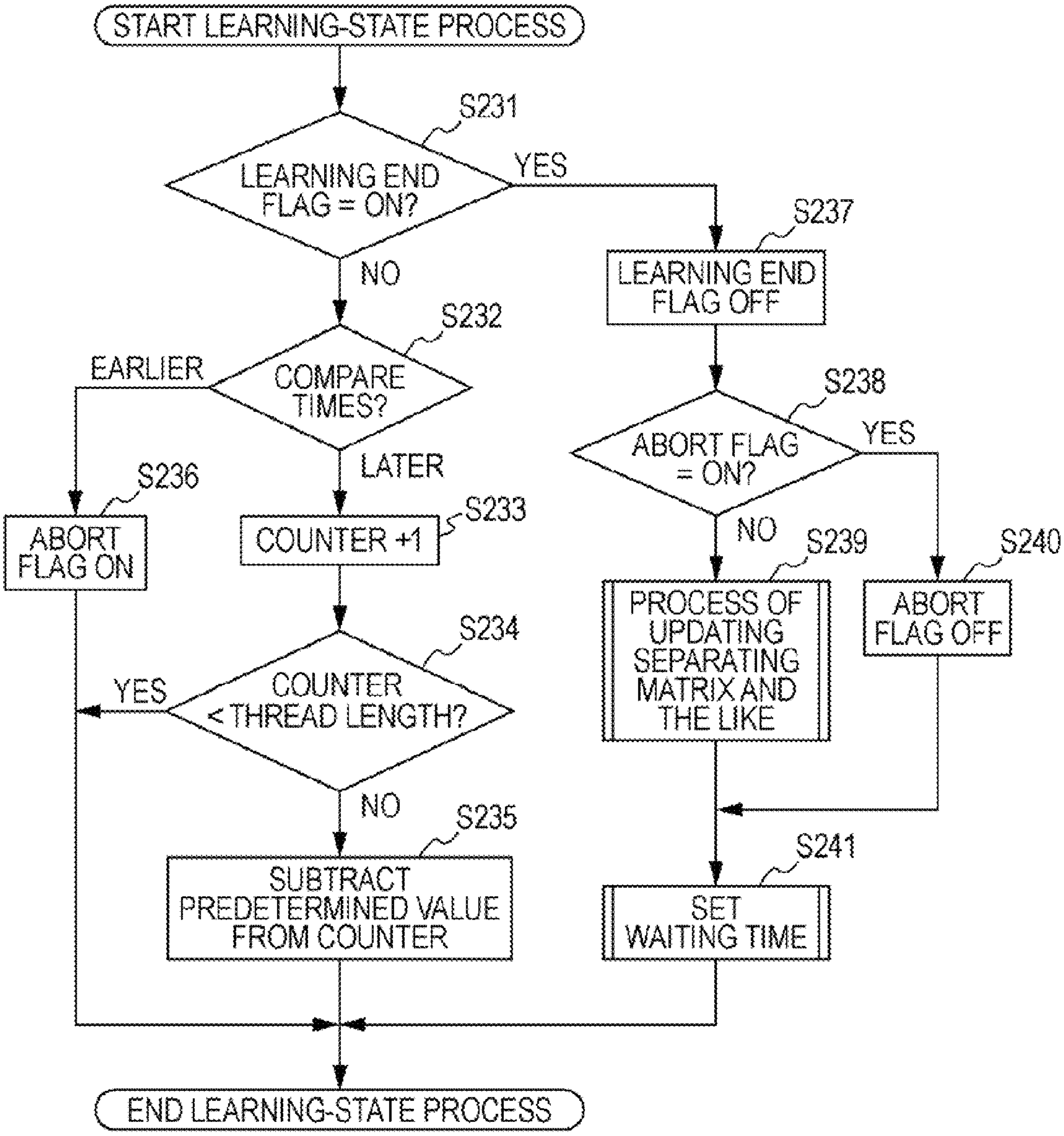
FIG. 24 is a flowchart illustrating a learning-state process that is executed in step S205 in the flowchart shown in FIG. 21.

If it is detected in step S202 that the state of the thread having a thread index indicated by the variable "s" is "learning", in step S205, the thread control section 131 executes a learning-state process, which will be described later with reference to the flowchart in FIG. 24.

After finishing the process in step S203, step S204, or step S205, in step S206, the thread control section 131 increments the variable "s" by 1. Then, when the variable "s" indicating the thread index of a thread on which control is executed has become s=N, the thread loop is ended.

In step S207, the thread control section 131 increments the frame index held in the current-frame-index holding counter 151 (refer to FIG. 13) by 1, and ends the thread control process.

Through such processing, the thread control section 131 is able to control all of the plurality of threads in accordance with their state.

While it has been described above that the thread loop is repeated for the number N of launched threads, instead of repeating the thread loop, parallel processes corresponding to the number N of threads may be executed.

Figure 22:
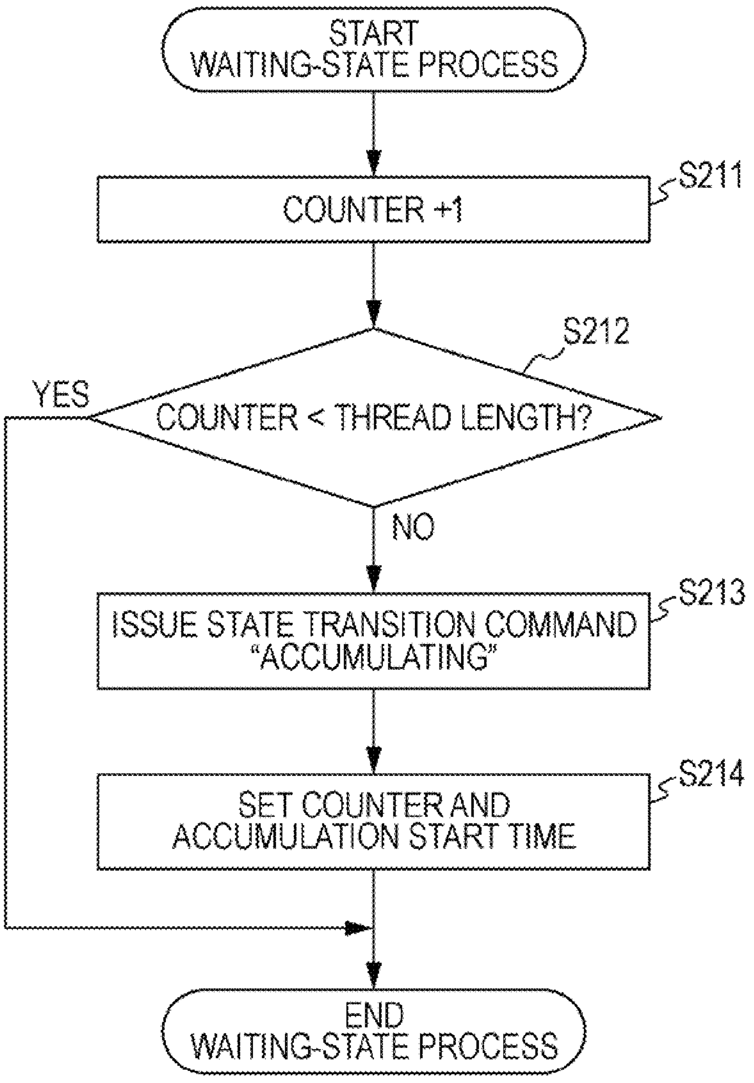
FIG. 22 is a flowchart illustrating a waiting-state process that is executed in step S203 in the flowchart shown in FIG. 21.

Next, referring to the flowchart in FIG. 22, a description will be given of the waiting-state process, which is executed in step S203 in the flowchart shown in FIG. 21.

This waiting-state process is a process that is executed by the thread control section 131 when the state of a thread corresponding to the variable "s" is "waiting" in the thread control process described above with reference to FIG. 21.

In step S211, the thread control section 131 increments the counter 166 (refer to FIG. 14) of the corresponding thread 132 by 1.

In step S212, the thread control section 131 determines whether or not the value of the counter 166 of the corresponding thread 132 is smaller than the thread length (thread_len). If it is determined in step S212 that the value of the counter 166 is smaller than the thread length, the waiting-state process is ended, and the process advances to step S206 in FIG. 21.

If it is determined in step S212 that the value of the counter 166 is not smaller than the thread length, in step 5213, the thread control section 131 issues to the corresponding thread 132 a state transition command for causing the state of the thread 132 to transition to the "accumulating" state.

That is, the thread control section 131 issues a state transition command for causing a thread, which is in the "waiting" state in the state transition diagram described above with reference to FIG. 16, to transition to "accumulating".

In step S214, the thread control section 131 initializes the counter 166 (refer to FIG. 14) of the corresponding thread 132 (for example, sets the counter 166 to 0). In addition, the thread control section 131 sets, in the observed-signal start/end timing holding portion 167 (refer to FIG. 14), observed-signal accumulation start timing information, that is, the current frame index held in the current-frame-index holding counter 151 (refer to FIG. 13) of the thread control section 131, or equivalent relative time information or the like. Then, the waiting-state process is ended, and the process advances to step S206 in FIG. 21.

Through such processing, the thread control section 131 is able to control a thread that is in the "waiting" state, and on the basis of the value of the counter 166 of the thread, cause the state of the thread to transition to "accumulating".

Next, referring to the flowchart in FIG. 23, a description will be given of the accumulating-state process, which is executed in step S204 in the flowchart shown in FIG. 21.

This accumulating-state process is a process that is executed by the thread control section 131 when the state of a thread corresponding to the variable "s" is "accumulating" in the thread control process described above with reference to FIG. 21.

In step S221, the thread control section 131 supplies observed signals X(t), which corresponds to one frame, to the corresponding thread 132 for learning. This process corresponds to the supply of observed signals from the thread control section, which is shown in FIG. 20, to the respective threads.

In step S222, the thread control section 131 increments the counter 166 of the corresponding thread 132 by 1.

In step S223, the thread control section 131 determines whether or not the value of the counter 166 of the corresponding thread 132 is smaller than the block length (block_len), in other words, whether or not the observed signal buffer 161 (refer to FIG. 14) of the corresponding thread is full. If it is determined in step S223 that the value of the counter 166 of the corresponding thread 132 is smaller than the block length, in other words, the observed signal buffer 161 of the corresponding thread is not full, the accumulating-state process is ended, and the process advances to step S206 in FIG. 21.

If it is determined in step S223 that the value of the counter 166 is not smaller than the block length, in other words, the observed signal buffer 161 of the corresponding thread is full, in step S224, the thread control section 131 issues, to the corresponding thread 132, a state transition command for causing the state of the thread 132 to transition to the "learning" state. Then, the accumulating-state process is ended, and the process advances to step S206 in FIG. 21.

That is, the thread control section 131 issues a state transition command for causing a thread, which is in the "accumulating" state in the state transition diagram described above with reference to FIG. 16, to transition to "learning".

Through such processing, the thread control section 131 can supply observed signals to a thread that is in the "accumulating" state to control the accumulating of the observed signals, and on the basis of the value of the counter 166 of the thread, cause the state of the thread to transition from "accumulating" to "learning".

Next, referring to the flowchart in FIG. 24, a description will be given of the learning-state process, which is executed in step S205 in the flowchart shown in FIG. 21.

This learning-state process is a process that is executed by the thread control section 131 when the state of a thread corresponding to the variable "s" is "learning" in the thread control process described above with reference to FIG. 21.

In step S231, the thread control section 131 determines whether or not the learning end flag 168 (refer to FIG. 14) of the corresponding thread 132 is ON. If it is determined in step S231 that the learning end flag is ON, the process advances to step S237 described later.

If it is determined in step S231 that the learning end flag is not ON, that is, a learning process is being executed in the corresponding thread, the process advances to step S232 where a process of comparing times is performed. The "comparing of times" refers to a process of comparing the observed-signal start time 167 (refer to FIG. 14) recorded within the learning thread 132, with the accumulation start time 154 (refer to FIG. 13) corresponding to the current separating matrix which is stored in the thread control section 131. If the observed-signal start time 167 (refer to FIG. 14) recorded in the thread 132 is earlier than the accumulation start time 154 corresponding to the current separating matrix which is stored in the thread control section 131, the subsequent processes are skipped.

On the other hand, when the observed-signal start time 167 (refer to FIG. 14) recorded in the thread 132 is later than or the same as the accumulation start time 154 corresponding to the current separating matrix which is stored in the thread control section 131, the process advances to step S233. In step S233, the thread control section 131 increments the counter 166 of the corresponding thread 132 by 1.

Next, in step S234, the thread control section 131 determines whether or not the value of the counter 166 of the corresponding thread 132 is smaller than the thread length (thread_len). If it is determined in step S234 that the value of the counter 166 is smaller than the thread length, the learning-state process is ended, and the process advances to step S206 in FIG. 21.

If it is determined in step S234 that the value of the counter 166 is not smaller than the thread length, in step S235, the thread control section 131 subtracts a predetermined value from the value of the counter 166. Then, the learning-state process is ended, and the process advances to step S206 in FIG. 21.

The case where the value of the counter reaches the thread length during learning corresponds to a case where learning takes such a long time that the period of "waiting" state does not exist. In that case, since learning is still continuing, and the observed signal buffer 161 is being used, it is not possible to start the next accumulating. Accordingly, until learning ends, the thread control section 131 postpones the start of the next accumulating, that is, issuing of a state transition command for causing the state to transition to the "accumulating" state. Hence, the thread control section 131 subtracts a predetermined value from the value of the counter 166. While the value to be subtracted may be, for example, 1, the value may be larger than 1, for example, a value such as 10% of the thread length.

When the transition to the "accumulating" state is postponed, the interval of the accumulation start time becomes irregular between threads, and in the worst cases, there is even a possibility that observed signals of substantially the same segment are accumulated between the pluralities of threads. When this happens, not only do several threads become meaningless, but for example, depending on the multi-threaded implementation of the OS executed by a CPU, there is a possibility that the learning time further increases as a plurality of learning processes are simultaneously run on the single CPU, and the interval becomes further irregular.

To avoid such a situation, the wait times in other threads may be adjusted so that the interval of the accumulation start timing becomes regular again. This process is executed in step S241. Details of this wait-time adjusting process will be described later.

A description will be given of the process in a case when the learning end flag is determined to be ON in step S231. This process is executed once every time a learning loop within a learning thread ends. If it is determined in step S231 that the learning end flag is ON, and a learning process has ended in the corresponding thread, in step S237, the thread control section 131 sets the learning end flag 168 of the corresponding thread 132 OFF. This process represents an operation for preventing this branch from being continuously executed.

Thereafter, the thread control section 131 checks whether or not an abort flag 170 (refer to FIG. 14) of the thread is ON or OFF. If the abort flag 170 is ON, the thread control section 131 performs a process of updating the separating matrix and the like in step S239, and performs a wait-time setting process in step S241. On the other hand, when the abort flag 170 (refer to FIG. 14) of the thread is OFF, the process of updating the separating matrix and the like in step S239 is omitted, and the wait-time setting process is performed in step S241. Details of the process of updating the separating matrix and the like in step S239, and the wait-time setting process in step S241 will be described later.

Through such processing, the thread control section 131 can determine whether or not learning has ended in a thread in the "learning" state by referring to the learning end flag 168 of the corresponding thread. If the learning has ended, the thread control section 131 updates the separating matrix W and sets the wait time, and also causes the state of the thread to transition from "learning" to "waiting" or "accumulating".

Figure 25:
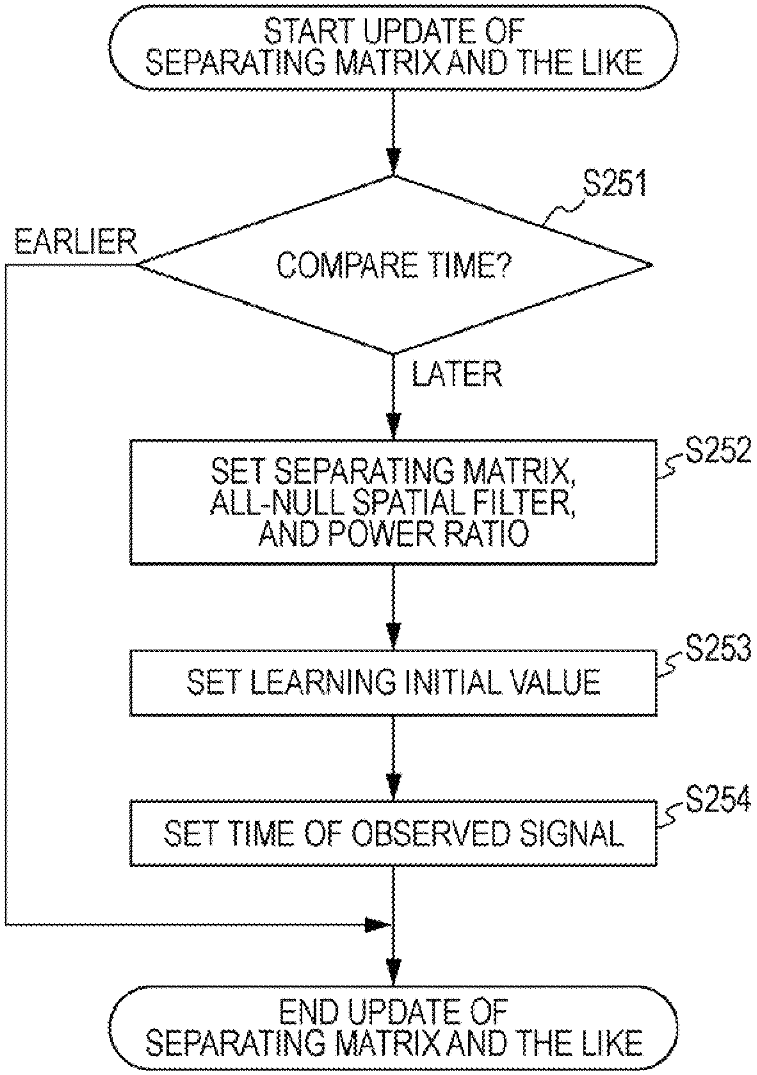
FIG. 25 is a flowchart illustrating a process of updating the separating matrix and the like that is executed in step S239 in the flowchart shown in FIG. 24.

Next, referring to the flowchart in FIG. 25, a description will be given of the process of updating the separating matrix and the like, which is executed in step S239 in the flowchart shown in FIG. 24. This is a process for reflecting the power ratio, the all-null spatial filter, and the separating matrix found by learning in other modules.

In step S251, the thread control section 131 determines whether or not the start timing of observed signals is earlier than the accumulation start timing by comparing those with each other. The start timing of observed signals is held in the observed-signal start/end timing holding portion 167 (refer to FIG. 14) of the thread. The accumulation start timing corresponding to the current separating matrix is held in the observed-signal-accumulation timing information holding portion 154 (refer to FIG. 13).

That is, as shown in FIG. 5, learning in the thread 1 and learning in the thread 2 partially overlap in time. In FIG. 5, a learning segment 57 ends earlier than a learning segment 58. However, for example, depending on the time necessary for each learning, cases may occur in which the learning segment 58 ends earlier than the learning segment 57.

In this regard, when the determination in step S251 is not executed, and a separating matrix in which learning has ended later is treated as the latest separating matrix, a separating matrix W2 derived from the thread 2 is overwritten by a separating matrix W1 derived from the thread 1 which is obtained by learning with observed signals acquired at the earlier timing. Accordingly, to ensure that a separating matrix obtained with observed signals acquired at the later timing is treated as the latest separating matrix, the start timing of observed signals held in the observed-signal start/end timing holding portion 167 is compared with the accumulation start timing corresponding to the current separating matrix which is held in the observed-signal-accumulation timing information holding portion 154.

In step S251, it may be determined that the start timing of observed signals is earlier than the accumulation start timing corresponding to the current separating matrix. In other words, it may be determined that the separating matrix W obtained as a result of learning in this thread has been learned on the basis of signals observed at an earlier timing than those corresponding to the separating matrix W being currently held in the observed-signal-accumulation timing information holding portion 154. In this case, the separating matrix W obtained as a result of learning in this thread is not used, and thus the process of updating the separating matrix and the like ends.

In step S251, it may be determined that the start timing of observed signals is not earlier than the accumulation start timing corresponding to the current separating matrix. That is, it may be determined that the separating matrix W obtained as a result of learning in this thread has been learned on the basis of signals observed at a later timing than those corresponding to the separating matrix W being currently held in the observed-signal-accumulation timing information holding portion 154. In this case, in step S252, the thread control section 131 acquires the separating matrix W obtained by learning in the corresponding thread, and supplies the separating matrix W to the separating matrix holding portion 133 (refer to FIG. 12) and sets the separating matrix W. In the same manner as described above, the latest all-null spatial filter is set in the all-null spatial filter holding portion 134, and the power ratio of the separating-matrix application result is set in the power ratio holding portion 135.

In step S253, the thread control section 131 sets the initial value of learning in each of threads held in the learning-initial-value holding portion 152.

Specifically, as the learning initial value, the thread control section 131 may set a separating matrix W obtained by learning in the corresponding thread, or may set a value different from a separating matrix W which is computed by using the separating matrix W obtained by learning in the corresponding thread. For example, the value, which is obtained after rescaling is applied, is substituted into the separating matrix holding portion 133 (refer to FIG. 12), and the value, which is obtained before rescaling is applied, is substituted into the learning-initial-value holding portion 152. Other examples will be described in the section of modifications later. It should be noted that it is also possible to perform the calculation of the initial learning value as preprocessing of the learning other than to perform the calculation in "the process of updating the separating matrix". Details will be given with reference to modified examples described later.

In step S254, the thread control section 131 sets timing information held in the observed-signal start/end timing holding portion 167 (refer to FIG. 14) of the corresponding thread, in the observed-signal-accumulation timing information holding portion 154 (refer to FIG. 13), and ends the process of updating the separating matrix and the like. Through such processing, the process of updating the separating matrix and the like is ended.

Through the process in step S254, an indication is provided regarding from observed signals in what time segment the separating matrix W being currently used, that is, the separating matrix W held in the separating matrix holding portion 133 has been learned.

Figure 26:
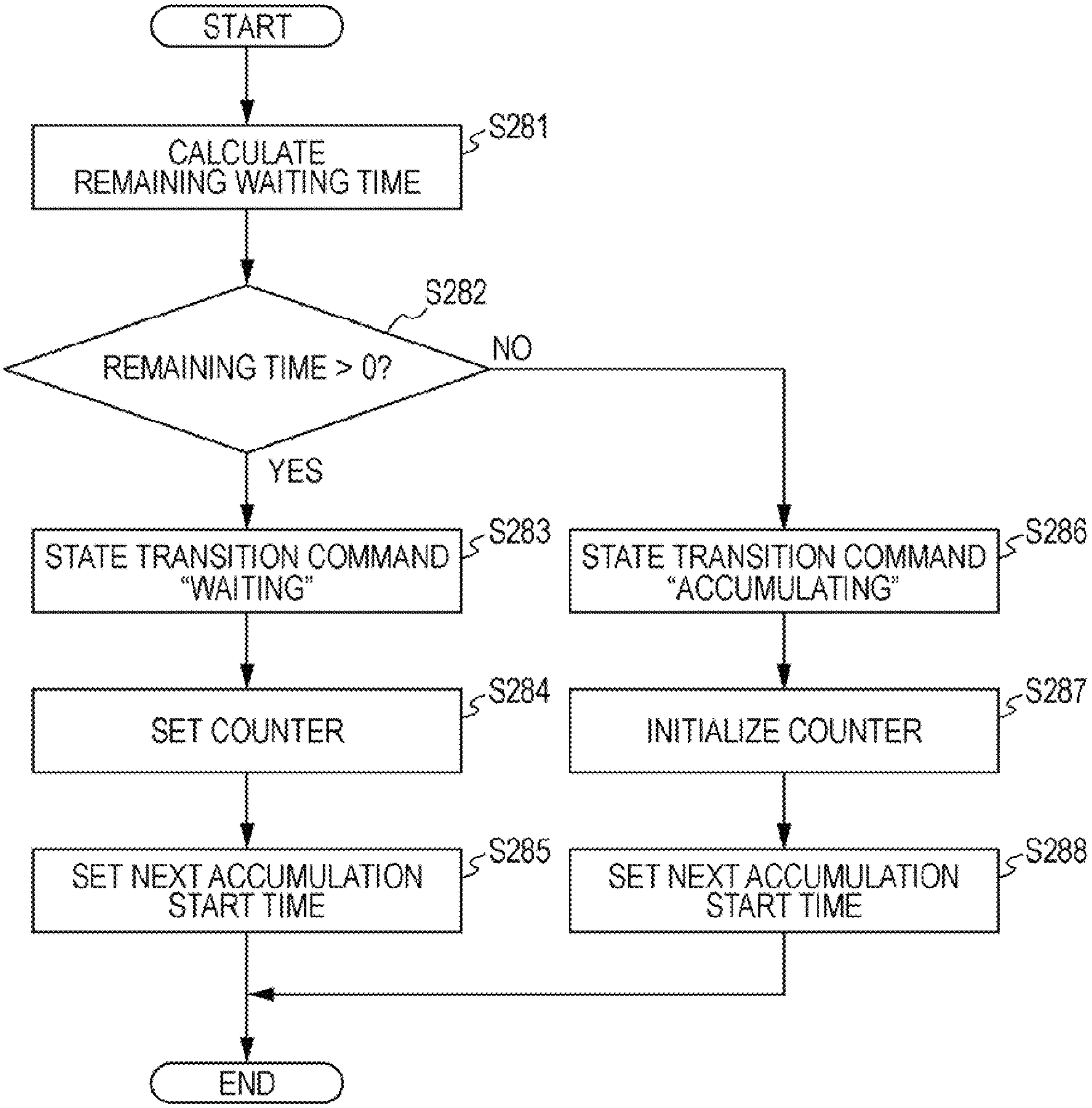
FIG. 26 is a flowchart illustrating a wait-time setting process that is executed in step S241 in the flowchart shown in FIG. 24.

Next, referring to the flowchart in FIG. 26, a description will be given of the wait-time setting process, which is executed in step S241 in the flowchart shown in FIG. 24.

In step S281, the thread control section 131 calculates the remaining wait time.

Specifically, let rest represent the remaining wait time (the number of frames), Ct represent the planned-accumulation-start timing (the frame index or the corresponding relative time) held in the planned-accumulation-start timing specifying information holding portion 153 (refer to FIG. 13), Ft represent the current frame index held in the current-frame-index holding counter 151, and block_shift represent the block shift width. Then, the thread control section 131 computes the remaining wait time rest as $$\text{rest}=Ct+\text{block\_shift}-Ft.$$

That is, since Ct+block_shift means the planned next accumulation start time, by subtracting Ft from this, the "remaining time until the planned next accumulation start time" is found.

In step S282, the thread control section 131 determines whether or not the calculated remaining wait time rest is a positive value. If it is determined in step S282 that the calculated remaining wait time rest is not a positive value, that is, the calculated value is zero or a negative value, the process advances to step S286 described later.

If it is determined in step S282 that the calculated remaining wait time rest is a positive value, in step S283, the thread control section 131 issues to the corresponding thread a state transition command for causing the state of the thread to transition to the "waiting" state.

In step S284, the thread control section 131 sets the value of the counter 166 (refer to FIG. 14) of the corresponding thread to thread_len-rest. Thereby, the "waiting" state is continued until the value of the counter reaches thread_len.

In step S285, the thread control section 131 adds the value of block_shift to the value Ct held in the planned-accumulation-start timing specifying information holding portion 153 (refer to FIG. 13). That is, the thread control section 131 sets the value of Ct+block_shift as the next accumulation start timing in the planned-accumulation-start timing specifying information holding portion 153. Then, the remaining-wait-time calculating process is ended.

If it is determined in step S282 that the calculated remaining wait time rest is not a positive value, that is, the calculated value is zero or a negative value, this means that accumulating has not started even through the planned-accumulation-start timing is passed. Therefore, it is necessary to start accumulating immediately. Accordingly, in step S286, the thread control section 131 issues to the corresponding thread a state transition command for causing the state of the thread to transition to the "accumulating" state.

In step S287, the thread control section 131 initializes the value of the counter (for example, sets the counter to 0).

In step S288, the thread control section 131 sets the next accumulation start timing, that is, Ft indicating the current frame index, in the planned-accumulation-start timing specifying information holding portion 153, and ends the remaining-wait-time calculating process.

Through such processing, in accordance with the time necessary for the "learning state" in each thread, the time, for which each thread is to be placed in the "waiting" state, can be set.

3-4. Separation Process (S106)

Next, referring to the flowchart shown in FIG. 27, description will be given of details of the separation process as the process in step S106 of the flowchart shown in FIG. 17.

Figure 27:
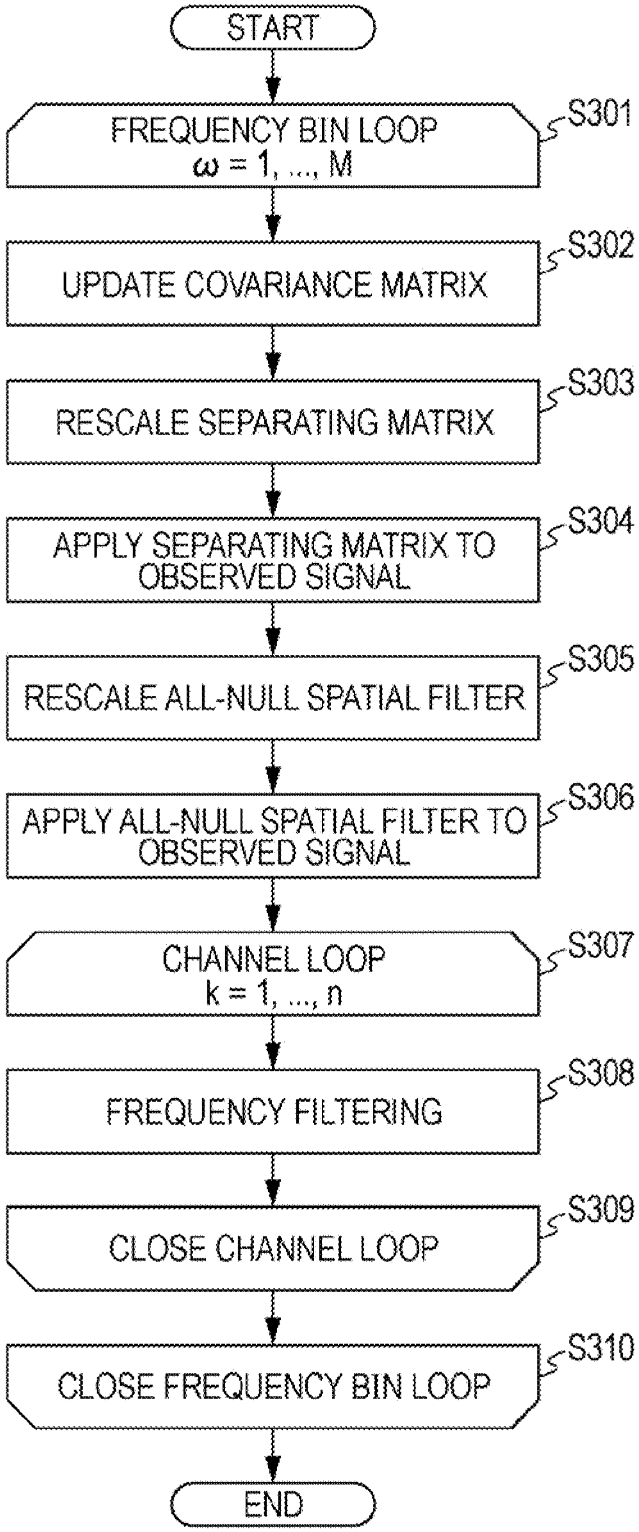
FIG. 27 is a flowchart illustrating a separation process that is executed in step S106 in the flowchart shown in FIG. 17.

The steps S301 to S310 shown in the flow of FIG. 27 are a loop process, and the processes within the loop are performed for each frequency bin. It should be noted that, instead of the loop process, those steps may be executed as parallel processes.

In step S302, necessary covariance matrices are calculated in advance by the rescaling to be described later. This is a process corresponding to the covariance matrix calculation section 125 shown in FIG. 12. As the rescaling process, there are step S303 which is a process for the separating matrix and step S305 which is a process for the all-null spatial filter. However, all of them can be calculated from the covariance matrices of the observed signals. Hence, in step S302, the covariance matrices of the observed signals are calculated on the basis of the Expression [4.3] below.

Numerical Expression 4

$$R(\omega)=\langle X(\omega,t)Y(\omega,t)^H\rangle_t \operatorname{diag}(\langle Y(\omega,t)Y(\omega,t)^H\rangle_t)^{-1} \tag{4.1}$$

$$=\sum_{XX}(\omega)W(\omega)^H \operatorname{diag}\left(W(\omega)\sum_{XX}(\omega)W(\omega)^H\right)^{-1} \tag{4.2}$$

$$\sum_{XX}(\omega)=\langle X(\omega,t)X(\omega,t)^H\rangle_t \tag{4.3}$$

$$\sum_{XX}(\omega)\leftarrow\sum_{XX}(\omega)-\frac{1}{L}X(\omega,t-L)X(\omega,t-L)^H+\frac{1}{L}X(\omega,t)X(\omega,t)^H \tag{4.4}$$

-continued $$R(\omega)=\begin{bmatrix} R_{11}(\omega) & \cdots & R_{1n}(\omega) \\ \vdots & \ddots & \vdots \\ R_{n1}(\omega) & \cdots & R_{nn}(\omega) \end{bmatrix} \quad [4.5]$$

$$W'(\omega)=\mathrm{diag}(R_{l1}(\omega), \ldots , R_{l1}(\omega))W(\omega) \quad [4.6]$$

$$Y'(\omega,t)=W'(\omega)X(\omega,t) \quad [4.7]$$

$$\mu_k(\omega)=\min\left\{\frac{|X_l(\omega,t)|}{\left|\sum_{k=1}^{n} Y'_k(\omega,t)\right|}, 1\right\} \quad [4.8]$$

$$Y'(\omega,t) \leftarrow \mathrm{diag}(\mu_1(\omega), \ldots , \mu_n(\omega))Y'(\omega,t) \quad [4.9]$$

However, the segment in which the uniform operation $<\bullet>_t$ is performed is the block 87 including the current time shown in FIG. 8, and includes the current frame. Hence, letting the current frame index be t, and the length of the block segment 87 (the number of frames) including the current time be L, by performing the operation of Expression [4.4] for each frame, the covariance matrices of the observed signals are updated.

Next, in step S303, the rescaling of the separating matrix is performed. The rescaling is the same as the "frequent rescaling" described above in the section of "1. Configuration of Embodiment of the Invention and Brief Overview of Processing". The purpose of the rescaling process is for reducing distortion which is caused when the sudden sound is output. Basic idea of the rescaling is such that the separation results are projected onto specific microphones. Here, "projected onto specific microphones" means that, for example in FIG. 1, the signal observed by the first microphone is decomposed into components, which are derived from the respective sound sources, with the scales maintained.

The rescaling process is performed by using the frame including the current observed signals among the frames as data units which are cut out from the observed signals. As described above, the covariance matrix calculation section 125 of the separation processing unit 123 inputs the Fourier transform data of the observed signals generated by the Fourier transform section 124, thereby calculating the covariance matrices of the observed signals for each frame. The covariance matrices obtained herein are used to perform the rescaling for each frame in each of the separating matrix application section 126 and all-null spatial filtering section 127.

For the rescaling process, first a rescaling matrix R(ω) is found on the basis of Expressions [4.1] and [4.2] mentioned above. Next, a diagonal matrix, in which the 1-th row ("1" (a lower-case letter of L) is an index of the microphone as the projection target) of the rescaling matrix R(ω) is formed as its elements, is found (the first term of the right side of Expression [4.6]). The diagonal matrix is multiplied to the separating matrix W(ω) before the rescaling, thereby obtaining a rescaled separating matrix W'(ω) (Expression [4.6]).

In step S304, the rescaled separating matrix W'(ω) is multiplied to the observed signal X(ω,t) (Expression [4.7]), thereby obtaining the separating-matrix application result Y'(ω,t).

$$Y'(\omega,t)=W'(\omega)\times X(\omega,t)$$

This process corresponds to a linear filtering process using the rescaled separating matrix W'(ω) to the observed signal X(ω,t).

The processes in steps S303 and S304, in the processing example shown in FIG. 8, corresponds to the processes of acquiring the observed signal X(t) 82 at the current time, and applying the separating matrix 83.

The separating matrix 83 shown in FIG. 8 is a separating matrix obtained from the learning data block 81. As described above, the rescaling in the related art had been performed by using the learning data of the learning data block 81. In contrast, in the processing according to the embodiment of the invention, in step S303, the block, of which the end is the current time, with a regular length, that is, the block 87 including the current time shown in FIG. 8 is set, thereby performing the rescaling by using the observed signals in the segment of the block 87 including the current time. Through such processing, it is also possible to adjust the scale (=reduce the distortion thereof) for the sudden sound at an early stage.

Further, readjustment based on Expressions [4.8] and [4.9] is performed as necessary. This is a process of checking whether the sum of the elements of the rescaled separating-matrix application result Y'(ω,t) does not exceed the absolute value of the observed signal $X_1(\omega,t)$ corresponding to the microphone as a projection target and, if the sum exceeds the absolute value, decreasing the absolute value of Y'(ω,t). The rescaling factor obtained by Expression [4.1] tends to be a large value as long as the sound remains in the segment (87 in FIG. 8) even immediately after a large sound is played and stopped. As a result, even when the current observed signal is originated from an almost silent sound (a background sound), sometimes, the background sound may be enhanced by a large scale. However, by performing readjustment based on Expressions [4.8] and [4.9], it is possible to prevent the increase in scale.

Next, in step S305, the rescaling is performed on the all-null spatial filter. The purpose of the rescaling is for canceling out the sudden sounds through the later-described frequency filtering by adjusting the scale between the sudden sound which is included in the application result of the all-null spatial filter and the sudden sound which is included in the application result of the separating matrix.

The separation processing unit 123 shown in FIG. 12 performs the above-mentioned frequent rescaling on frame-by-frame basis. That is, the separating matrix, which is subjected to the rescaling process as scale adjustment which uses a frame including the current observed signal among frames as data units cut out from the observed signals, and the all-null spatial filter, which is subjected to the rescaling process in the same manner, are generated in steps S303 and S305. In step S304, a process using the rescaled separating matrix is performed, and in step S306, a process using the rescaled all-null spatial filter is performed.

For example, in the configuration shown in FIG. 8, the all-null spatial filter 84 is a filter (a vector or a matrix) which form null beams in all playing-sound-source directions existing in the segment of the learning data block 81, and has a function of passing only the sudden sound, that is, the sound in the direction from which sound had not been played in the learning data block 81. The reason is that the sound which had been played in the learning data block 81 is removed by the null, which is formed by the filter, as long as the sound keeps playing without changing its position, whereas the null is not formed in the direction of the sudden sound and thus the sudden sound is transmitted.

In step S305, in the process of rescaling the all-null spatial filter, the rescaling matrix Q(ω) is found by Expressions [7.1] and [7.2] below (Y'(ω,t) in Expression [7.1] is a value prior to the application of the readjustment of Expression [4.9]).

Numerical Expression 5

$$Q(\omega) = \langle Y'(\omega, t)\overline{Z(\omega, t)}\rangle_t / \langle Z(\omega, t)\overline{Z(\omega, t)}\rangle_t \quad [7.1]$$

$$= W'(\omega)\sum_{XX}(\omega)B(\omega)^H / B(\omega)\sum_{XX}(\omega)B(\omega)^H \quad [7.2]$$

$$B'(\omega) = Q(\omega)B(\omega) \quad [7.3]$$

$$Z'(\omega, t) = \mathrm{diag}(\mu_1(\omega), \ldots , \mu_n(\omega))B'(\omega)X(\omega, t) \quad [7.4]$$

However, B(ω) in Expression [7.2] is the all-null spatial filter before the rescaling, and is a filter which generates one output from n inputs (a method of calculating B(ω) will be described later). Further, Z(ω,t) in Expression [7.1] is the all-null spatial filtering result before the rescaling, and is calculated by Expression [5.5]below.

Numerical Expression 6

$$B(\omega) = e_l - \sum_{k=1}^{n} W_k(\omega) \quad [5.1]$$

$$B(\omega) = e_l - \sum_{k=1}^{n} W_k(\omega) \quad [5.1]$$

$$e_l = [0, \ldots , 0, 1, 0, \ldots , 0] \quad [5.2]$$

(only the $l$-$th$ element is 1)

$$X_l(\omega, t) - \sum_{k=1}^{n} W_k(\omega)X(\omega, t) \approx 0 \quad [5.3]$$

$$X_l(\omega, t) - \sum_{k=1}^{n} W_k(\omega)X(\omega, t) = B(\omega)X(\omega, t) \quad [5.4]$$

$$Z(\omega, t) = B(\omega)X(\omega, t) \quad [5.5]$$

Here, Z(ω,t) is not a vector, but a scalar. Further, Q(ω) is a row vector (a horizontally long vector) formed of n elements. By multiplying Q(ω) by B(ω) (Expression [7.3]), the rescaled all-null spatial filter B'(ω) is obtained. B'(ω) is a matrix with n rows and n columns.

In step S306, by multiplying the rescaled all-null spatial filter B'(ω) by the observed signals (Expression [7.4]), the rescaled all-null spatial filtering result Z'(ω,t) is obtained. However, $\mu_k(\omega)$ in Expression [7.4] is obtained by Expression [4.8], and when readjusting Y'(ω,t), is for readjusting Z'(ω,t) as well.

The all-null spatial filtering result Z'(ω,t) is a column vector (a vertically long vector) formed of n elements, and the k-th element thereof is the all-null spatial filtering result in which the scale is adjusted to Y'k(ω,t).

Steps S305 and S306, as described with reference to the process in FIG. 8, corresponds to a process of acquiring the observed signal X(t) 82 at the current time, generating the rescaled all-null spatial filter B'(ω) 84, and multiplying the observed signal to the rescaled all-null spatial filter B'(ω) (Expression [7.4]) so as to thereby obtain the rescaled all-null spatial filtering result Z'(ω,t).

The next steps S307 to S310 are a loop, and means that the frequency filtering in step S308 is performed for each channel. It should be noted that, instead of the loop, the steps may be executed as parallel processes.

The frequency filtering in step S308 is a process of multiplying, for each frequency, a different factor to the rescaled separating-matrix application result Y'k(ω,t) (the k-th element of the vector Y'(ω,t)). However, in the embodiment of the invention, the frequency filtering is used for removing the rescaled all-null spatial filtering result (substantially the same as the sudden sound) from the rescaled separating-matrix application result Y'k(ω,t).

As examples of the frequency filtering, the following three points will be described.

(1) Complex Subtraction (2) Spectral Subtraction (3) Wiener Filter (1) First, the frequency filtering based on the complex subtraction will be described. This process is a filtering process of removing signal components corresponding to the signals, which are filtered with the all-null spatial filters, included in the separated signals through the process of subtracting the signals filtered with the all-null spatial filters from the separated signals which are generated by applying the separating matrix.

The following Expression [8.1] is an expression representing the complex subtraction.

Numerical Expression 7

$$U_k(\omega, t) = Y'_k(\omega, t) - \alpha_k Z'_k(\omega, t) \quad [8.1]$$

$$U_k(\omega, t) = G_k(\omega, t)\frac{Y'_k(\omega, t)}{|Y'_k(\omega, t)|} \quad [8.2]$$

$$G_k(\omega, t) = \max\{|Y'_k(\omega, t)| - |\alpha_k Z'_k(\omega, t)|, |\beta Y'_k(\omega, t)|\} \quad [8.3]$$

$$G_k(\omega, t)^2 = \max\{|Y'_k(\omega, t)|^2 - |\alpha_k Z'_k(\omega, t)|^2, |\beta Y'_k(\omega, t)|^2\} \quad [8.4]$$

$$\alpha_k = \alpha f(r_k) \quad [8.5]$$

$$r_k = \frac{V_k}{\max_k [V_k]} \quad [8.6]$$

$$r_k = \frac{V_k}{V_{max}} \quad [8.7]$$

$$V_k = \sum_{\omega=1}^{M} \langle |W_k(\omega)X(\omega, t)|^2\rangle_t \quad [8.8]$$

$$= \sum_{\omega=1}^{M} W_k(\omega)\langle X(\omega, t)X(\omega, t)^H\rangle_t W_k(\omega)^H \quad [8.9]$$

$$f(r_k) = \begin{cases} f_{min} & (r_k < r_{min}) \\ \dfrac{r_k - r_{min}}{r_{max} - r_{min}} & (r_{min} \le r_k \le r_{max}) \\ 1 & (r_{max} < r_k) \end{cases} \quad [8.10]$$

$$r_k = \frac{V_k}{\langle V_k\rangle_k} \quad [8.11]$$

$$SNR_k^{[post]}(\omega, t) = \frac{|Y'_k(\omega, t)|^2}{|\alpha_k Z'_k(\omega, t)|^2} \quad [8.12]$$

$$SNR_k^{[prior]}(\omega, t) \leftarrow \kappa\frac{|U_k(\omega, t-1)|^2}{|\alpha_k Z'_k(\omega, t)|^2} + (1-\kappa)\max\{SNR_k^{[post]}(\omega, t) - 1, 0\} \quad [8.13]$$

$$G_k(\omega, t) = \frac{SNR_k^{[prior]}(\omega, t)}{SNR_k^{[prior]}(\omega, t) + 1}|Y'_k(\omega, t)| \quad [8.14]$$

In Expression [8.1] described above, the factor $\alpha_k$ is a real number of 0 or more. By using the factor, "(3) Determination for Individual Channels", which is described above in the section of "1. Configuration of Embodiment of the Invention and Brief Overview of Processing", is realized.

That is, in order to perform different processes in accordance with characteristics of the sudden sound, it is determined whether the respective output channels of ICA output the signals corresponding to the sound sources, and one of the processes is performed depending on the result thereof.

i) If it is determined that the signals corresponds to the sound sources, both the "frequent rescaling" and the "all-null spatial filter & frequency filtering" are applied.

As a result, the sudden sound is removed from the channels.

ii) If it is determined that the signals does not correspond to the sound sources, only the "frequent rescaling" is applied. As a result, the sudden sound is output from the channels.

This is referred to as "determination for individual channels".

As described above, depending on whether the respective channels output the signals corresponding to the sound sources before the sudden sound is generated, the amount of reduction in sudden sound is adjusted.

There are various methods of determining whether or not the output of each channel corresponds to the sound sources. However, in the following description, a method of using a power of the separating-matrix application result is adopted. That is, the following properties are used: the channels corresponding to the sound sources have relatively large powers; and the channels not corresponding to the sound sources have relatively small powers.

The factor $\alpha_k$ represented by Expression [8.1] described above is calculated by Expression [8.5]. In this expression, $r_k$ is a power ratio of the channel k, and $\alpha$ is the maximum of $\alpha_k$. The power ratio is a ratio of a power of each channel (k) to a total power of all observed sounds or to a power of the maximum sound. The power ratio $r_k$ is calculated by applying Expression [8.6] or [8.7], where the power (the volume) of the channel k is represented by Vk. Details of the expressions will be described later.

Figure 28:
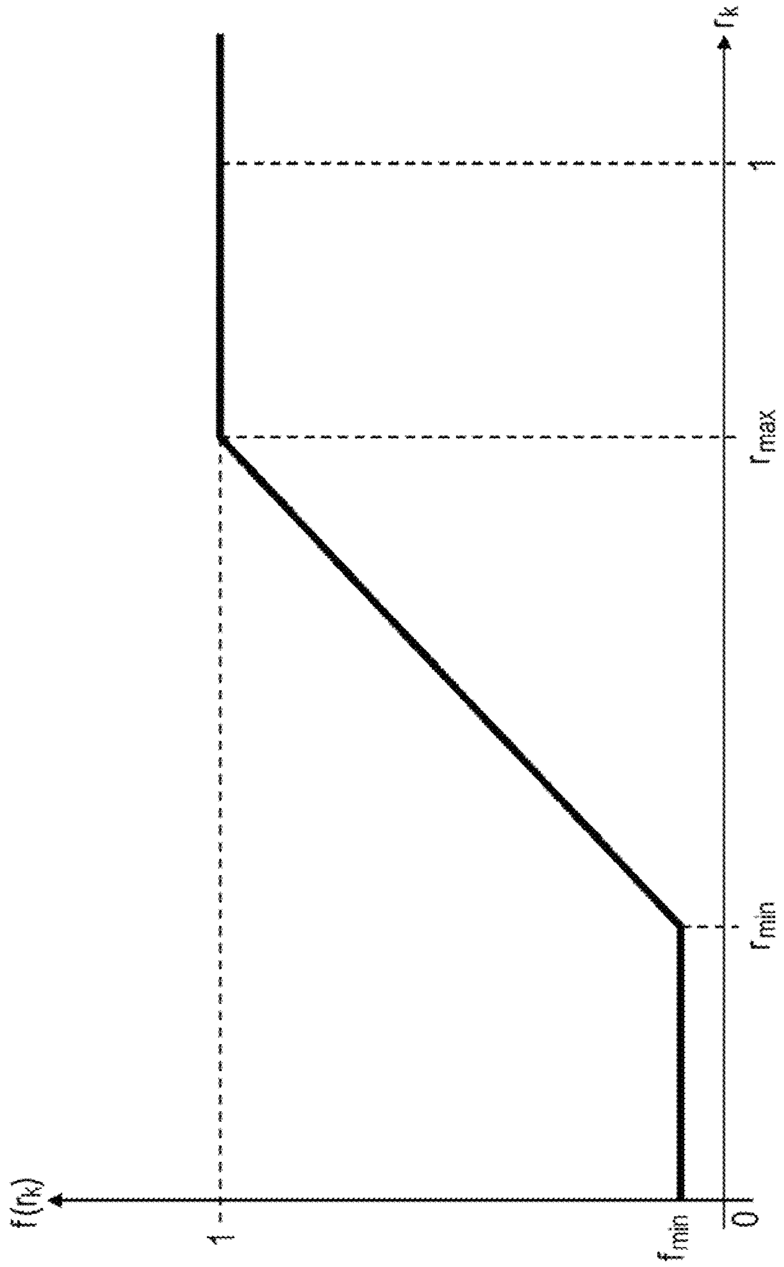
FIG. 28 is a diagram illustrating an example of a function applied to calculation of a power ratio.

The f( ) is defined as a function of setting a value, which is equal to or more than 0 and equal to or less than 1, to a return value, and a function represented by Expression [8.10] and the graph shown in FIG. 28. The purpose of the function is for preventing presence/absence of the subtraction from being switched rapidly by the power ratio $r_k$ (conversely, when $r_{min}=r_{max}$, at the point at which the power ratio exceeds the threshold value, the presence/absence of the subtraction is switched rapidly).

The $f_{min}$ in Expression [8.10] is 0 or a small positive value. The effect of setting $f_{min}$ to a value other than 0 will be described later.

The frequency filtering in step S308 is performed by the frequency filtering section 128 shown in FIG. 12. The frequency filtering section 128 performs a process of changing the level of removal of the components corresponding to the signals filtered with the all-null spatial filters from the separated signal in accordance with the channel of the separated signals. Specifically, the removal level is changed in accordance with the power ratio of the channel of the separated signals.

Figure 31:
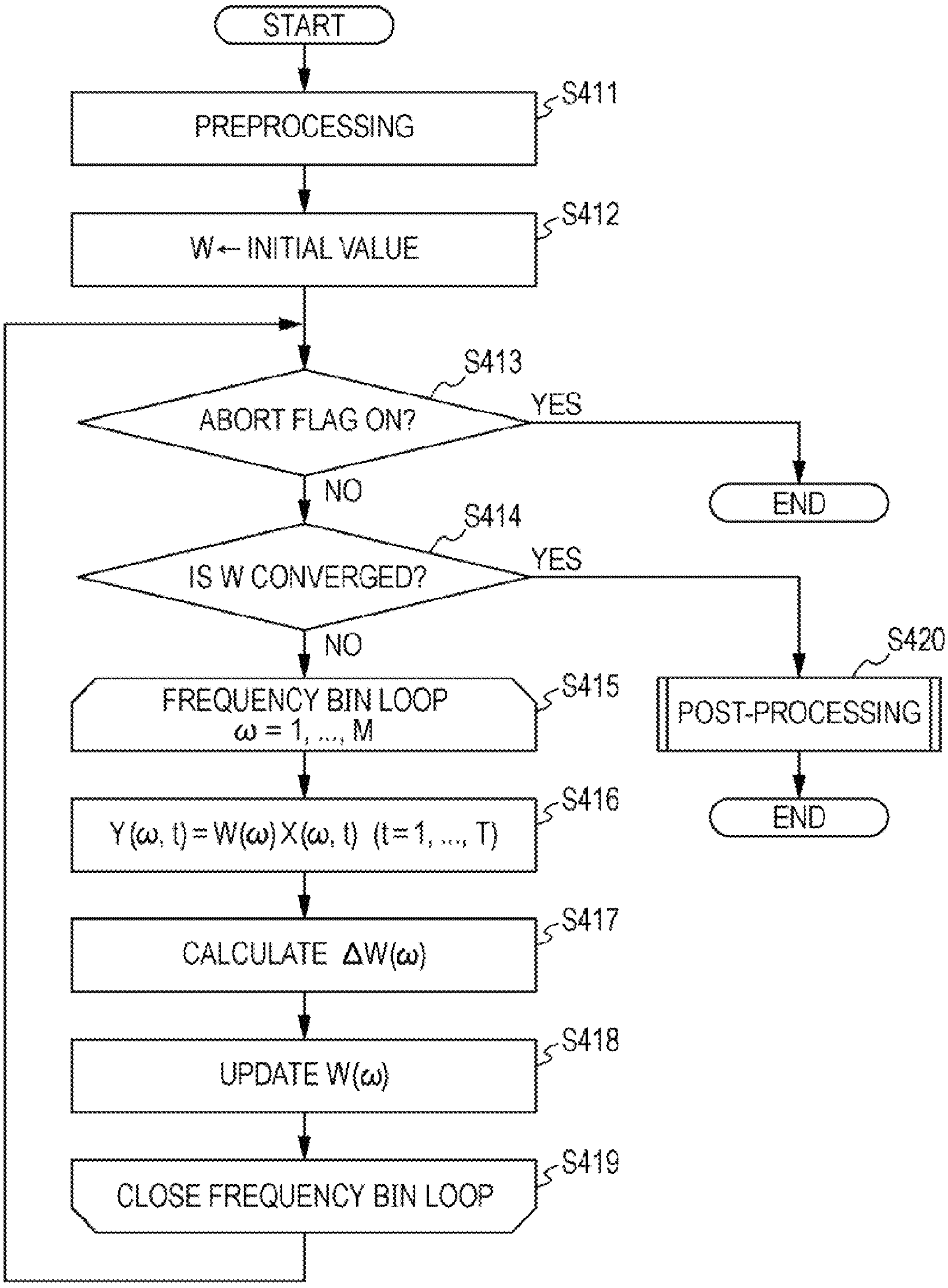
FIG. 31 is a flowchart illustrating an example of a separating-matrix learning process, which is an example of a process executed in step S405 in the flowchart shown in FIG. 30.
Figure 32:
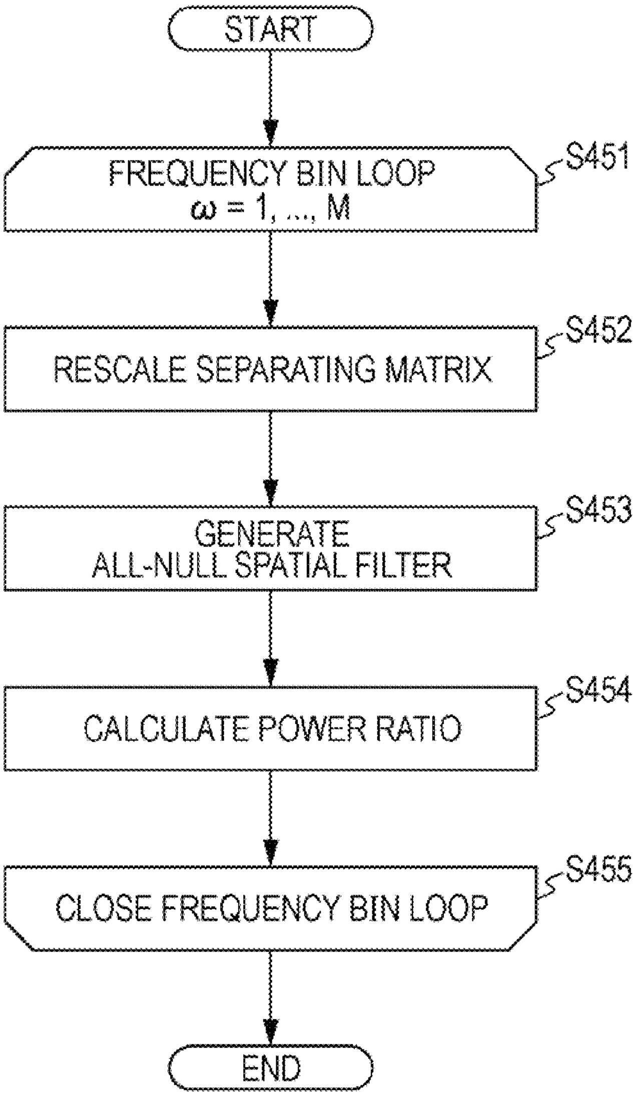
FIG. 32 is a flowchart illustrating post-processing that is executed in step S420 in the flowchart shown in FIG. 31.

The power ratio $r_k$ is calculated by Expressions [8.6] to [8.9], but the uniform operation $<\bullet>_t$ included in Expressions [8.8] and [8.9] is performed in the same segment as the observed signals used for learning the separating matrix. That is, the segment is not the segment of the block 87, which includes the current time in the processing example shown in FIG. 8, but the segment of the learning data block 81. In such expressions, the latest frame data is not used, it is not necessary to calculate $\alpha_k$ and $r_k$ for each frame, and it is preferable to perform the calculation at a timing at which the learning of the separating matrix is finished. Accordingly, the detailed method of calculating $r_k$ will be described in the latter part with reference to the flow in FIG. 32. FIG. 32 illustrates details of the post-processing of step S420 in the flowchart of the separating matrix learning shown in FIG. 31.

Through the complex subtraction (Expression [8.1]), it is also possible to remove the sudden sound. However, since that is a kind of the linear filtering, it is difficult to solve the problem in "the trade-off between the tracking lag and the residual sound" described in "Problems of Related Art". On the other hand, when non-linear frequency filtering described below is used, the trade-off can be solved.

Expression [8.2] described above is a general expression of the frequency filtering. That is, the term, which is obtained by normalizing the rescaled separating-matrix application result Y'k(ω,t) by the absolute value, that is, $$Y'k(\omega,t)/|Y'k(\omega,t)|$$

is multiplied by gain Gk(ω,t). Depending on the frequency filtering, there are various methods of calculating the gain, but in the spectral subtraction method (the spectral subtraction) described below, the gain is calculated from a difference of spectral amplitudes.

(2) The frequency filtering based on the spectral subtraction will be described.

The frequency filtering process based on the spectral subtraction is a filtering process of removing signal components, which correspond to the signals, which are filtered with the all-null spatial filters, included in the separated signals generated by applying the separating matrix, through a frequency filtering process based on a spectral subtraction of setting the signals filtered with the all-null spatial filters as noise components.

The expressions in the spectral subtraction method is just as in Expressions [8.3] and [8.4] described above. Expression [8.3] is subtraction of the amplitude itself, and is called Magnitude Spectral Subtraction. Expression [8.4] is subtraction of the square of the amplitude, and is called Power Spectral Subtraction. In both expressions, max{A, B} represents an operation of setting a larger one of the two parameters to a return value. The $\alpha_k$ is a term which is generally called an over-subtraction factor. However, in the embodiment of the invention, by computing Expression [8.5], the term has a function of adjusting an amount of the subtraction depending on whether "the signal corresponding to the sound source is output". The β is called a flooring factor, and is a small value (for example, 0.01) close to 0. The second term of max{ } prevents the gain obtained after the subtraction from being 0 or a negative value.

The calculation of $\alpha_k$ is, as in the complex subtraction, performed on the basis of Expressions [8.5] to [8.10]. In Expression [8.10], when $f_{min}$ is set to a small positive value instead of 0, even when $r_k<r_{\_min}$, the frequency filtering has a small effect, and thus it is possible to remove the "residual sound" to a certain extent.

(3) The frequency filtering based on Wiener filter will be described.

The Wiener filter is a filter for calculating the factor $G_k(\omega,t)$ on the basis of the priori SNR which is a power ratio between the target sound and the interference sound. When the priori SNR is given, it is common knowledge that the factor found by the Wiener filter is optimal in terms of square error minimization in the performance of removing the interference sound. Regarding details of the Wiener filter, refer to, for example, the following.

Japanese Patent Application No. 2007-533331 [H18.8.31]

PCT Application No. WO07/026,827 [H21.3.12]

Title of the Invention: Post Filter for Microphone Array

Applicant: Japan Advanced Institute of Science and Technology, Toyota Motor Corp.

Inventors: Masato AKAGI, Junfeng LI, Masaaki UECHI, and Kazuya SASAKI

On the basis of the Wiener filter, in order to calculate the factor, the value of the priori SNR is necessary, but the value is generally not given. Here, instead of the priori SNR, a posteriori SNR, which is a power ratio between the observed signal and the interference sound, and a one-frame-based priori SNR, in which the processing result in the previous frame is regarded as the target sound, may be used. Accordingly, there are proposed methods of estimating the priori SNR for each frame by using the above-mentioned SNRs, and the methods are called Decision Directed (DD) methods. The method of removing the sudden sound by using the DD method will be described with reference to Expressions [8.12] to [8.14] (in the expressions, the superscript [post] and [prior] is to represent "posteriori" and "priori" distinctly).

Expression [8.12] is an expression for finding the posteriori SNR corresponding to one frame. In the expression, $\alpha_k$ is calculated from Expression [8.5] and the like. However, in the Wiener filter, it is not necessary to perform the over-subtraction, and thus the setting may be made so that $\alpha=1$. Alternatively, by setting $\alpha<1$, it is also possible to reduce the effect of removal of the sudden sound. Next, on the basis of Expression [8.13], the estimate value of the priori SNR is calculated. In the expression, K is a forgetting factor, and uses a value less than 1 and close to 1.

From the estimate value of the priori SNR, the factor $G_k(\omega, t)$ of the frequency filtering is calculated by using Expression [8.14].

As the frequency filtering method, in the above, (1) Complex Subtraction, (2) Spectral Subtraction, and (3) Wiener Filter, were described, but other than the methods, the following methods can be also adopted.

(4) Minimum Mean Square Error (MMSE) Short Time Spectral Amplitude (STSA), or MMSE Log Spectral Amplitude (LSA)

Regarding details thereof, refer to the following.

* "MMSE STSA with Noise Estimation Based on Independent Component Analysis"

Ryo OKAMOTO, Yu TAKAHASHI, Hiroshi SARUWATARI and Kiyohiro SHIKANO,

Collection of Lecture Notes, Acoustical Society of Japan, 2-9-6, pp. 663-666, March 2009.

*Japanese Patent Publication No. 4172530, Noise Suppression Method, Apparatus, And Computer Program

*"Diffuse Noise Suppression by Crystal-Array-Based Post-Filter Design"

Nobutaka ITO, Nobutaka ONO, and Shigeki SAGAYAMA

Through the separation process according to the flowchart shown in FIG. 27, U1(ω,t) to Un(ω,t) are generated as separation results with a higher accuracy than the separation results of the related art.

4. Processing in Learning Thread in Thread Computation Section

The processes of the thread control section 131, which is shown in FIG. 12, and the thread computation section 132, which employs the respective learning threads 132-1 to 132-N, operate in parallel. Thus, the learning thread is run on the basis of a flow different from that for the thread control section. In the following, processing in the learning thread in the thread computation section will be described with reference to the flowchart in FIG. 29.

The thread computation section 132 is, after start-up, initialized in step S391. The start-up timing is a period of the initialization process in step S101 of the entire flow in FIG. 17, and is a timing for the process of securing the learning thread in step S152 of the flow shown in FIG. 19.

In the thread computation section 132, the learning thread is initialized in step S391 after the start-up. Then, the learning thread waits until an event occurs (blocks processing) (this "wait" is different from "waiting" which indicates one of the learning thread states). The event occurs when any of the following actions has been performed.

A state transition command has been issued.

Frame data has been transferred.

An end command has been issued.

The subsequent processing is branched in accordance with which event has occurred (step S392). That is, in accordance with the event input from the thread control section 131, the subsequent process is branched.

If it is determined in step S393 that a state transition command has been input, the corresponding command processing is executed in step S394.

If it is determined in step S393 that an input of a frame data transfer event has been received, in step S395, the thread 132 acquires frame data. Next, in step S396, the thread 132 accumulates the acquired frame data in the observed signal buffer 161 (refer to FIG. 14), returns to step S392, and waits for the next event.

The observed signal buffer 161 (refer to FIG. 14) has an array or stack structure, and observed signals are to be stored in a location of the same index as the counter.

If it is determined in step S393 that an end command has been input, in step S397, the thread 132 executes, for example, appropriate pre-termination processing such as freeing of the memory, and the process is ended.

Through such processing, processing is executed in each thread on the basis of control by the thread control section 131.

Figure 29:
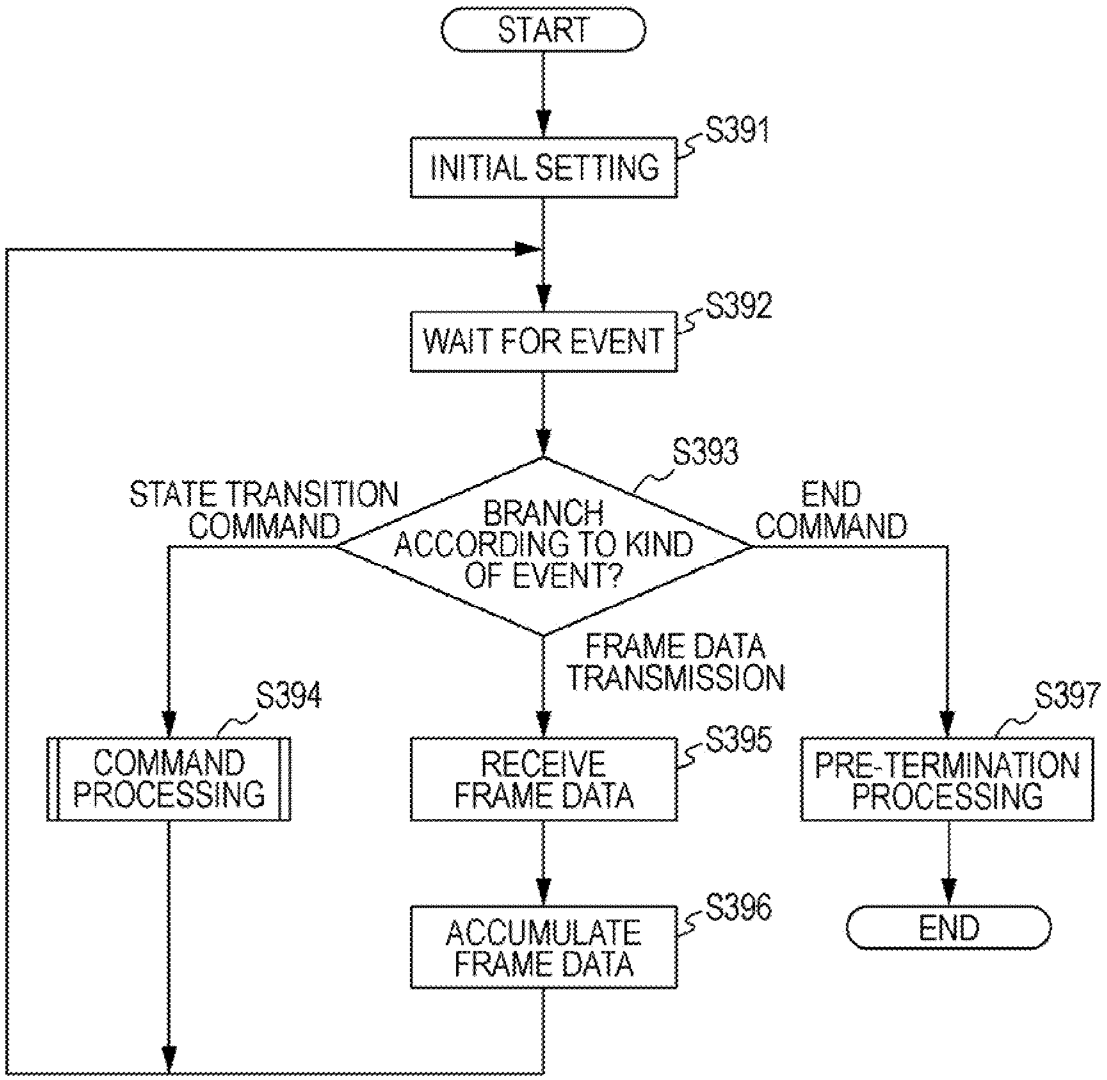
FIG. 29 is a flowchart illustrating processing in a learning thread.
Figure 30:
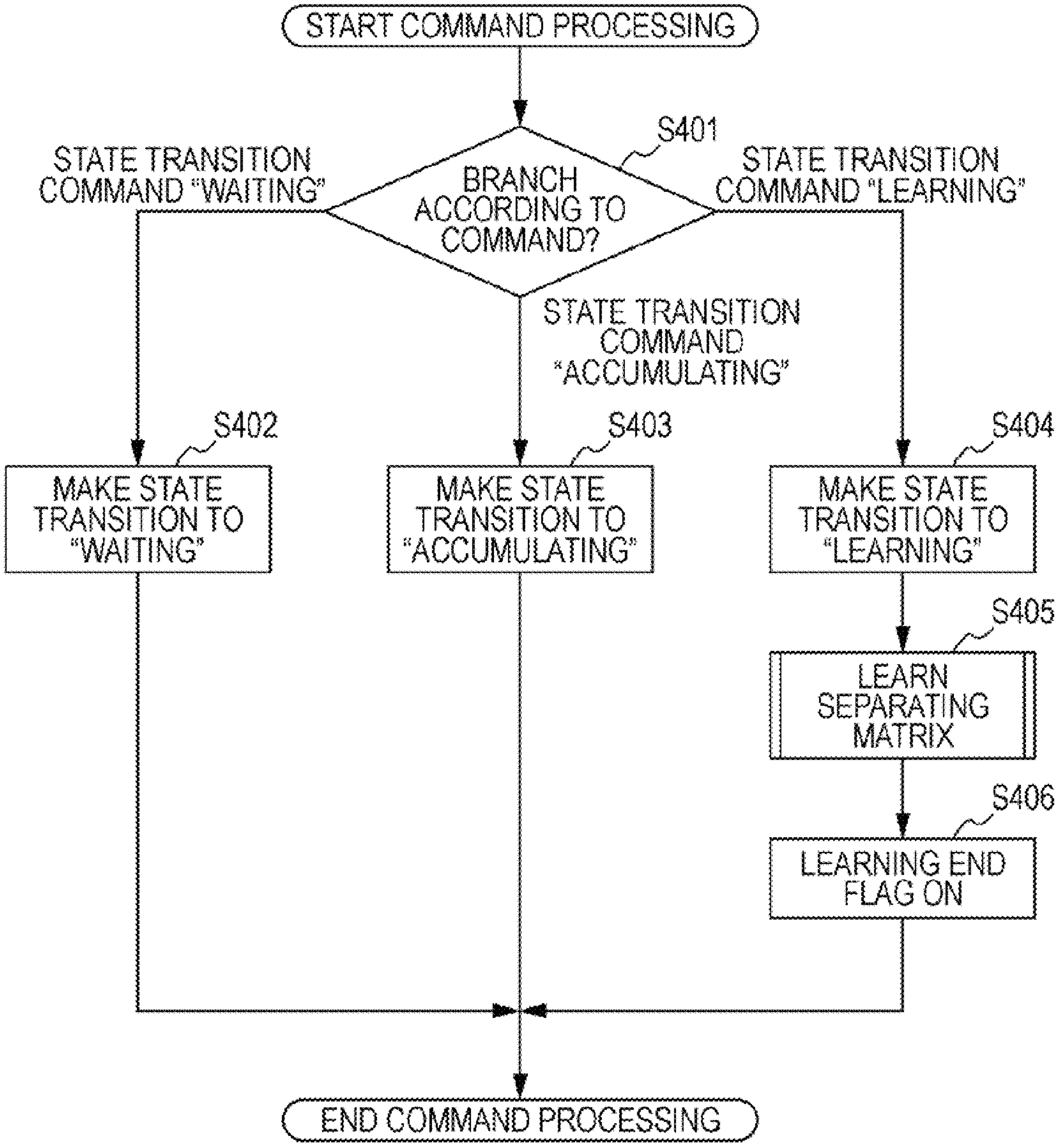
FIG. 30 is a flowchart illustrating command processing that is executed in step S394 in the flowchart shown in FIG. 29.

Next, referring to the flowchart in FIG. 30, a description will be given of the command processing which is executed in step S394 in the flowchart shown in FIG. 29.

In step S401, the thread 132 branches the subsequent processing in accordance with the supplied state transition command. In the following description, a command to the effect that "transition to the OO state" will be expressed as "state transition command "OO"".

If, in step S401, the supplied state transition command is a "state transition command "waiting"" that instructs transition to the "waiting" state, in step S402, the thread 132 stores information representing that the current state is "waiting" into the state storage portion 165 (refer to FIG. 14), that is, transitions into the state "waiting", and then ends the command processing.

If, in step S401, the supplied state transition command is a "state transition command "accumulating"" that instructs transition to the "accumulating" state, in step S403, the thread 132 stores information representing that the current state is "accumulating" into the state storage portion 165, that is, transitions into the state "accumulating", and then ends the command processing.

If, in step S401, the supplied state transition command is a "state transition command "learning"" that instructs transition to the "learning" state, in step S404, the thread 132 stores information representing that the current state is "learning" into the state storage portion 165, that is, transitions into the state "learning".

Further, in step S405, the thread 132 executes a separating-matrix learning process. Details of this process will be given later.

In step S406, to notify the thread control section 131 of the end of learning, the thread 132 sets the learning end flag 1680N and ends the process. By setting the flag, the thread 132 notifies the thread control section 131 to the effect that learning has just ended.

Through such processing, the state of each thread is made to transition on the basis of a state transition command supplied from the thread control section 131.

Next, referring to the flowchart in FIG. 31, a description will be given of an example of the separating-matrix learning process, which is an example of the process executed in step S405 in the flowchart shown in FIG. 30. This is a process of finding a separating matrix in batch, and is applicable to any algorithm in the form of batch processing. However, it is necessary to employ a method that is relatively permutation-free. In the following, a description will be given of an example that employs the configuration disclosed in Japanese Unexamined Patent Application Publication No. 2006-238409 "Audio Signal Separating Apparatus/Noise Removal Apparatus and Method" previously filed by the present applicant.

In step S411, as necessary, the learning computation portion 163 (refer to FIG. 14) of the thread 132 executes preprocessing on observed signals accumulated in the observed signal buffer 161.

Specifically, the learning computation portion 163 performs such processing as normalization or decorrelation (or pre-whitening) on observed signals accumulated in the observed signal buffer 161 before the learning loop is started. For example, when performing normalization, the learning computation portion 163 finds a standard deviation of observed signals from frames within a block, and, with the diagonal matrix formed by the inverse of the standard deviation represented by S, calculates X'=SX by Expression [9.1] below. Here, X is a matrix obtained from the observed signals of all frames within the block, and a segment expressed by the learning data block 81 of FIG. 8.

Numerical Expression 8

$$X'(\omega, t) = S(\omega)X(\omega, t) \quad [9.1]$$

$$Y(\omega, t) = W(\omega)X'(\omega, t) \quad [9.2]$$

$$W(\omega) \leftarrow R(\omega)W(\omega) \quad [9.3]$$

$$W(\omega) \leftarrow R(\omega)W(\omega)S(\omega) \quad [9.4]$$

$$\lambda_k(\omega) = \frac{\langle X_l(\omega, t)\overline{Y_k(\omega, t)}\rangle_t}{\langle Y_k(\omega, t)\overline{Y_k(\omega, t)}\rangle_t} \quad [9.5]$$

$$R(\omega) = \mathrm{diag}(\lambda_1(\omega), \ldots , \lambda_n(\omega)) \quad [9.6]$$

$$\sum_{XX}(\omega) = \langle X(\omega, t)X(\omega, t)^H\rangle_t \quad [9.7]$$

$$\sum_{XX}(\omega) = [p_1, \ldots , p_n]\mathrm{diag}(\lambda_1, \ldots , \lambda_n)[p_1, \ldots , p_n]^H \quad [9.8]$$

$$P(\omega) = \mathrm{diag}(\lambda_1, \ldots , \lambda_n)^{-1/2}[p_1, \ldots , p_n]^H \quad [9.9]$$

-continued $$X'(\omega, t) = P(\omega)X(\omega, t) \quad [9.10]$$

$$\langle X'(\omega, t)X'(\omega, t)^H\rangle_t = I \quad [9.11]$$

Meanwhile, decorrelation is a transformation that transforms a covariance matrix into a unit matrix. While there are several methods of decorrelation, description will be given herein of a method using eigenvectors and eigenvalues of the covariance matrices.

From the accumulated observed signal (for example, the learning data block 81 in FIG. 8), a covariance matrix $\Sigma_{XX}(\omega)$ is calculated for each frequency bin on the basis of Expression [9.7]. Next, when eigenvalue expansion is applied to the matrix, $\Sigma_{XX}(\omega)$ can be decomposed as represented by Expression [9.8] by using the eigenvalues $\lambda_1$ to $\lambda_n$ and the eigenvectors $p_1$ to $p_n$. Here, the eigenvectors are orthogonal to the unit vectors. The matrix P(ω) represented by Expression [9.9] is generated from the eigenvalues and eigenvectors, and then P(ω) is formed as a decorrelating matrix.

That is, when X'(ω,t) is represented as a term of multiplying P(ω) by the observed signal X(ω,t) (Expression [9.10]), the covariance matrices of X'(ω,t) satisfy the relationship of Expression [9.11].

By performing the decorrelation as preprocessing, it is possible to reduce the number of loops until convergence thereof in the learning. Further, in the embodiment of the invention, it is possible to generate the all-null spatial filter from the eigenvectors (details thereof will be described later).

The observed signal X that appears in the following expressions can also be expressed as the observed signal X' on which the preprocessing has been performed.

In step S412, the learning computation portion 163 acquires, as the initial value of a separating matrix, a learning initial value W held in the learning-initial-value holding portion 152 of the thread control section 131, from the thread control section 131.

The processes from steps S413 to S419 represent a learning loop, and these processes are repeated until W converges or until the abort flag becomes ON. The abort flag is a flag that is set ON in step S236 in the flow of the learning-state process in FIG. 24 described above. The abort flag becomes ON when a learning started later ends earlier than a learning started earlier. If it is determined in step S413 that the abort flag is ON, the process is ended.

If it is determined in step S413 that the abort flag is OFF, the process advances to step S414. In step S414, the learning computation portion 163 determines whether or not the value of the separating matrix W has converged. Whether or not the value of the separating matrix W has converged is determined by using, for example, a matrix norm. ||W|| as the norm of the separating matrix W (the square sum of all the matrix elements), and ||H|| as the norm of ΔW are calculated, and W is determined to have converged when the ratio between the two norms, ||ΔW||/||W||, is smaller than a predetermined value (for example, 1/1000). Alternatively, the determination may be simply made on the basis of whether or not the loop has been run a predetermined number of times (for example, 50 times).

If it is determined in step S414 that the value of the separating matrix W has converged, the process advances to step S420 described later, where post-processing is executed, and the process is ended. That is, the learning process loop is executed until the separating matrix W converges.

If it is determined in step S414 that the value of the separating matrix W has not converged (or when the number of times the loop is executed has not reached a predetermined value), the processing proceeds into the learning loop in steps S415 to S419. Learning is performed as a process of iterating Expressions [3.1] to [3.3] described above for all frequency bins. That is, to find the separating matrix W, Expressions [3.1] to [3.3] are iterated until the separating matrix W converges (or a predetermined number of times). This iteration is referred to as "learning". The separation results Y(t) are represented by Expression [3.4]

Step S416 corresponds to Expression [3.1].

Step S417 corresponds to Expression [3.2].

Step S418 corresponds to Expression [3.3].

Since Expressions [3.1] to [3.3] are to be computed for each frequency bin, by running a loop with respect to frequency bins in steps S415 and S419, ΔW is found for all frequency bins.

It should be noted that, as an algorithm of ICA, an expression other than Expression [3.2] can be applied. For example, when the decorrelation is performed as preprocessing, it may be preferable to use the following Expressions [3.13] to [3.15] in the gradient method based on the orthonormal constraint. Here, X'(ω,t) in Expression [3.13] represents the decorrelated observed signal.

Numerical Expression 9

$$Y(\omega,t)=W(\omega)X'(\omega,t) \quad [3.13]$$

$$D(\omega)=\langle\phi_\omega(Y(t))Y(\omega,t)^H\rangle_t \quad [3.14]$$

$$\Delta W(\omega)=\{D(\omega)-D(\omega)^H\}W(\omega) \quad [3.15]$$

After the above loop process ends, the process returns to step S413 to perform the determination with regard to the abort flag, and the determination of the convergence of the separating matrix in step S414. The process is ended when the abort flag is ON. If convergence of the separating matrix is confirmed in step S414 (or a specified number of loops has been reached), the process advances to step S420.

Details of the post-processing in step S420 will be described with reference to the flowchart shown in FIG. 32.

In step S420, the following processes are executed as post-processing.

(1) Making the separating matrix correspond to the observed signals prior to normalization.

(2) Adjusting the balance between frequency bins (the rescaling).

First, a description will be given of the process of (1) making the separating matrix correspond to the observed signals prior to normalization.

In a case where normalization has been performed as preprocessing, the separating matrix W found by the above-described processes (steps S415 to S419 in FIG. 31) is not for separating the observed signals X prior to normalization, but is for separating the observed signals X' obtained after normalization. That is, even when W is multiplied by X, the results thereof are not the separated signals. Accordingly, the separating matrix W(ω) found by the above-described processes is corrected so as to be transformed into one for separating the observed signal X(ω,t) prior to normalization.

Specifically, assuming that the matrix applied at the time of normalization is S(ω), in order to associate W(ω) with the observed signals prior to normalization, a correction may be performed such that $$W(\omega)\leftarrow W(\omega)S(\omega) \quad \text{(Expression [9.1])}.$$

Likewise, when the decorrelation is performed as preprocessing, a correction is performed such that $$W(\omega)\leftarrow W(\omega)P(\omega) \; (P(\omega) \text{ is the decorrelating matrix}).$$

Next, a description will be given of the process of (2) adjusting the balance between frequency bins (the rescaling).

Depending on the ICA algorithm, the balance (scale) between frequency bins of the separation results Y may differ from the balance of the original source signals in some cases (for example, Japanese Unexamined Patent Application Publication No. 2006-238409 "Audio Signal Separating Apparatus/Noise Removal Apparatus and Method"). In such cases, it is necessary to correct the scale of frequency bins in post-processing. For the correction of the scale, a correcting matrix is calculated from Expressions [9.5] and [9.6]. Here, "1" (a lower-case letter of L) in Expression [9.5] is the index of the microphone as a projection target. When the correcting matrix is obtained, the separating matrix W(ω) is corrected on the basis of Expression [9.3].

In addition, by collecting the following:

(1) Making the separating matrix correspond to the observed signals prior to normalization; and (2) Adjusting the balance between frequency bins (the rescaling), it may be allowed to perform the correction at once by applying Expression [9.4] thereto. The separating matrix, which is rescaled in such a manner, is stored in the separating matrix holding portion 133 shown in FIG. 12, and, as necessary, is referenced in the separation process (the foreground process) executed by the separation processing unit 123.

Next, the process advances to processing of generating the all-null spatial filter in step S453. In the method of generating the all-null spatial filter, there are the following two possible methods of:

(1) Generation from the separating matrix; and (2) Generation from the eigenvector of the covariance matrices of the observed signals.

First, description will be given of "(1) the method of generating the all-null spatial filter from the separating matrix".

Letting the separating matrix, which is rescaled in step S452, be W(ω) and the low vectors be W1(ω) to Wn(ω), the all-null spatial filter B(ω) is calculated by Expression [5.1] described above. However, "1" (a lower case letter of L) represents an index of the microphone as a projection target. The "$e_1$" represents an n-dimensional row vector, and is a matrix in which only the 1-th element is 1 and the others are 0.

When the all-null spatial filter B(ω) obtained by Expression [5.1] is multiplied by the observed signals X(ω), the results Z(ω,t) are obtained as the all-null spatial filtering results (Expression [5.4]).

Expression [5.3] shows the reason why the all-null spatial filter B(ω) calculated in such a manner functions as the all-null spatial filter.

In Expression [5.3], $$Wk(\omega)X(\omega,t)$$

is the k-th channel of the separating-matrix application results.

The separating matrix is rescaled in the rescaling process of the separating matrix in step S452 of the separation process flow described above with reference to FIG. 32. Hence, when the separating-matrix application results are summed up for all channels, the result is substantially equal to Xl(ω,t) which is the observed signal of the projection target microphone.

Accordingly, it can be expected that the left side of Expression [5.3] is close to 0. Further, the left side of Expression [5.3] can be changed as the right side of Expression [5.4] through the all-null spatial filter B(ω) of Expression [5.1].

Specifically, B(ω) can be regarded as a filter of generating signals close to 0 from the observed signals X(ω,t), that is, the all-null spatial filter.

When the convergence of the separating matrix is not sufficient, the all-null spatial filter, which is generated from the separating matrix, has a characteristic that passes even the sound sources included in the segment of the learning data to some extent. For example, first in the related art described with reference to FIG. 7, the separating matrix does not converge in the segment 75 from time t2 to t3. Hence, the sudden sound is also output to some extent, but the all-null spatial filter, which is generated from the separating matrix in the segment, passes the sudden sound to some extent as well. As such, there is a segment 95 from time t2 to t3 in FIG. 9. However, since the sudden sound passes the segment 95 from time t2 to t3 shown in FIG. 9 as well as the segment 75 from time t2 to t3 shown in FIG. 7, the sudden sound is canceled by the frequency filtering. Consequently, in the (c1) processing result 1 shown in FIG. 9, the sudden sound also disappears in the segment corresponding to the segment 95 from time t2 to t3.

Next, description will be given of "(2) the method of generating the all-null spatial filter from the eigenvectors of the covariance matrices of the observed signals".

When the decorrelation is used as the "preprocessing" in step S411 in the learning process of the separating matrix described with reference to FIG. 31, the eigendecomposition has been completely performed on the covariance matrices of the observed signals already. That is, as represented in Expression [6.1] (the same as Expression [9.8]) below, the covariance matrices of the observed signals $\Sigma_{XX}(\omega)$ are represented by using the eigenvalues $\lambda_1$ to $X_n$ and the eigenvector $p_1$ to $p_n$.

Numerical Expression 10

$$\sum_{XX}(\omega) = [p_1, \ldots, p_n]\mathrm{diag}(\lambda_1, \ldots, \lambda_n)[p_1, \ldots, p_n]^H \quad [6.1]$$

$\lambda_k$: *eigenvalue* (descending order) $p_n$: *eigenvector*

$$B(\omega) = p_n^H \quad [6.2]$$

Here, all the eigenvalues are 0 or more, and arranged in descending order. That is, the following condition is satisfied.

$$\lambda_1 \geq \lambda_2 \geq \ldots \geq \lambda_n \geq 0$$

In this case, the eigenvector $p_n$ corresponding to the minimum eigenvalue $\lambda_n$ has a characteristic of the all-null spatial filter. Accordingly, when the all-null spatial filter B(ω) is set as in Expression [6.2], then it is possible to use the all-null spatial filter B(ω) as in "(1) generation from the separating matrix".

This method is able to reduce the above-mentioned "residual sound" by combining with a way of separating the sound sources by multiplying the observed signals in the time frequency domain by a vector or a matrix even other than ICA.

The all-null spatial filter, which is generated in such a manner, is stored in the all-null spatial filter holding portion 134 shown in FIG. 12, and as necessary, is referenced in the separation process (the foreground process) executed by the separation processing unit 123.

The description so far given of the process of generating the all-null spatial filter in step S453 is ended.

Next, a process of "calculating a power ratio" in step S454 will be described. For example, the power ratio is referenced in the "frequency filtering" process in step S308 in the separation process described above with reference to FIG. 27. However, since the observed signals used for the calculation of the power ratio are the same as the segment (for example, the learning data block 81 shown in FIG. 8) of the learning data, when the power ratio calculation itself is performed at once at the time of the end of the learning, the value remains in effect until the next time the separating matrix is updated.

Before the calculation of the power ratio, first by using Expression [8.8] or [8.9] described above, the power (the square sum of elements in the segment) is calculated for each channel. However, the separating matrix Wk(ω) is the separating matrix rescaled in step S452, the uniform operation $<\bullet>_t$ is performed in the segment (for example, the learning data block 81 shown in FIG. 8) of the learning data.

The power ratio calculation is performed by applying any of the above-mentioned Expressions [8.6], [8.7], and [8.11]. The power (the variance) of the channel k is represented by Vk, and a power ratio $r_k$ is calculated by applying any of the above-mentioned Expressions [8.6], [8.7], and [8.11] thereto. The three expressions are different in denominators thereof. The denominator of Expression [8.6] is the maximum when the powers among the channels are compared in the same segment. The denominator of Expression [8.7] is a power, which is obtained when a very large sound is input, calculated as a $V_{max}$ in advance. The denominator of Expression [8.11] is a mean of the power Vk among the channels. Determination as to which one to use differs depending on usage environments. For example, if the usage environment is relatively silent, it is preferable to use Expression [8.7], and if background noise is relatively large in the usage environment, it is preferable to use Expression [8.6]. In contrast, when $r_{min}$ and $r_{max}$ may be set to satisfy $r_{min} \leq 1 \leq r_{max}$ by using Expression [8.11], the operation is relatively stable in a wide range of environments. The reason is that, since there are at least one channel to which the frequency filtering is not applied and at least one channel to which the frequency filtering is applied, there is no case where the sudden sound is removed or retained on all channels when it should not be.

The power ratio $r_k$ corresponding to the channel calculated in such a manner is stored in the power ratio holding portion 135 shown in FIG. 12, and as necessary, is referenced in the separation process (the foreground process) executed by the separation processing unit 123. That is, by using the function (Expression [8.10] and FIG. 28) based on the power ratio, the power ratio is used when an execution mode of the frequency filtering (step S308 in FIG. 27) is determined for each channel.

The description so far given of the process of calculating the power ratio in step S454 is ended.

5. Other Examples (Modified Examples) of Signal Processing Apparatus of Embodiment of the Invention Next, modified examples different from the above-mentioned examples will be described.

5-1. Modified Example 1

The above-mentioned example describes a method using the function (Expression [8.10] and FIG. 28) based on the power ratio as a method of determining a mode of applying the frequency filtering to each channel.

As a different possible method, there is also a method of "applying the frequency filtering to the channels other than the channel, of which the power is minimal, by comparing the powers of the separating-matrix application results among the channels". That is, the minimum power channel is secured for the output of the sudden sound all the time. Since there is a high possibility that the minimum power channel does not correspond to any sound source, the channel is available even in such a simple method.

However, in order to prevent the channel, on which the sudden sound is output, from being frequently changed (for example, being changed while the sudden sound is being played), contrivance is necessary. Here, as such, the following two points are described:

(1) Smoothing in calculation of the power ratio; and (2) Reflecting the all-null spatial filter in the initial learning value.

(1) Smoothing in calculation of the power ratio

First, the smoothing in calculation of the power ratio will be described.

The power for each channel is calculated on the basis of Expression [10.1] represented as follows.

Numerical Expression 11

$$r_k \leftarrow \gamma r_k + (1 - r_k)\frac{V_k}{V_{max}} \quad [10.1]$$

$$0 \le \gamma \le 1 \quad [10.2]$$

$$\alpha_k = \begin{cases} \alpha_{min} & (r_k = \min_k [r_k]) \\ \alpha & (\text{Otherwise}) \end{cases} \quad [10.3]$$

$$W(\omega) = W'(\omega) - \mathrm{diag}(\alpha'_1, \ldots, \alpha'_n)B'(\omega) \quad [10.4]$$

$$\alpha'_k = \begin{cases} \alpha'_{min} & (r_k = \min_k [r_k]) \\ \alpha' & (\text{Otherwise}) \end{cases} \quad [10.5]$$

$$W(\omega) = \mathrm{normalize}\,(W'(\omega) - \mathrm{diag}(\alpha'_1, \ldots, \alpha'_n)B'(\omega)) \quad [10.6]$$

$$W(\omega) \leftarrow \mu W(\omega) + (1 - \mu)[\mathrm{normalize}\,(W'(\omega) - \mathrm{diag}(\alpha'_1, \ldots, \alpha'_n)B'(\omega))] \quad [10.7]$$

When the power for each channel is calculated on the basis of Expression [10.1], a plurality of the output channels, of which the powers are substantially the same, may exist. In this case, the minimum power channel tends to be frequently changed. For example, when the observed signals are substantially silent, all the output channels are substantially silent. That is, all the output powers become substantially the same, and the minimum power channel is determined depending on a small difference therebetween. Thus, the phenomenon, in which the minimum power channel is frequently changed, may occur.

In order to prevent the phenomenon, the amount of subtraction (or the over-subtraction factor) $\alpha_k$ is calculated by Expression [10.3] instead of Expression [8.5] described above. However, $\alpha_{min}$ is 0 or is a positive value close to 0, and $\alpha$ is the maximum value of $\alpha_k$ as in Expression [8.5]. That is, the frequency filtering is scarcely applied to the minimum power channel, and the frequency filtering is applied, as it is, to the other channels. It should be noted that by setting $\alpha_{min}$ to a positive value close to 0, even on the channel which is secured for the sudden sound, it is possible to reduce the "residual sound" (refer to "Problems of Related Art") to a certain extent.

(2) Reflecting all-null spatial filter to initial learning value

Next, description will be given of the method of reflecting the all-null spatial filter to the initial learning value. By not applying the frequency filtering to only the minimum power channel (or by scarcely applying the frequency filtering thereto), the sudden sound is output on only that channel. On the other hand, when the sudden sound is continuously played, then the situation is reflected in the separating matrix, and the sudden sound is output on only one channel even if there is no operation of the frequency filtering. For example, FIG. 7 shows the channels of the (b2) separation result 2. Hence, it is necessary to contrive a way of making channels coincide with each other in both cases. Otherwise, the phenomenon, in which the output channel is changed while the sudden sound is being played, may arise.

In order to continuously output the sudden sound even thereafter on the channel to which the frequency filtering is not applied (in order to prevent the channel change), it is preferable that the information as to "which channel the frequency filtering is applied to (or not applied to)" should be reflected in the initial value of the next learning. The method will be described below.

In the above-mentioned example, the setting of the initial learning value is performed in step S253 (that is, immediately after the end of the learning) of the "separating matrix update process" described with reference to FIG. 25. However, in the modified example, the setting is performed at the time (that is immediately before the next learning) of setting the initial value of the separating matrix W in step S412 of the "separating matrix learning process" described with reference to FIG. 31. The reason is that the values of the latest separating matrix and all-null spatial filter right before the start of the learning are reflected in the initial learning values (refer to the arrow from the separating matrix application section 126 and the all-null spatial filtering section 127 to the thread control section 131 in FIG. 12).

For the calculation of the initial value of the separating matrix W in step S412 of the "separating matrix learning process" described with reference to FIG. 31, the above-mentioned Expression [10-4] is performed on the all frequency bins. Here, W(ω) of the left side of Expression [10-4] represents the value stored as the initial learning value in the initial-learning-value holding portion 152 of the thread control section 131 shown in FIG. 13 and the separating matrix holding portion 164 of the thread computation section 132 shown in FIG. 14. In addition, W'(ω) and B'(ω) of the right side thereof respectively represent the separating matrix and all-null spatial filter obtained after the frequent rescaling. A value the same as $\alpha_k$ in Expression [10.3] may be used as $\alpha'_k$, similarly to Expression [10.5], a different value may be used. For example, when the spectral subtraction is used as the frequency filtering, the setting is made so that $\alpha=1.5$ in Expression [10.3], and the setting is made so that $\alpha'=1.0$ in Expression [10.5] (the reason is that, although it is possible to obtain an effect of the over-subtraction by setting so that $\alpha>1$ in the spectral subtraction, it is preferable that $\alpha=1$ in the normal subtraction).

When the setting is made so that $\alpha'=1$ and $\alpha'_{min}=0$ (or a positive value close to 0), the separating matrix W(ω) calculated by Expression [10.4] has a characteristic that the minimum power channel outputs the sudden sound and the other channels suppress the sudden sound. Accordingly, by setting such a value to the initial learning value, the sudden sound is highly likely to be continuously output on the same channel even after the learning.

As necessary, instead of Expression [10.4], an operation in Expression [10.6] may be performed. In this expression, the "normalize ( )" represents an operation that normalizes the norm of each row vector by 1 in the matrix in the bracket.

Further, when there is a probability that the learning times between the learning threads are overlapped (for example, the learning time 57 and the learning time 58 are temporally overlapped in FIG. 5), by reflecting the separating matrices other than latest one in the initial learning value, the channel on which the sound source is output is stabilized (regarding the reason thereof, refer to Japanese Unexamined Patent Application Publication No. 2008-147920). In the modified example, in order to reflect the separating matrices other than the latest one in the initial learning value, instead of Expression [10.6], Expression [10.7] is used. W(ω) of the right side of the expression is the initial learning value calculated at the previous time, and is stored in the initial-learning-value holding portion 152 shown in FIG. 13. μ is a forgetting factor, and has a value equal to or more than 0 and equal to or less than 1.

Comparing with Expressions [8.1] to [8.10] representing the determination method based on the modified example in advance, trouble arises only in the case where the sudden sound is newly played in a state where exactly n sound sources (n is the same as the number of microphones) are continuously played. That is, although the sudden sound is removed through the frequency filtering on the n−1 output channels, the frequency filtering is not applied to the channel of which the power is smallest, and thus the sudden sound is superimposed and is output (even in this case, n−1 channels have merit as compared with the related art).

On the other hand, when the number of sound sources before the play of the sudden sound is smaller than n, it can be expected in advance from which channel the sudden sound will be output. Hence, in the application such that mainly the sudden sound is used as a target sound (for example, sometimes a command is input through a voice in an environment where music is being played), there is an advantage that it is easy to specify which one of the plurality of output channels of ICA is the target sound.

5-2. Modified Example 2

Combination with Linear Filtering other than ICA

In the above-mentioned example, the all-null spatial filter and the frequency filtering (the subtraction) are combined with the real-time ICA, but can be also combined with the linear filtering process other than ICA. In such a manner, it is possible to reduce the "residual sound". Here, description will be given of a configuration example of the case of combination with the linear filtering, and then description will be given of processing in a case where a minimal variance beamformer (MVBF) is used as a specific example of the linear filtering.

Figure 33:
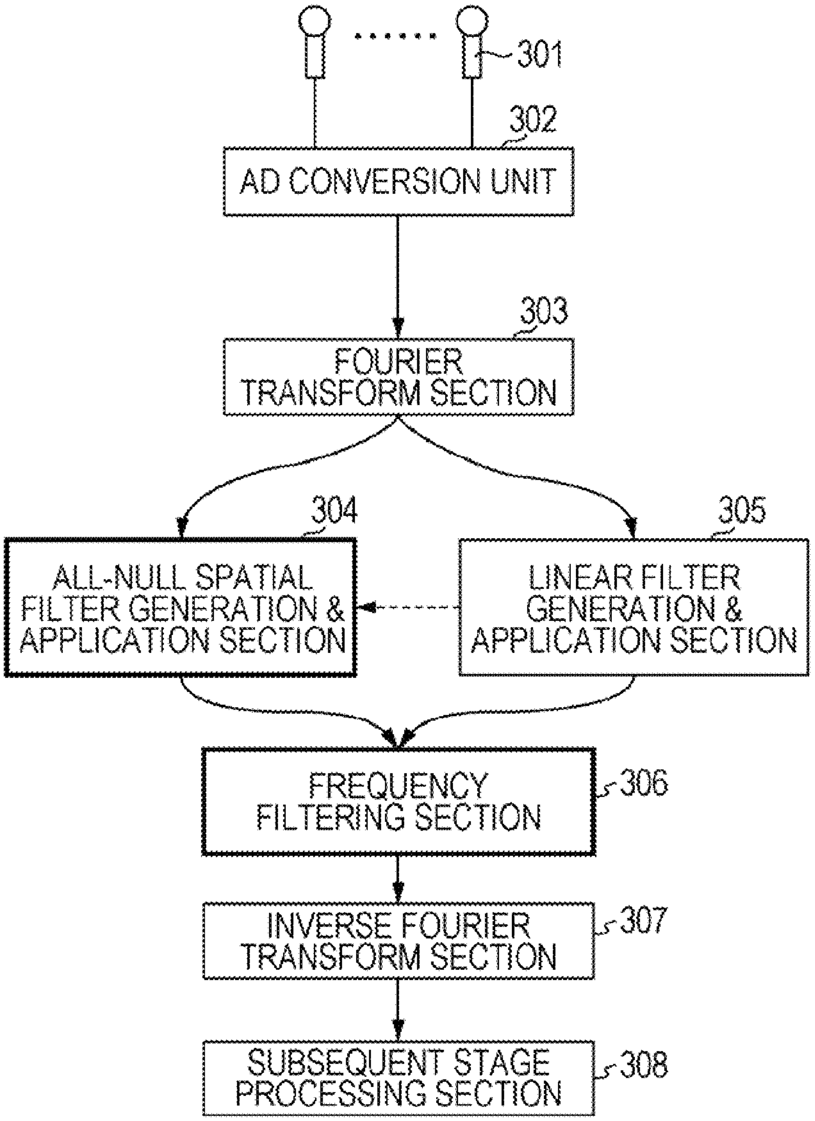
FIG. 33 is a diagram illustrating a configuration example in a case where linear filtering is combined with “all-null spatial filter & frequency filtering”.

FIG. 33 is a diagram illustrating the configuration example of the case where the "all-null spatial filter & frequency filtering" and the linear filtering are combined. A process executed by the configuration shown in FIG. 33 is substantially the same as the observed signal separation process (the foreground process) executed by the separation processing unit 123 shown in FIG. 12.

By providing a system that generates and applies a certain linear filter (the Fourier transform section 303-4 the linear filter generation & application section 305) and a system that generates and applies the all-null spatial filter (the Fourier transform section 303-4 the all-null spatial filter generation & application section 304), the frequency filtering (the subtraction) is performed on each application result. The dashed line from the linear filter generation & application section 305 to the all-null spatial filter generation & application section 304 indicates that the rescaling (adjusting the scale of the all-null spatial filtering result to the scale of the linear filtering result) is performed on the application result of the all-null spatial filter as necessary.

The linear filtering described herein means a process of separating, extracting, and removing signals by providing the separating matrix W(ω) as a matrix or a vector and multiplying the observed signal vector X(ω,t) by W(ω) (that is, in terms of the separation result: Y(ω,t)=W(ω) X(ω,t)).

Hereinafter, description will be given of the case where the minimal variance beamformer is used as the linear filtering. The minimal variance beamformer is one of techniques of extracting a target sound by using information on the direction of the target sound in the environment where the target sound and the interference sound are mixed, and is a kind of a technique called an adaptive beamformer (ABF).

For details thereof, for example, refer to the following document.

Figure 34:
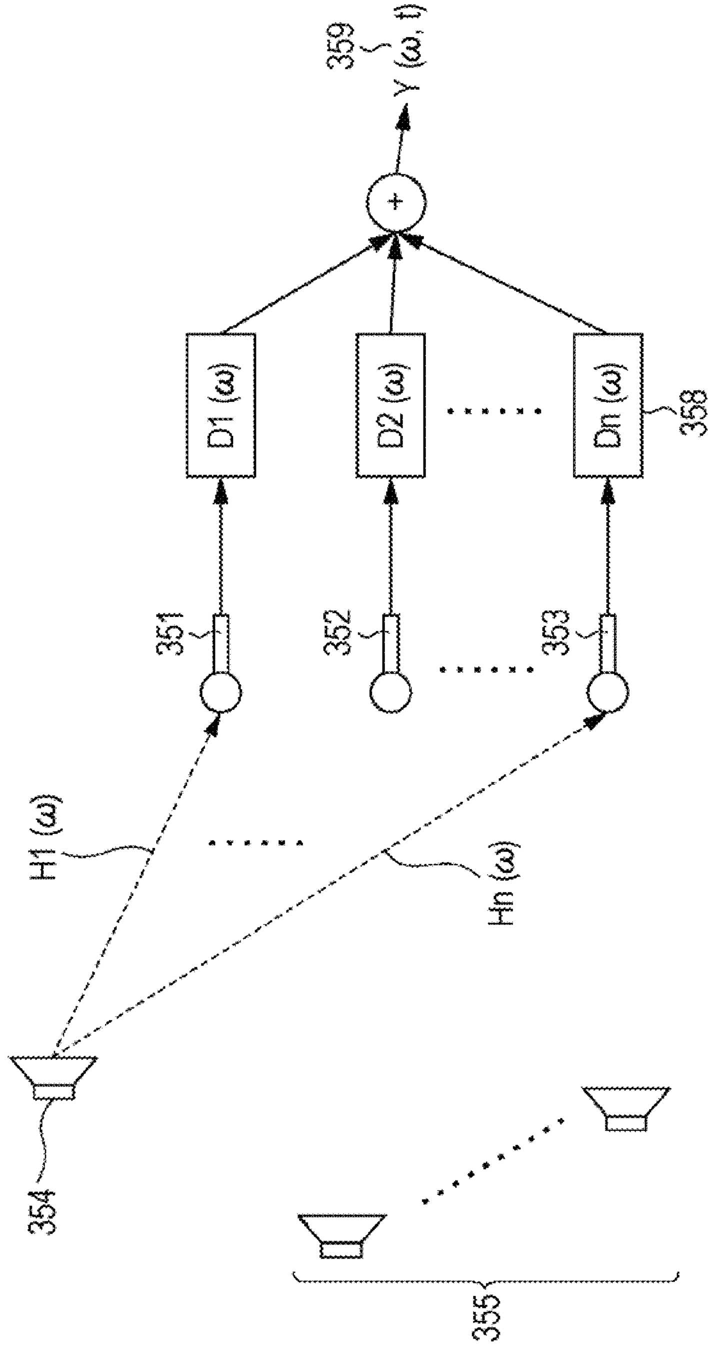
FIG. 34 is a diagram illustrating an application example of a minimal variance beamformer (MVBF) that performs the linear filtering.

"Measurement of Sound Field and Directivity Control" Nobutaka ONO, Shigeru ANDO 22-th Sensing Forum Document, pp. 305-310, September, 2005. http://hil.t.u-tokyo.ac.jp/publications/download.php?bib=Ono2005SensingForum09.pdf Hereinafter, referring to FIG. 34, the minimal variance beamformer (MVBF) will be briefly described, and then the combination of the all-null spatial filter and the frequency filtering will be described. As shown in FIG. 34, in the environment where the target sound 354 (the number of sound sources is 1) and the interference sound 355 (the number of sound sources is 1 or more) are mixed, the signals, in which both sounds are mixed, are observed by the n microphones 351 to 353. The vector generated from the observed signals is represented by X(ω,t) as in Expression [2.2] described above.

H1(ω) to Hn(ω), which are functions (the impulse responses) of transfer from the sound sources to the microphones, are given, and a vector formed of those as elements is represented by H(ω). The vector H(ω) is defined by the following Expression [11.1].

Numerical Expression 12

$$H(\omega) = \begin{bmatrix} H_1(\omega) \\ \vdots \\ H_n(\omega) \end{bmatrix} \quad [11.1]$$

$$D(\omega) = [D_1(\omega), \ldots , D_n(\omega)] \quad [11.2]$$

$$Y(\omega, t) = D(\omega)X(\omega, t) \quad [11.3]$$

$$D(\omega)H(\omega) = 1 \quad [11.4]$$

$$D(\omega) = \frac{H(\omega)^H \sum_{XX}(\omega)^{-1}}{H(\omega)^H \sum_{XX}(\omega)^{-1} H(\omega)} \quad [11.5]$$

$$\sum_{XX}(\omega)^{-1} = \left\langle P(\omega)^{-1} X'(\omega, t)X'(\omega, t)^H (P(\omega)^{-1})^H \right\rangle_t^{-1} \quad [11.6]$$

$$= P(\omega)^H P(\omega) \quad [11.7]$$

$$D(\omega) = \frac{H(\omega)^H P(\omega)^H P(\omega)}{H(\omega)^H P(\omega)^H P(\omega) H(\omega)} \quad [11.8]$$

$$Q(\omega) = \langle Y(\omega, t)\overline{Z(\omega, t)}\rangle_t / \langle Z(\omega, t)\overline{Z(\omega, t)}\rangle_t \quad [11.9]$$

$$= D(\omega)\sum_{XX}(\omega)B(\omega)^H / B(\omega)\sum_{XX}(\omega)B(\omega)^H \quad [11.10]$$

$$B'(\omega) = Q(\omega)B(\omega) \quad [11.11]$$

$$Z'(\omega, t) = B'(\omega)X(\omega, t) \quad [11.12]$$

The vector H(ω) is called a steering vector. In the minimal variance beamformer (MVBF) which is a specific example of the linear filtering, even when proper transfer functions are not used, if a ratio of H1(ω) to Hn(ω) is correct, it is possible to extract the target sound. Hence, the steering vector can be calculated from the sound source direction or position of the target sound, and can be also estimated from the observed signals in the segment (where the interference sound is entirely stopped) where only the target sound is being played.

As shown in FIG. 34, the sum, which is obtained through the filter 358, that multiplies the observed signals X1(ω,t) to Xn(ω,t) by the filter factors (D1(ω) to Dn(ω)), is represented as the separation result Y(ω,t) 359. The separation result Y(ω,t) 359 can be represented by Expression [11.3] by using the vector D(ω) (Expression [11.2]) formed of the filter factors as its elements. Unlike ICA, the output is 1 channel, that is, Y(ω,t) is scalar.

D(ω) which is a filter of the minimal variance beamformer (MVBF) is found by Expression [11.5]. In this expression, $\Sigma_{XX}(\omega)$ is defined as the covariance matrices of the observed signals, and can be obtained from the operation in Expression [4.4] as in ICA. It should be noted that, under constraint (corresponding to Expression [11.4]) such that "the sound derived from the target sound 354 is made to remain as it is", Expression [11.5] is derived by solving the problem for finding the MVBF filter D(ω) which minimizes the variance $<|Y(\omega,t)|^2>$ of Y(ω,t). The MVBF filter D(ω) calculated by Expression [11.5] keeps the gain in the target sound direction at 1, and form null beams in each interference sound direction.

However, in the extraction of the sound sources using MVBF, there is the problem of the "residual sound" in ICA. That is, when the number of sound sources of the interference sounds is equal to or more than the number of microphones, or when the interference sound is not directional (that is, when the interference sound does not originate from a point sound source), it is difficult to eliminate the interference sound through null, and thus the extraction ability deteriorates. Further, due to the arrangement of the microphones, the accuracy of extraction in a certain frequency band is likely to be deteriorated.

Further, due to the restriction of the computational cost, the update of the filter may not be performed for each frame but may be performed only at a frequency of one time per plural frames. In this case, the phenomenon of the "tracking lag" also occurs. For example, when the update of the filter is performed at a frequency of one time per 10 frames, in the interval of maximum 9 frames subsequent to the play of the sudden sound, the sound is output without being removed.

On the other hand, by combining the all-null spatial filter and the frequency filtering with the MVBF according to the embodiment of the invention, it is possible to cope with the "residual sound" and the "tracking lag". At this time, by performing the eigendecomposition on the covariance matrices, it is possible to calculate the all-null spatial filter without increasing the computational cost. Hereinafter, the method will be described.

The covariance matrices of the observed signals are calculated for each frame by Expression [4.4] described above. Then, the eigendecomposition is performed on the covariance matrices in accordance with the frequency of the update of the MVBF filter (Expression [6.1] described above). Similarly to the case of the combination with ICA, the all-null spatial filter is a transposition of the eigenvector corresponding to the minimum eigenvalue (Expression [6.2]).

When using the eigendecomposition result, it is possible to calculate the MVBF filter from the simple expression which does not include an inverse matrix. The reason is that, when the decorrelating matrix P(ω) which is calculated from Expression [9.9] described above is used, the covariance matrices of the observed signals can be written as Expression [11.7], and thereby the MVBF filter can be written as Expression [11.8]. In other words, when the eigendecomposition is used as a way of finding the covariance matrices of the observed signals in Expression [11.5], the all-null spatial filter is obtained at the same time.

The all-null spatial filter B(ω) calculated in such a manner is subjected to the rescaling (the processing of adjusting the scale of the all-null spatial filtering result to the scale of the MVBF filtering result). The rescaling is performed by multiplying the all-null spatial filter B(ω) by the factor Q(ω) which is calculated by Expression [11.9] (Expression [11.11]). The application result Z'(ω,t) of the rescaled all-null spatial filter is performed on the basis of Expression [11.12]. Since the MVBF-side output is 1 channel, Z'(ω,t) is also 1 channel (that is, Z'(ω,t) is scalar).

The frequency filtering (the subtraction in a wide range of meaning) is performed between the all-null spatial filtering result (Expression [11.12]) and the MVBF result (Expression [11.3]) generated in such a manner. In accordance therewith, the "residual sound" is removed from the MVBF result. Further, since the MVBF filter is updated for each group of the plural frames, even when the "tracking lag" occurs, it is possible to remove the sudden sound.

6. Overview of Advantages based on Configuration of Signal Processing Apparatus according to Embodiment of the Invention Hereinafter, the advantages based on the configurations of the signal processing apparatus according to the embodiments of the invention will be summarized and described. The advantages based on the configurations of the signal processing apparatus according to the embodiments of the invention are as follows.

(1) In the real-time sound source separation system using the independent component analysis, not only the separating-matrix application result but also the all-null spatial filtering result are generated, the frequency filtering or the subtraction is performed between both results, and thereby it is possible to remove the sudden sound.

(2) By changing the force (or the subtraction amount), which applies the frequency filtering, depending on whether the signal corresponding to the sound source is output before the generation of the sudden sound, a) it is possible to remove the sudden sound from the channels on which the signals corresponding to the sound sources are being output, and b) it is possible to output the sudden sound from the channel on which the signals corresponding to the sound sources are not being output.

(3) By performing the rescaling on the separating matrix for each shortest one frame, it is possible to reduce distortion caused when the sudden sound is output.

The present invention has been described above in detail with reference to specific examples. However, it is obvious that a person skilled in the art can make various modifications to and substitutions for the embodiments without departing from the scope of the invention. That is, the invention has been disclosed by way of examples, and should not be construed restrictively. The scope of the invention should be determined with reference to the appended claims.

The series of processes described in this specification can be executed by hardware, software, or a combined configuration of both. When the processes are executed by software, the processes can be executed by installing a program recording the process sequence into a memory within a computer embedded in dedicated hardware, or by installing the program into a general purpose computer capable of executing various processes. For example, the program can be prerecorded on a recording medium. Other than being installed into a computer from a recording medium, the program can be received via a network such as the LAN (Local Area Network) or the Internet, and installed into a built-in recording medium such as a hard disk.

The various processes described in this specification may be executed not only time sequentially in the order as they appear in the description, but may be executed in parallel or independently depending on the throughput of the device executing the processes or as necessary. In addition, the term system as used in this specification refers to a logical assembly of a plurality of devices, and is not limited to one in which the constituent devices are located within the same casing.

The present application contains subject matter related to that disclosed in Japanese Priority Patent Application JP 2009-265075 filed in the Japan Patent Office on Nov. 20, 2009, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A signal processing apparatus comprising:

a separation processing unit that generates observed signals in the time frequency domain by performing the short-time Fourier transform (STFT) on mixed signals as outputs, which are acquired from a plurality of sound sources by a plurality of sensors, and generates sound source separation results corresponding to the sound sources by performing a linear filtering process on the observed signals, wherein the separation processing unit has a linear filtering process section that performs the linear filtering process on the observed signals so as to generate separated signals corresponding to the respective sound sources, an all-null spatial filtering section that applies all-null spatial filters which form null beams toward all the sound sources included in the observed signals acquired by the plurality of sensors so as to generate signals filtered with the all-null spatial filters (spatially filtered signals) in which the acquired sounds in null directions are removed, and a frequency filtering section that performs a filtering process of removing signal components corresponding to the spatially filtered signals included in the separated signals by inputting the separated signals and the spatially filtered signals, wherein the frequency filtering section performs a process of changing a level of removal of components corresponding to the spatially filtered signals from the separated signals in accordance with a channel of the separated signals, thereby generating processing results of the frequency filtering section as the sound source separation results.

2. The signal processing apparatus according to claim 1, further comprising:

a learning processing unit that finds separating matrices for separating the mixed signals, in which the outputs from the plurality of sound sources are mixed, through a learning process, which employs independent component analysis (ICA) to the observed signals generated from the mixed signals, and generates the all-null spatial filters which form null beams toward all the sound sources acquired from the observed signals, wherein the linear filtering process section applies the separating matrices, which are generated by the learning processing unit, to the observed signals so as to separate the mixed signals and generate the separated signals corresponding to the respective sound sources, and wherein the all-null spatial filtering section applies the all-null spatial filters, which are generated by the learning processing unit, to the observed signals so as to generate the spatially filtered signals in which the acquired sounds in null directions are removed.

3. The signal processing apparatus according to claim 1 or 2, wherein the frequency filtering section performs the filtering process of removing signal components, which correspond to the spatially filtered signals included in the separated signals, through a process of subtracting the spatially filtered signals from the separated signals.

4. The signal processing apparatus according to claim 1 or 2, wherein the frequency filtering section performs the filtering process of removing signal components, which correspond to the spatially filtered signals included in the separated signals, through a frequency filtering process based on spectral subtraction which regards the spatially filtered signals as noise components.

5. The signal processing apparatus according to claim 2, wherein the learning processing unit performs a process of generating the separating matrices and the all-null spatial filters based on blockwise learning results by performing a learning process on a block-by-block basis for dividing the observed signals, and wherein the separation processing unit performs a process using the latest separating matrices and all-null spatial filters which are generated by the learning processing unit.

6. The signal processing apparatus according to claim 1, wherein the frequency filtering section performs the process of changing the level of removal of components corresponding to the spatially filtered signals from the separated signals in accordance with a power ratio of the channels of the separated signals.

7. The signal processing apparatus according to claim 2, wherein the separation processing unit generates the separating matrices and the all-null spatial filters subjected to a rescaling process as scale adjustment using a plurality of frames, which are data units cut out from the observed signals, including a frame corresponding to the current observed signals, and performs a process of applying the separating matrices and the all-null spatial filters subjected to the rescaling process to the observed signals.

8. A signal processing method of performing a sound source separation process on a signal processing apparatus, the signal processing method comprising a step of:

generating observed signals in the time frequency domain by performing the short-time Fourier transform (STFT) on mixed signals as outputs, which are acquired from a plurality of sound sources by a plurality of sensors, and generating sound source separation results corresponding to the sound sources by performing a linear filtering process on the observed signals, in a separation processing unit, wherein the generating of the sound source separation results includes the steps of performing the linear filtering process on the observed signals so as to generate separated signals corresponding to the respective sound sources, applying all-null spatial filters which form null beams toward all the sound sources included in the observed signals acquired by the plurality of sensors so as to generate signals filtered with the all-null spatial filters (spatially filtered signals) in which acquired sounds in null directions are removed, and performing a filtering process of removing signal components corresponding to the spatially filtered signals included in the separated signals by inputting the separated signals and the spatially filtered signals, wherein the filtering process comprises changing a level of removal of components corresponding to the spatially filtered signals from the separated signals in accordance with a channel of the separated signals, thereby generating processing results of performing the frequency filtering process, as the sound source separation results.

9. A non-transitory computer readable medium storing A program of performing a sound source separation process on a signal processing apparatus, the program executing:

a separation process step of generating observed signals in the time frequency domain by performing the short-time Fourier transform (STFT) on mixed signals as outputs, which are acquired from a plurality of sound sources by a plurality of sensors, and generating sound source separation results corresponding to the sound sources by performing a linear filtering process on the observed signals, in a separation processing unit, wherein the separation process step includes a linear filtering process step of performing the linear filtering process on the observed signals so as to generate separated signals corresponding to the respective sound sources, an all-null spatial filtering step of applying an all-null spatial filters which form null beams toward all the sound sources included in the observed signals acquired by the plurality of sensors so as to generate signals filtered with the all-null spatial filters (spatially filtered signals) in which the acquired sounds are removed, and a frequency filtering step of performing a filtering process of removing signal components corresponding to the spatially filtered signals included in the separated signals by inputting the separated signals and the spatially filtered signals, wherein the frequency filtering step comprises changing a level of removal of components corresponding to the spatially filtered signals from the separated signals in accordance with a channel of the separated signals, thereby generating processing results of the frequency filtering step, as the sound source separation results.

* * * * *